US008375239B2

(12) United States Patent
Nara et al.

(10) Patent No.: US 8,375,239 B2
(45) Date of Patent: Feb. 12, 2013

(54) CLOCK CONTROL SIGNAL GENERATION CIRCUIT, CLOCK SELECTOR, AND DATA PROCESSING DEVICE

(75) Inventors: Yoshikazu Nara, Yokohama (JP); Yasuhiko Takahashi, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 161 days.

(21) Appl. No.: 13/035,789

(22) Filed: Feb. 25, 2011

(65) Prior Publication Data

US 2011/0214003 A1 Sep. 1, 2011

(30) Foreign Application Priority Data

Feb. 26, 2010 (JP) ................................ 2010-042771

(51) Int. Cl.
*H04L 7/00* (2006.01)
*G01R 31/28* (2006.01)

(52) U.S. Cl. ........ 713/400; 713/401; 713/500; 713/501; 713/502; 713/503; 713/600; 713/601; 327/175; 375/224; 375/354; 375/357

(58) Field of Classification Search .................. 713/400, 713/401, 500, 501, 503, 600, 601; 327/175; 375/224, 354, 357
See application file for complete search history.

(56) References Cited

U.S. PATENT DOCUMENTS

| | | | | |
|---|---|---|---|---|
| 4,229,699 A * | 10/1980 | Frissell | ........................ | 327/114 |
| 5,717,353 A * | 2/1998 | Fujimoto | ...................... | 327/276 |
| 7,246,286 B2 * | 7/2007 | Hsieh | ............................ | 714/731 |
| 7,656,980 B2 * | 2/2010 | Matsumuro et al. | .......... | 375/354 |
| 7,730,374 B2 * | 6/2010 | Fusumada et al. | ............ | 714/733 |
| 2004/0202264 A1 * | 10/2004 | Choi | ............................. | 375/354 |
| 2007/0063744 A1 | 3/2007 | Matsumuro et al. | | |
| 2008/0272814 A1 * | 11/2008 | Chiang et al. | ................. | 327/175 |

FOREIGN PATENT DOCUMENTS

| | | |
|---|---|---|
| JP | 10-154020 A | 6/1998 |
| JP | 2004-166194 A | 6/2004 |

* cited by examiner

*Primary Examiner* — M Elamin
(74) *Attorney, Agent, or Firm* — Miles and Stockbridge P.C.

(57) ABSTRACT

Provided are a technique for high-speed switching between clock signals different in frequency, and a clock-control-signal-generation circuit which serves to generate a control signal for clock switching in a clock selector operable to switch between clock signals including a first clock signal based on first and second clock-stop-permission signals and a clock-resume-permission signal. The clock-control-signal-generation circuit includes: a before-switching clock processing unit; and an after-switching clock processing unit. In each of the before-and after-switching clock processing units, the high-frequency clock processing subunit and the low-frequency clock processing subunit take partial charges of processing of clock signals involved in the switching respectively, whereby the processing is speeded up.

11 Claims, 25 Drawing Sheets

Fig.12

| CSEL-SIG[2] | CSEL-SIG[1] | CSEL-SIG[0] | SCF1 | SCF0 | SCS1 | SCS0 | 2CLK | 3CLK | 1CLK |
|---|---|---|---|---|---|---|---|---|---|
| 0 | 0 | 0 | 0 | 0 | 1 | 1 | CKIN1 | GND | CKIN1 |
| 0 | 0 | 1 | 0 | 1 | 1 | 1 | CKIN2 | GND | CKIN2 |
| 0 | 1 | 0 | 1 | 0 | 1 | 1 | CKIN3 | GND | CKIN3 |
| 0 | 1 | 1 | 1 | 1 | 1 | 1 | GND | GND | GND |
| 1 | 0 | 0 | 1 | 1 | 0 | 0 | GND | CKIN4 | CKIN4(D) |
| 1 | 0 | 1 | 1 | 1 | 0 | 1 | GND | CKIN5 | CKIN5(D) |
| 1 | 1 | 0 | 1 | 1 | 1 | 0 | GND | CKIN6 | CKIN6(D) |
| 1 | 1 | 1 | 1 | 1 | 1 | 1 | GND | GND | GND |

Fig.13

| 2CLKEN-SIG | NSEL-SIG[2] | NSEL-SIG[1] | NSEL-SIG[0] | SNF1 | SNF0 | SNS1 | SNS0 | 4CLK | 5CLK |
|---|---|---|---|---|---|---|---|---|---|
| 0 | X | X | X | 1 | 1 | 1 | 1 | GND | GND |
| 1 | 0 | 0 | 0 | 0 | 0 | 1 | 1 | CKIN1 | GND |
| 1 | 0 | 0 | 1 | 0 | 1 | 1 | 1 | CKIN2 | GND |
| 1 | 0 | 1 | 1 | 1 | 0 | 1 | 1 | CKIN3 | GND |
| 1 | 1 | 0 | 0 | 1 | 1 | 0 | 0 | GND | GND |
| 1 | 1 | 0 | 1 | 1 | 1 | 0 | 1 | GND | CKIN4 |
| 1 | 1 | 1 | 0 | 1 | 1 | 1 | 0 | GND | CKIN5 |
| 1 | 1 | 1 | 1 | 1 | 1 | 1 | 1 | GND | CKIN6 |
|  |  |  |  |  |  |  |  |  | GND |

Fig.15

| CSEL-SIG[2] | CSEL-SIG[1] | CSEL-SIG[0] | SCF1 | SCF0 | SCS1 | SCS0 | 2CLK | 3CLK | 1CLK |
|---|---|---|---|---|---|---|---|---|---|
| 0 | 0 | 0 | 0 | 0 | 1 | 1 | CKIN1 | GND | CKIN1 |
| 0 | 0 | 1 | 0 | 1 | 1 | 1 | CKIN2 | GND | CKIN2 |
| 0 | 1 | 0 | 1 | 0 | 1 | 1 | CKIN3 | GND | CKIN3 |
| 0 | 1 | 1 | 1 | 1 | 1 | 0 | GND | GND | GND |
| 1 | 0 | 0 | 1 | 1 | 0 | 0 | GND | CKIN4 | CKIN4 |
| 1 | 0 | 1 | 1 | 1 | 0 | 1 | GND | CKIN5 | CKIN5 |
| 1 | 1 | 0 | 1 | 1 | 1 | 0 | GND | CKIN6 | CKIN6 |
| 1 | 1 | 1 | 1 | 1 | 1 | 1 | GND | GND | GND |

Fig.16

| 2CLKEN-SIG | NSEL-SIG[2] | NSEL-SIG[1] | NSEL-SIG[0] | SNF1 | SNF0 | SNS1 | SNS0 | 4CLK | 5CLK |
|---|---|---|---|---|---|---|---|---|---|
| 0 | X | X | X | 1 | 1 | 1 | 1 | GND | GND |
| 1 | 0 | 0 | 0 | 0 | 0 | 1 | 1 | CKIN1 | GND |
| 1 | 0 | 0 | 1 | 0 | 1 | 1 | 1 | CKIN2 | GND |
| 1 | 0 | 1 | 0 | 1 | 0 | 1 | 1 | CKIN3 | GND |
| 1 | 0 | 1 | 1 | 1 | 1 | 1 | 1 | GND | GND |
| 1 | 1 | 0 | 0 | 1 | 1 | 0 | 0 | GND | CKIN4 |
| 1 | 1 | 0 | 1 | 1 | 1 | 0 | 1 | GND | CKIN5 |
| 1 | 1 | 1 | 0 | 1 | 1 | 1 | 0 | GND | CKIN6 |
| 1 | 1 | 1 | 1 | 1 | 1 | 1 | 1 | GND | GND |

| 1CST-SIG | C-RES-SIG | 1GAT-SIG |
|---|---|---|
| 0 | 0 | 1 |
| 0 | 1 | 1 |
| 1 | 0 | 0 |
| 1 | 1 | 1 |

| 2CST-SIG | C-RES-SIG | 2GAT-SIG |
|---|---|---|
| 0 | 0 | 0 |
| 0 | 1 | 0 |
| 1 | 0 | 1 |
| 1 | 1 | 0 |

| 2GAT-SIG | 1GAT-SIG | CKOUT |
|---|---|---|
| 0 | 0 | 0 |
| 0 | 1 | 1CLK |
| 1 | 0 | — |
| 1 | 1 | 1 |

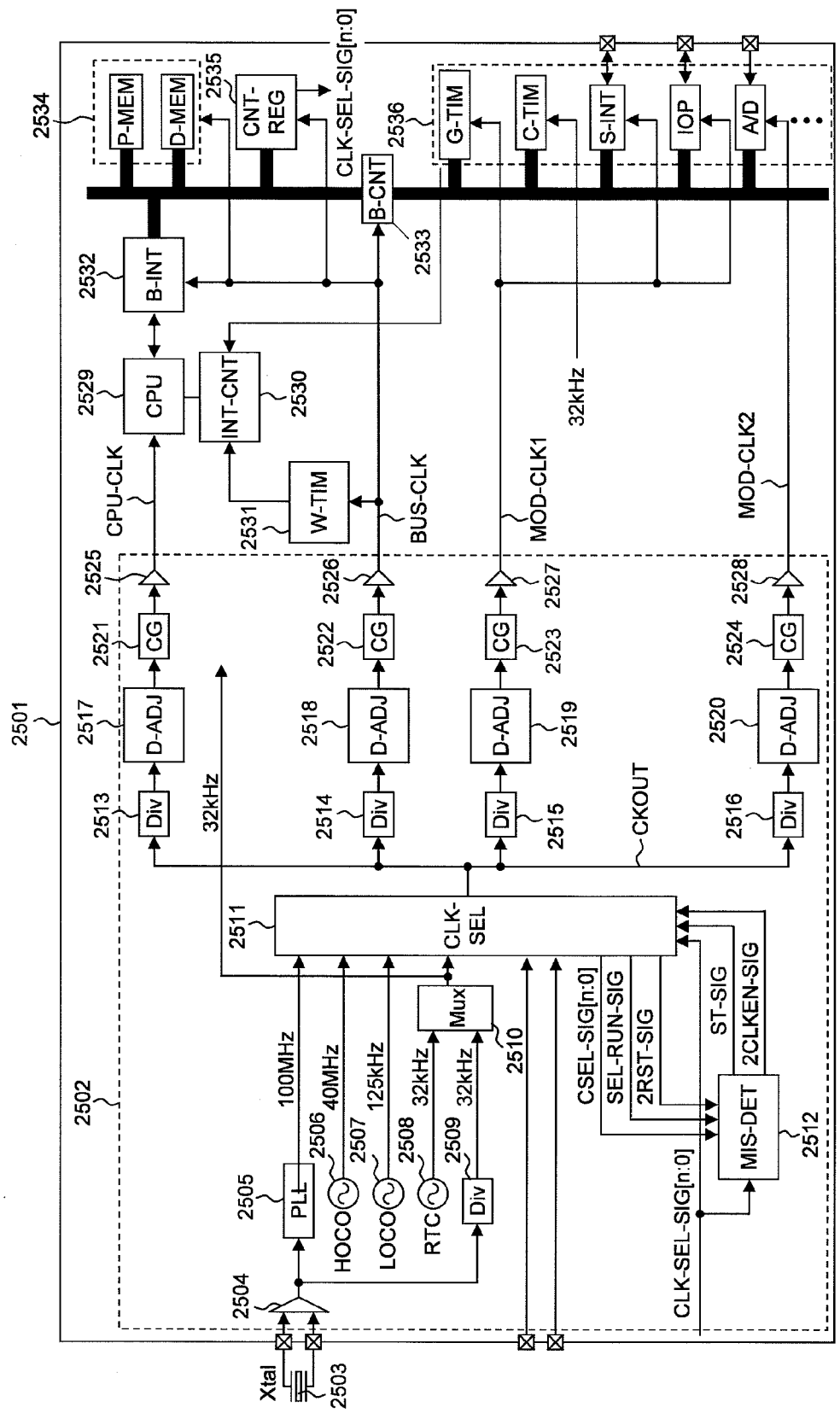

CLOCK CONTROL SIGNAL GENERATION CIRCUIT, CLOCK SELECTOR, AND DATA PROCESSING DEVICE

CLAIM OF PRIORITY

The Present application claims priority from Japanese application JP 2010-042771 filed on Feb. 26, 2010, the content of which is hereby incorporated by reference into this application.

FIELD OF THE INVENTION

The present invention relates to a clock-control-signal-generation circuit operable to generate a signal for controlling a clock signal, a clock selector operable to select, from among clock signals out of synchronization with each other, one clock signal, and output the select one, and a data processor including the clock-control-signal-generation circuit and clock selector.

BACKGROUND OF THE INVENTION

Japanese Unexamined Patent Publication No. JP-A-2007-86960 discloses a clock-switching circuit which can switch a clock without generating a hazard and a collapse of duty rate. The clock-switching circuit has: a first synchronizing circuit for synchronizing a clock-select signal by a first clock; a second synchronizing circuit for synchronizing the clock-select signal, which the first synchronizing circuit has synchronized by the first clock, by a second clock; and a clock selecting circuit for outputting a "1" (High level) in synchronization with the clock-select signal, which the first synchronizing circuit has synchronized by the first clock, and for selecting a second clock in synchronization with the clock-select signal, which the second synchronizing circuit has synchronized by the second clock.

Japanese Unexamined Patent Publication No. JP-A-10-154020 discloses a technique for a clock-switching circuit operable to perform switching control in synchronization with a level inversion edge of a clock arising at the clock level inversion of the clock, by which a means for monitoring the level of each clock is provided, and the output-stop control of a clock before switching is performed without waiting for a level inversion edge of the before-switching clock immediately after detection of the before-switching clock staying at a non-valid level.

Japanese Unexamined Patent Publication No. JP-A-2004-166194 discloses a technique for preventing oscillating components of a metastable or a glitch from entering an output signal. According to JP-A-2004-166194, on condition that a new clock signal different from a clock signal under outputting is selected in a select signal, an output signal is held at Low level in synchronization with a falling of the clock signal under outputting. After the level holding, a state signal indicating no selection of all clock signals is output and in response to the state signal, an enable signal for validating the selection of all clock signals is generated to validate the selection of a new input signal by the select signal. The validated new input signal is output in synchronization with its falling. When a state signal indicating the new input signal under selecting is then output, an enable signal is generated for validating the selection of an input signal under selecting based upon the state signal and for invalidating the selection of the other input signal.

SUMMARY OF THE INVENTION

According to the technique described in JP-A-2007-86960, a means for clock synchronization to take a measure against a glitch, and a combination of series-connected flip-flops of two stages, as a measure against a metastable which would take place in a flip-flop owing to the glitch, are used. As a result, the clock selector involves a time of up to two cycles of a clock before switching between the change of the clock-select signal and the stop of the clock, and needs a time of up to three cycles between the stop of the clock and the resumption of the clock. Therefore, the sum of these kinds of time makes the time required for the clock switching. Now, it is noted here that the time when the rising edge of the clock after the switching first comes is defined as the time of "resumption of the clock".

For example, on condition that the frequency of a clock before switching is 32 kHz, and that of a clock after switching is 100 MHz, a total of 62.5 micro seconds will be taken for the switching. The time represents periods of 6250 cycles of the 100-MHz clock after switching. In light of the time of one cycle of the high-frequency clock after switching, the fact implies that a great deal of time will be lost as a standby time. Almost all of the switching time of 62.5 micro seconds is the time taken for a process using the low-frequency (32 kHz) clock before switching. Therefore, a processing time of a process using a low-frequency clock is considered to make an obstructive factor to the speedup of clock switching. Such tendency becomes more remarkable as the difference in clock frequency between before and after switching widens.

Microcomputer systems are equipped with, as a clock generator, a PLL (Phase Locked Loop) for multiplying, in frequency, a reference clock supplied by an externally attached quarts oscillator thereby to generate a clock of a high frequency, e.g. 100 MHz, and a 32-kHz clock generator for a timepiece. Further, in recent years, a self-running on-chip oscillator of a high frequency, e.g. 40 MHz, and a self-running on-chip oscillator of a low frequency, e.g. 125 kHz, are sometimes provided in a microcomputer system for the purpose of eliminating the need for an externally attached quartz oscillator thereby to cut the system cost. Such independent clock generators are in asynchronism with each other. For example, a clock selector is provided in a microcomputer system like this, and serves to select one signal from among clock signals supplied by the asynchronous clock generators as described above, and to supply the selected clock signal to an appropriate functional block inside the microcomputer system. A microcomputer system typically works on a clock of a high frequency, e.g. 100 MHz, in high-speed operation mode. However, to meet the demand for the reduction in power consumption, a microcomputer system is controlled as follows. That is, the operation mode of the system is monitored, and in this condition, if it is detected that the system is in abeyance, the clock frequency is lowered to, e.g. 32 kHz, and then the system goes into a power-saving mode. The step of changing the clock frequency is actually conducted by a clock selector switching the clock to another clock having a different frequency. Usually, a generator of a clock, which has not been selected by the clock selector in the switching, is controlled to a condition where its oscillation is stopped in order to cut the power consumption.

On the assumption that the microcomputer system returns from the power-saving mode for 32-kHz clock operation to the high-speed-operation mode for 100-MHz clock operation, a standby time representing the time of 6250 cycles of the clock after switching is expected to be created at the switching from the 32-kHz clock to the 100-MHz clock in a conventional clock selector, as described above. The standby time can cause a serious malfunction in an application to e.g. a controller such that the practicability of real-time processing is a key requirement. In addition, the operating time of a high-frequency clock generator like PLL, which consumes a large power, is made longer, which is considered to be an obstacle to achieving the reduction of power consumption.

According to the JP-A-10-154020, in a clock-switching circuit, a circuit for monitoring a falling edge is provided for each clock. However, for a low-speed clock, a circuit for monitoring a level of a clock and a circuit for monitoring two types of edges of a clock after switching are provided additionally. Therefore, if the kind of the low-speed clock increases, the circuit scale is expected to become larger because a circuit for monitoring the level of a clock and a circuit for monitoring two types of edges of a clock after switching must be provided for each kind of low-speed clock. Further, in this case, the select procedure followed in taking high-speed clocks into the circuit for monitoring two types of edges is complicated, and the circuit scale is expected to increase consequently.

According to JP-A-2004-166194, a hedge circuit which involves the use of a high-speed reference clock and is separately prepared, is provided in parallel with a cascaded structure of latch circuits different from each other in logic for detection. As to the hedge circuit like this, the same number of the hedge circuits as the number of clocks are required. Therefore, the increase in the number of clocks is expected to increase the circuit scale.

It is an object of the invention to provide a technique for switching between clock signals having different frequencies at a high speed.

It is another object of the invention to provide a technique for switching between clock signals having different frequencies, without increasing of the circuit scale.

The above and other objects of the invention and novel features thereof will be apparent from the description hereof and the accompanying drawings.

Of the preferred embodiments of the invention herein disclosed, representative one will be described below in brief outline.

A clock-control-signal-generation circuit according to the preferred embodiment serves to generate a control signal for clock switching in a clock selector operable to switch between clocks including a first clock signal based on first and second clock-stop-permission signals and a clock-resume-permission signal. The clock-control-signal-generation circuit includes a before-switching clock processing unit, and an after-switching clock processing unit. The before-switching clock processing unit includes a first high-frequency clock processing subunit which makes active and outputs a first detection signal on detection of a first state of a second clock signal on condition that a switching-trigger signal is active. Further, the before-switching clock processing unit includes a first low-frequency clock processing subunit which makes active and outputs a second detection signal on detection of a first state of a third clock signal on condition that the switching-trigger signal is active, and which makes active and outputs a third detection signal on detection of a second state of the third clock signal on condition that the switching-trigger signal is active. The before-switching clock processing unit makes active and outputs the first clock-stop-permission signal on condition that one of the first and second detection signals is active. Also, the before-switching clock processing unit makes active and outputs the second clock-stop-permission signal on condition that the third detection signal is active. The after-switching clock processing unit includes a second high-frequency clock processing subunit which makes active and outputs a fourth detection signal on detection of a first state of a fourth clock signal on condition that the first clock-stop-permission signal is active, and which makes active and outputs a fifth detection signal on detection of a second state of the fourth clock signal on condition that the second clock-stop-permission signal is active. Also, the after-switching clock processing unit includes a second low-frequency clock processing subunit which makes active and outputs a sixth detection signal on detection of a first state of a fifth clock signal on condition that the first clock-stop-permission signal is active, and which makes active and outputs a seventh detection signal on detection of a second state of the fifth clock signal on condition that the second clock-stop-permission signal is active. The after-switching clock processing unit makes active and outputs the clock-resume-permission signal on condition that one of the fourth to seventh detection signals is active.

Next, the effects which the representative embodiment achieves is briefly as follows.

The first effect is that a technique for switching between clock signals having different frequencies at a high speed can be provided. The second effect is that it is possible to achieve a high-speed switching between clocks having different frequencies with no increase in the circuit scale.

BRIEF DESCRIPTION OF THE DRAWINGS

FIG. 12 is a diagram showing a truth table for explaining an operation of a first clock-select unit of the clock-control-signal-generation circuit;

FIG. 13 is a diagram showing a truth table for explaining an operation of a second clock-select unit of the clock-control-signal-generation circuit;

FIG. 15 is a diagram showing a truth table for explaining an operation of a first clock-select unit of the clock-control-signal-generation circuit;

FIG. 16 is a diagram showing a truth table for explaining an operation of a second clock-select unit of the clock-control-signal-generation circuit;

FIG. 25 is a block diagram showing an example of the configuration of a microcomputer system in connection with the invention.

1. DETAILED DESCRIPTION OF THE PREFERRED EMBODIMENTS

Figure 1:
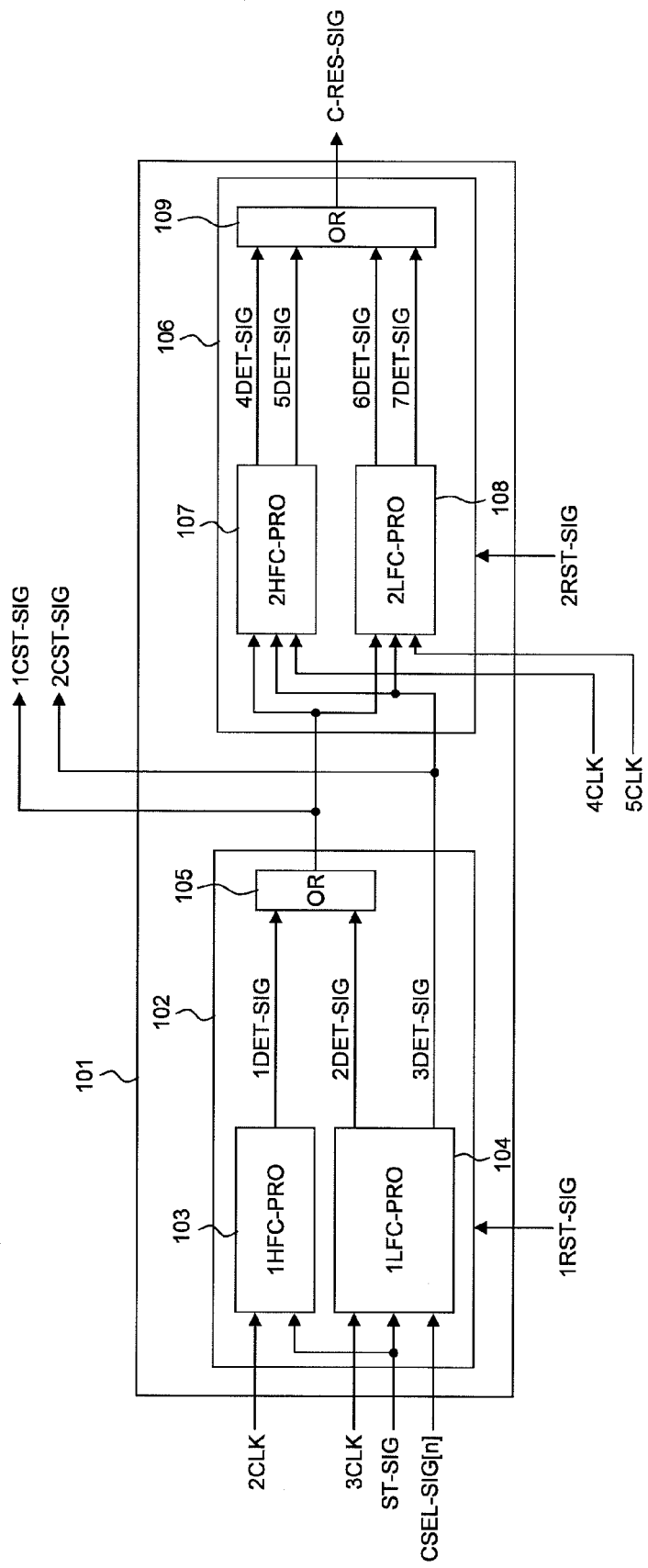
FIG. 1 is a block diagram showing an example of the configuration of a clock-control-signal-generation circuit in connection with the invention.

Of the embodiments of the invention herein disclosed, the representative embodiment will be outlined first. Here, the reference numerals and the like for reference to the drawings, which are accompanied with paired round brackets, only exemplify what the concepts of members and elements referred to by the numerals, and the like contain.

[1] The clock-control-signal-generation circuit (101) according to the representative embodiment of the invention generates a control signal for clock switching, and is placed in a clock selector operable to switch between clock signals including a first clock signal based on first and second clock-stop-permission signals and a clock-resume-permission signal. The clock-control-signal-generation circuit includes: a before-switching clock processing unit (102); and an after-switching clock processing unit (106).

The before-switching clock processing unit (102) includes a first high-frequency clock processing subunit (103) which makes active and outputs a first detection signal on detection of a first state of a second clock signal on condition that a switching-trigger signal is active. In addition, the before-switching clock processing unit (102) includes a first low-frequency clock processing subunit (104) which makes active and outputs a second detection signal on detection of a first state of a third clock signal on condition that the switching-trigger signal is active, and which makes active and outputs a third detection signal on detection of a second state of the third clock signal on condition that the switching-trigger signal is active. Further, the before-switching clock processing unit (102) makes active and outputs the first clock-stop-permission signal on condition that one of the first and second detection signals is active, and the before-switching clock processing unit makes active and outputs the second clock-stop-permission signal on condition that the third detection signal is active.

The after-switching clock processing unit (106) includes a second high-frequency clock processing subunit (107) which makes active and outputs a fourth detection signal on detection of a first state of a fourth clock signal on condition that the first clock-stop-permission signal is active, and which makes active and outputs a fifth detection signal on detection of a second state of the fourth clock signal on condition that the second clock-stop-permission signal is active. The after-switching clock processing unit (106) further includes a second low-frequency clock processing subunit (108) which makes active and outputs a sixth detection signal on detection of a first state of a fifth clock signal on condition that the first clock-stop-permission signal is active, and which makes active and outputs a seventh detection signal on detection of a second state of the fifth clock signal on condition that the second clock-stop-permission signal is active. Moreover, the after-switching clock processing unit (106) makes active and outputs the clock-resume-permission signal on condition that one of the fourth to seventh detection signals is active.

As described above, a factor obstructive to the speedup of clock switching is a processing time in the case of using a low-frequency clock. Hence, the before-switching clock processing unit (102) and the after-switching clock processing unit (106) each have a high-frequency clock processing subunit and a low-frequency clock processing subunit as processing subunits for exclusive use. The high-frequency clock processing subunit and the low-frequency clock processing subunit take partial charges of processing of clock signals involved in the switching respectively, whereby the processing is speeded up. Thus, the speedup of switching between clock signals can be achieved.

[2] The clock-control-signal-generation circuit as described in [1] may further include a first clock-select unit (202) and a second clock-select unit (203).

The first clock-select unit (202) accepts inputs of a first clock group of clock signals, and a second clock group of clock signals lower than the first clock group of clock signals in frequency. Then, the first clock-select unit (202) selects one clock signal from among the first clock group to output the selected clock signal as the second clock signal according to a value of current-select signal, selects one clock signal from among the second clock group to output the selected clock signal as the third clock signal according to a value of the current-select signal, and outputs one of a signal produced based on the second clock signal and a signal produced based on the third clock signal, as the first clock signal.

The second clock-select unit (203) accepts inputs of the first and second clock groups, selects one clock signal from among the first clock group to output the selected clock signal as the fourth clock signal according to a value of a new-select signal, and selects one clock signal from among the second clock group to output the selected clock signal as the fifth clock signal according to a value of the new-select signal.

As the first clock-select unit (202), and the second clock-select unit (203) are provided, the clock-control-signal-generation circuit (101) can be shared for more than one clock inputs. Therefore, even if clock signals to select are increased in kind or number, the increase can be readily handled only by increasing the clock-select numbers of the first clock-select unit (202) and the second clock-select unit (203). Hence, the increase of the circuit scale can be averted.

[3] In regard to the clock-control-signal-generation circuit as described in [1], the first high-frequency clock processing subunit may includes a logic (501, 502) working on detection of a first state of the second clock signal. The first low-frequency clock processing subunit may includes a logic (507) working on detection of a first state of the third clock signal, and a logic (508) working on detection of a second state of the third clock signal. The second high-frequency clock processing subunit may includes a logic (510,511) working on detection of a first state of the fourth clock signal, and a logic (512, 513) working on detection of a second state of the fourth clock signal.

In addition, the second low-frequency clock processing subunit may includes a logic (514, 515) working on detection of a first state of the fifth clock signal, and a logic (516, 517) working on detection of a second state of the fifth clock signal.

With the clock-control-signal-generation circuit arranged as described above, the first state of the second clock signal is a falling edge of the second clock signal; the first state of the third clock signal is a logic Low level of the third clock signal; the second state of the third clock signal is a logic High level of the third clock signal; and the first state of the fourth clock signal is a falling edge of the fourth clock signal. In addition, the second state of the fourth clock signal is a rising edge of the fourth clock signal; the first state of the fifth clock signal is a rising edge of the fifth clock signal; and the second state of the fifth clock signal is a falling edge of the fifth clock signal.

[4] The clock-control-signal-generation circuit as described in [3] may have a first clock-select unit (202a), and a second clock-select unit (203).

The first clock-select unit (202a) accepts inputs of a first clock group of clock signals and a second clock group of clock signals lower than the first clock group of clock signals in frequency. Further, the first clock-select unit (202a) selects one clock signal from among the first clock group to output the selected clock signal as the second clock signal according to a value of a current-select signal, and selects one clock signal from among the second clock group to output the selected clock signal as the third clock signal according to a value of the current-select signal, and outputs, as the first clock signal, one of signals produced by delaying the second and third clock signals by a given time.

The second clock-select unit (203) accepts inputs of the first and second clock groups, selects one clock signal from among the first clock group to output the selected clock signal as the fourth clock signal according to a value of a new-select signal, and selects one clock signal from among the second clock group to output the selected clock signal as the fifth clock signal according to a value of the new-select signal.

[5] In regard to the clock-control-signal-generation circuit as described in [1], the first high-frequency clock processing subunit may include a logic (801, 802) working on detection of a first state of the second clock signal. The first low-frequency clock processing subunit may include a logic (803, 804) working on detection of a first state of the third clock signal, and a logic (805, 806) working on detection of a second state of the third clock signal. The second high-frequency clock processing subunit may include a logic (810, 811) working on detection of a first state of the fourth clock signal, and a logic (812, 813) working on detection of the second state of the fourth clock signal. The second low-frequency clock processing subunit may include a (814, 815) working on detection of a first state of the fifth clock signal, and a logic (816, 817) working on detection of a second state of the fifth clock signal.

With the clock-control-signal-generation circuit arranged as described above, the first state of the second clock signal is a falling edge of the second clock signal; the first state of the third clock signal is a falling edge of the third clock signal; the second state of the third clock signal is a rising edge of the third clock signal; and the first state of the fourth clock signal is a falling edge of the fourth clock signal. In addition, the second state of the fourth clock signal is a rising edge of the fourth clock signal; the first state of the fifth clock signal is a falling edge of the fifth clock signal; and the second state of the fifth clock signal is a rising edge of the fifth clock signal.

[6] The clock-control-signal-generation circuit as described in [5] may include a first clock-select unit (202b), and a second clock-select unit (203).

The first clock-select unit (202b) accepts inputs of a first clock group of clock signals and a second clock group of clock signals lower than the first clock group of clock signals in frequency. Then, the first clock-select unit (202b) selects one clock signal from among the first clock group to output the selected clock signal as the second clock signal according to a value of a current-select signal, and selects one clock signal from among the second clock group to output the selected clock signal as the third clock signal according to a value of the current-select signal, and outputs one of the second and third clock signals as the first clock signal.

The second clock-select unit (203) accepts inputs of the first and second clock groups, selects one clock signal from among the first clock group to output the selected clock signal as the fourth clock signal according to a value of a new-select signal, and selects one clock signal from among the second clock group to output the selected clock signal as the fifth clock signal according to a value of the new-select signal.

[7] According to another embodiment of the invention, a clock selector (301) including the clock-control-signal-generation circuit (201) as described in [2] may be arranged. In this case, the clock selector (301) may have a gating control unit (302). The gating control unit (302) makes nonactive and outputs a first gating-control signal on condition that the first clock-stop-permission signal is active, and the clock-resume-permission signal is nonactive, and makes nonactive and outputs a second gating-control signal on condition that the second clock-stop-permission signal is active and the clock-resume-permission signal is nonactive. Further, the clock selector (301) may include a clock-gating unit (303). The clock-gating unit outputs an output clock signal fixed at a logic Low level on condition that the first gating-control signal is nonactive. Further, the clock-gating unit outputs the output clock signal fixed at a logic High level on condition that the second gating-control signal is nonactive. Moreover, the clock-gating unit outputs the first clock signal as the output clock signal on condition that the first and second gating-control signals are both active. The clock selector (301) may also include a first select-signal-holding unit (304) which holds a value of a clock-select signal and outputs the clock-select signal as the new-select signal in response to change of the switching-trigger signal from nonactive to active. In addition, the clock selector (301) may have a second select-signal-holding unit (305) which holds a value of the new-select signal and outputs the new-select signal as the current-select signal after an elapse of a given time following change of one of the first and second gating-control signals from active to nonactive.

[8] According to another embodiment of the invention, a clock selector including the clock-control-signal-generation circuit as described in [4] may be arranged. Further, the clock selector has a gating control unit (1701) which makes nonactive and outputs a first gating-control signal on condition that the first clock-stop-permission signal is active, and the clock-resume-permission signal is nonactive, and which makes nonactive and outputs a second gating-control signal on condition that the second clock-stop-permission signal is active and the clock-resume-permission signal is nonactive.

In addition, the clock selector may have a clock-gating unit (1702) which outputs an output clock signal fixed at a logic Low level on condition that the first gating-control signal is nonactive, which outputs the output clock signal fixed at a logic High level on condition that the second gating-control signal is nonactive, and which outputs the first clock signal as the output clock signal on condition that the first and second gating-control signals are both active.

The clock selector may further include a first select-signal-holding unit (1703) and a second select-signal-holding unit (1704). The first select-signal-holding unit holds a value of a clock-select signal and outputs the clock-select signal as the new-select signal in response to change of the switching-trigger signal from nonactive to active. The second select-signal-holding unit holds a value of the new-select signal and outputs the new-select signal as the current-select signal after an elapse of a given time following change of one of the first and second gating-control signals from active to nonactive.

[9] According to another embodiment of the invention, a clock selector including the clock-control-signal-generation circuit as described in [6] may be arranged. In this case, the clock selector may have a gating control unit (1901). The gating control unit makes nonactive and outputs a first gating-control signal on condition that the first clock-stop-permission signal is active, and the clock-resume-permission signal is nonactive, and which makes nonactive and outputs a second gating-control signal on condition that the second clock-stop-permission signal is active and the clock-resume-permission signal is nonactive.

Also, the clock selector may have a clock-gating unit (1902). The clock-gating unit outputs an output clock signal fixed at a logic Low level on condition that the first gating-control signal is nonactive, which outputs the output clock signal fixed at a logic High level on condition that the second gating-control signal is nonactive, and which outputs the first clock signal as the output clock signal on condition that the first and second gating-control signals are both active.

Further, the clock selector may have a first select-signal-holding unit (1903) which holds a value of a clock-select signal and outputs the clock-select signal as the new-select signal in response to change of the switching-trigger signal from nonactive to active.

In addition, the clock selector may have a second select-signal-holding unit (1904) which holds a value of the new-select signal and outputs the new-select signal as the current-select signal after an elapse of a given time following change of one of the first and second gating-control signals from active to nonactive.

[10] According to another embodiment of the invention, a data processor (2501) including the clock selector as described in [8], and a functional module (2529) which works in synchronization with a clock signal output by the clock selector may be arranged.

[11] Further, According to another embodiment of the invention, a data processor (2501) including the clock selector as described in [9], and a functional module (2529) which works in synchronization with a clock signal output by the clock selector may be arranged.

In the data processor including the clock selector as described in [8] or [9], the clock selector enables a high-speed clock switching. Therefore, the time required for the data processor to shift from the power-saving mode to the high-speed operation mode can be shortened significantly. Consequently, the standby time, during which a high-frequency clock source consuming a large amount of power must be kept working, can be shortened, which can make a contribution to the reduction in the power consumption by a device like this.

2. FURTHER DETAILED DESCRIPTION OF THE PREFERRED EMBODIMENTS

The preferred embodiments will be described further in detail.

Now, it is noted that in the description below, the logic level "Low" is equivalent to the logic value "0", and High is equivalent to the logic value "1".

<First Embodiment>

FIG. 1 shows an example of the configuration of a clock-control-signal-generation circuit according to the invention.

The clock-control-signal-generation circuit 101 shown in FIG. 1 has a before-switching clock processing unit 102, and an after-switching clock processing unit 106. Further, the before-switching clock processing unit 102 includes a first high-frequency clock processing subunit (1HFC-PRO) 103, a first low-frequency clock processing subunit (1LFC-PRO) 104, and an OR circuit 105. The after-switching clock processing unit 106 includes a second high-frequency clock processing subunit (2HFC-PRO) 107, a second low-frequency clock processing subunit (2LFC-PRO) 108, and an OR circuit 109.

The clock-control-signal-generation circuit 101 accepts inputs of: a second clock signal 2CLK; a third clock signal 3CLK; a fourth clock signal 4CLK; a fifth clock signal 5CLK; a switching-trigger signal ST-SIG; a current-select signal CSEL-SIG[n]; a first reset signal 1RST-SIG; and a second reset signal 2RST-SIG. The clock-control-signal-generation circuit 101 outputs a first clock-stop-permission signal 1CST-SIG, a second clock-stop-permission signal 2CST-SIG, and a clock-resume-permission signal C-RES-SIG.

The second clock signal 2CLK and the fourth clock signal 4CLK have relatively high frequencies different from each other. The third clock signal 3CLK and the fifth clock signal 5CLK have relatively low frequencies different from each other. The third and fifth clock signals 3CLK and 5CLK are lower than the second and fourth clock signals 2CLK and 4CLK in frequency. The clock-control-signal-generation circuit 101 takes in one of the second clock signal 2CLK of the relatively high frequency and the third clock signal 3CLK of the relatively low frequency; the second and third clock signals are never supplied to the clock-control-signal-generation circuit concurrently. Likewise, the clock-control-signal-generation circuit 101 takes in one of the fourth clock signal 4CLK of the relatively high frequency and the fifth clock signal 5CLK of the relatively low frequency; the fourth and fifth clock signals are never supplied to the clock-control-signal-generation circuit concurrently.

The change of the switching-trigger signal ST-SIG from a nonactive state to an active state signifies the occurrence of an event of clock switching. In response to the change, the clock-control-signal-generation circuit 101 starts a process for changing one of the first and second clock-stop-permission signals 1CST-SIG and 2CST-SIG from nonactive to active. Then, the clock-control-signal-generation circuit 101 performs a process for changing the clock-resume-permission signal C-RES-SIG from nonactive to active.

With the switching-trigger signal ST-SIG in the active state, and the second clock signal 2CLK supplied to the clock-control-signal-generation circuit 101, the first high-frequency clock processing subunit 103 makes active and outputs a first detection signal 1DET-SIG on detection of a first state of the second clock signal 2CLK.

Further, with the switching-trigger signal ST-SIG in the active state, and the third clock signal 3CLK supplied to the clock-control-signal-generation circuit 101, the first low-frequency clock processing subunit 104 makes active and outputs a second detection signal 2DET-SIG on detection of a first state of the third clock signal 3CLK, whereas on detection of a second state of the third clock signal 3CLK, the first low-frequency clock processing subunit 104 makes active and outputs a third detection signal 3DET-SIG.

Now, it is noted that the periods during which the first, second and third detection signals 1DET-SIG, 2DET-SIG, and 3DET-SIG stay in the active states respectively never overlap.

The before-switching clock processing unit 102 makes active and outputs the first clock-stop-permission signal 1CST-SIG with the aid of the OR circuit 105, on condition that the first detection signal 1DET-SIG or second detection signal 2DET-SIG stays in the active state. However, in the case of the third detection signal 3DET-SIG in the active state, the before-switching clock processing unit 102 makes active and outputs the second clock-stop-permission signal 2CST-SIG.

Further, on condition that the first clock-stop-permission signal 1CST-SIG is active, and the fourth clock signal 4CLK is supplied to the clock-control-signal-generation circuit 101, the second high-frequency clock processing subunit 107 makes active and outputs the fourth detection signal 4DET-SIG on detection of a first state of the fourth clock signal 4CLK. Still further, on condition that the second clock-stop-permission signal 2CST-SIG is active, and the fourth clock signal 4CLK is supplied to the clock-control-signal-generation circuit 101, the second high-frequency clock processing subunit 107 makes active and outputs the fifth detection signal 5DET-SIG on detection of a second state of the fourth clock signal 4CLK.

Moreover, on condition that the first clock-stop-permission signal 1CST-SIG is active, and the fifth clock signal 5CLK is supplied to the clock-control-signal-generation circuit 101, the second low-frequency clock processing subunit 108 makes active and outputs the sixth detection signal 6DET-SIG on detection of a first state of the fifth clock signal 5CLK. Further, on condition that the second clock-stop-permission signal 2CST-SIG is active, and the fifth clock signal 5CLK is supplied to the clock-control-signal-generation circuit 101, the second low-frequency clock processing subunit 108 makes active and outputs the seventh detection signal 7DET-SIG on detection of a second state of the fifth clock signal 5CLK.

Now, it is noted that the periods during which the fourth, fifth, sixth and seventh detection signals 4DET-SIG, 5DET-SIG, 6DET-SIG, and 7DET-SIG stay in the active states respectively never overlap one another.

The after-switching clock processing unit 106 makes active and outputs the clock-resume-permission signal C-RES-SIG with the aid of the OR circuit 109, on condition that one of the fourth, fifth, sixth, and seventh detection signals 4DET-SIG, 5DET-SIG, 6DET-SIG, and 7DET-SIG is active.

As described above, on condition that the switching-trigger signal ST-SIG is active, the clock-control-signal-generation circuit 101 makes active and outputs one of the first and second clock-stop-permission signals 1CST-SIG and 2CST-SIG based on the state of the second clock signal 2CLK or third clock signal 3CLK, with the aid of the before-switching clock processing unit 102. Further, on condition that the first or second clock-stop-permission signal 1CST-SIG or 2CST-SIG is active, the clock-control-signal-generation circuit 101 makes active and outputs the clock-resume-permission signal C-RES-SIG based on the state of the fourth clock signal 4CLK or fifth clock signal 5CLK, with the aid of the after-switching clock processing unit 106.

After having finished a sequence of the steps as described above, the first and second reset signals 1RST-SIG and 2RST-SIG are changed from nonactive to active. The change of the first reset signal 1RST-SIG to the active state initializes the internal circuits of the first high-frequency clock processing subunit 103 and first low-frequency clock processing subunit 104. Further, the change of the second reset signal 2RST-SIG to the active state initializes the internal circuits of the second high-frequency clock processing subunit 107 and second low-frequency clock processing subunit 108.

Whether or not to use the current-select signal CSEL-SIG [n] input to the first low-frequency clock processing subunit 104 is conditional on the internal configuration of the first low-frequency clock processing subunit 104. The use of the current-select signal CSEL-SIG[n] will be described below.

<Second Embodiment>

Figure 2:
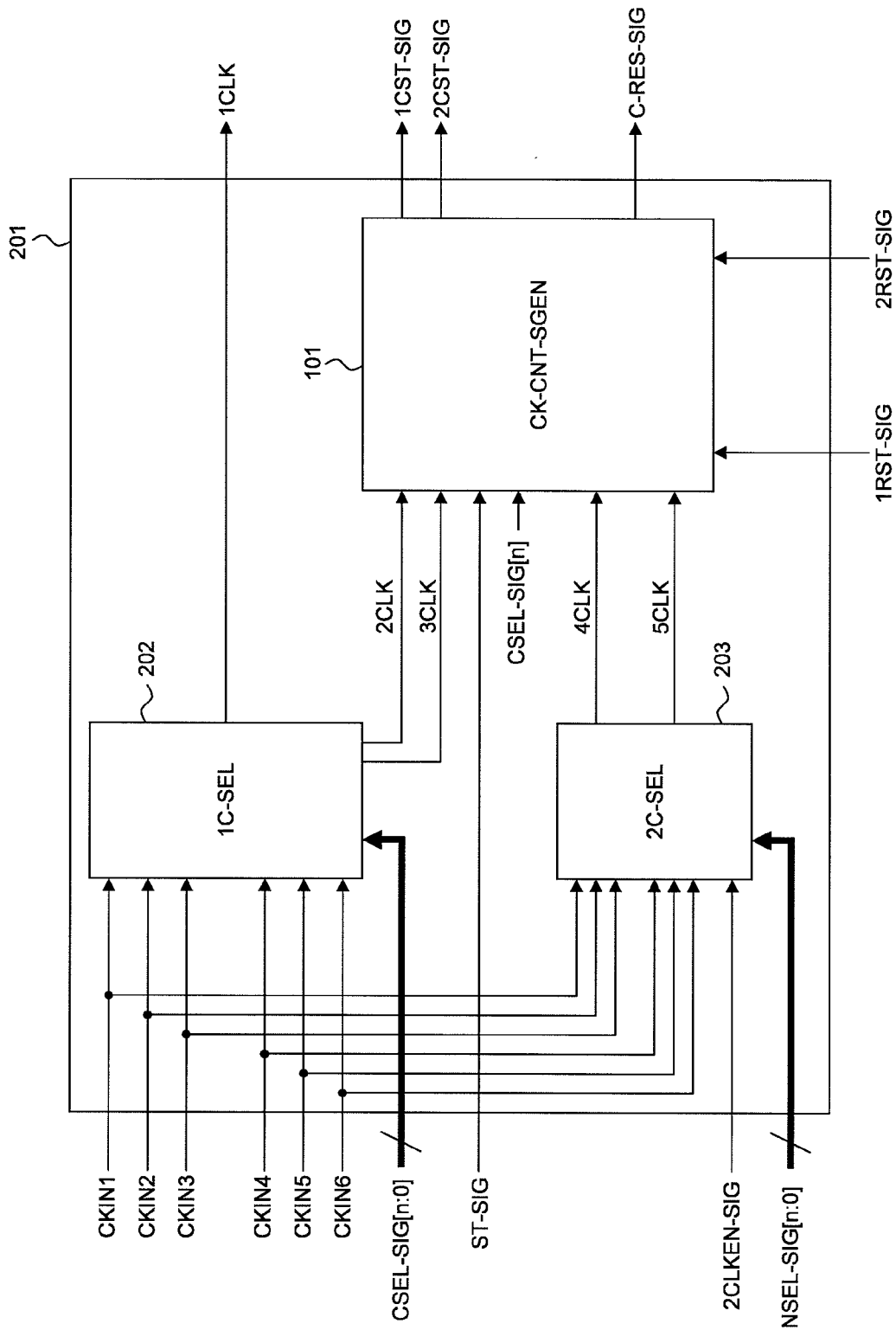
FIG. 2 is a block diagram showing an example of the configuration of a modification of the clock-control-signal-generation circuit in connection with the invention.

FIG. 2 shows an example of the configuration of a modification of the clock-control-signal-generation circuit 101. The clock-control-signal-generation circuit shown in FIG. 2 has a first clock-select unit (1C-SEL) 202 and a second clock-select unit (2C-SEL) 203 in addition to the clock-control-signal-generation circuit (CK-CNT-SGEN) 101, which has been described in connection with the first embodiment. From this, the clock-control-signal-generation circuit shown in FIG. 2 shall be herein referred to as "select-type clock-control-signal-generation circuit 201".

The select-type clock-control-signal-generation circuit 201 accepts inputs of: a plurality of clock signals, i.e. input clock signals CKIN1 to CKIN6; a current-select signal CSEL-SIG[n:0] of n+1 bits (n is a positive integer); a new-select signal NSEL-SIG[n:0] of n+1 bits; a switching-trigger signal ST-SIG; a second clock-select-unit-enable signal 2CLKEN-SIG; a first reset signal 1RST-SIG; and a second reset signal 2RST-SIG. The select-type clock-control-signal-generation circuit 201 outputs: a first clock signal 1CLK; a first clock-stop-permission signal 1CST-SIG; a second clock-stop-permission signal 2CST-SIG; and a clock-resume-permission signal C-RES-SIG.

The input clock signals CKIN1, CKIN2 and CKIN3 have relatively high frequencies different from one another, and are classified as a high-frequency clock group.

The input clock signals CKIN4, CKIN5 and CKIN6 have relatively low frequencies different from one another, and are classified as a low-frequency clock group.

The current-select signal CSEL-SIG[n:0] of n+1 bits serves to indicate, to the first clock-select unit 202, which of the input clock signals CKIN1 to CKIN6 to select and output.

The new-select signal NSEL-SIG[n:0] of n+1 bits serves to indicate, to the second clock-select unit 203, which of the input clock signals CKIN1 to CKIN6 to select and output.

The example of FIG. 2 is based on the assumption that the number of input clocks, i.e. input clock signals CKIN1 to CKIN6, is six, in which the current-select signal CSEL-SIG, and the new-select signal NSEL-SIG are both a 3-bit signal (n=2), but they indicate different values. The number of clock signals input to the select-type clock-control-signal-generation circuit 201 is not limited to six, and the number of bits of the current-select signal CSEL-SIG[n:0], and new-select signal NSEL-SIG[n:0], i.e. the value of n, is varied depending on the number of input clocks.

In the case of the current-select signal CSEL-SIG of three bits directing the first clock-select unit 202 to select a clock from the high-frequency clock group, the first clock-select unit 202 selects one clock signal from among the input clock signals CKIN1, CKIN2 and CKIN3 according to the value of the current-select signal CSEL-SIG of three bits, and outputs the selected clock signal as the second clock signal 2CLK. Further, in the case of the current-select signal CSEL-SIG of three bits directing the first clock-select unit 202 to select a clock from the low-frequency clock group, the first clock-select unit 202 selects one clock signal from among the input clock signals CKIN4 to CKIN6 according to the value of the current-select signal CSEL-SIG of three bits, and outputs the selected clock signal as the third clock signal 3CLK. Also, the first clock-select unit 202 outputs, as the first clock signal 1CLK, one of a signal based on the second clock signal 2CLK, and a signal based on the third clock signal 3CLK. As already described in connection with the first embodiment, both of the second and third clock signals 2CLK and 3CLK are never output concurrently, and only one of the second and third clock signals 2CLK and 3CLK is output as a clock at all times.

On condition that the second clock-select-unit-enable signal 2CLKEN-SIG is active, and the new-select signal NSEL-SIG of three bits directs the second clock-select unit 203 to select a clock signal from the high-frequency clock group, the second clock-select unit 203 selects one of the input clock signals CKIN1, CKIN2, and CKIN3 according to the value of the new-select signal NSEL-SIG of three bits, and outputs the selected clock signal as the fourth clock signal 4CLK. On condition that the new-select signal NSEL-SIG of three bits directs the second clock-select unit 203 to select a clock signal from the low-frequency clock group, the second clock-select unit 203 likewise selects one of the input clock signals CKIN4, CKIN5 and CKIN6 according to the value of the new-select signal NSEL-SIG of three bits, and outputs the selected clock signal as the fifth clock signal 5CLK. Also, in the cases, as already described in connection with the first embodiment, both of the fourth and fifth clock signals 4CLK and 5CLK are never output concurrently, and only one of the fourth and fifth clock signals 4CLK and 5CLK is output as a clock at all times.

The clock-control-signal-generation circuit 101 outputs the first clock-stop-permission signal 1CST-SIG, the second clock-stop-permission signal 2CST-SIG, and the clock-resume-permission signal C-RES-SIG according to the action steps which have been described in connection with the first embodiment. The output of the signals is performed based on the switching-trigger signal ST-SIG, the second clock signal 2CLK and the third clock signal 3CLK, which are selectively output by the first clock-select unit 202 and the fourth clock signal 4CLK and the fifth clock signal 5CLK, which are selectively output by the second clock-select unit 203.

<Third Embodiment>

Figure 3:
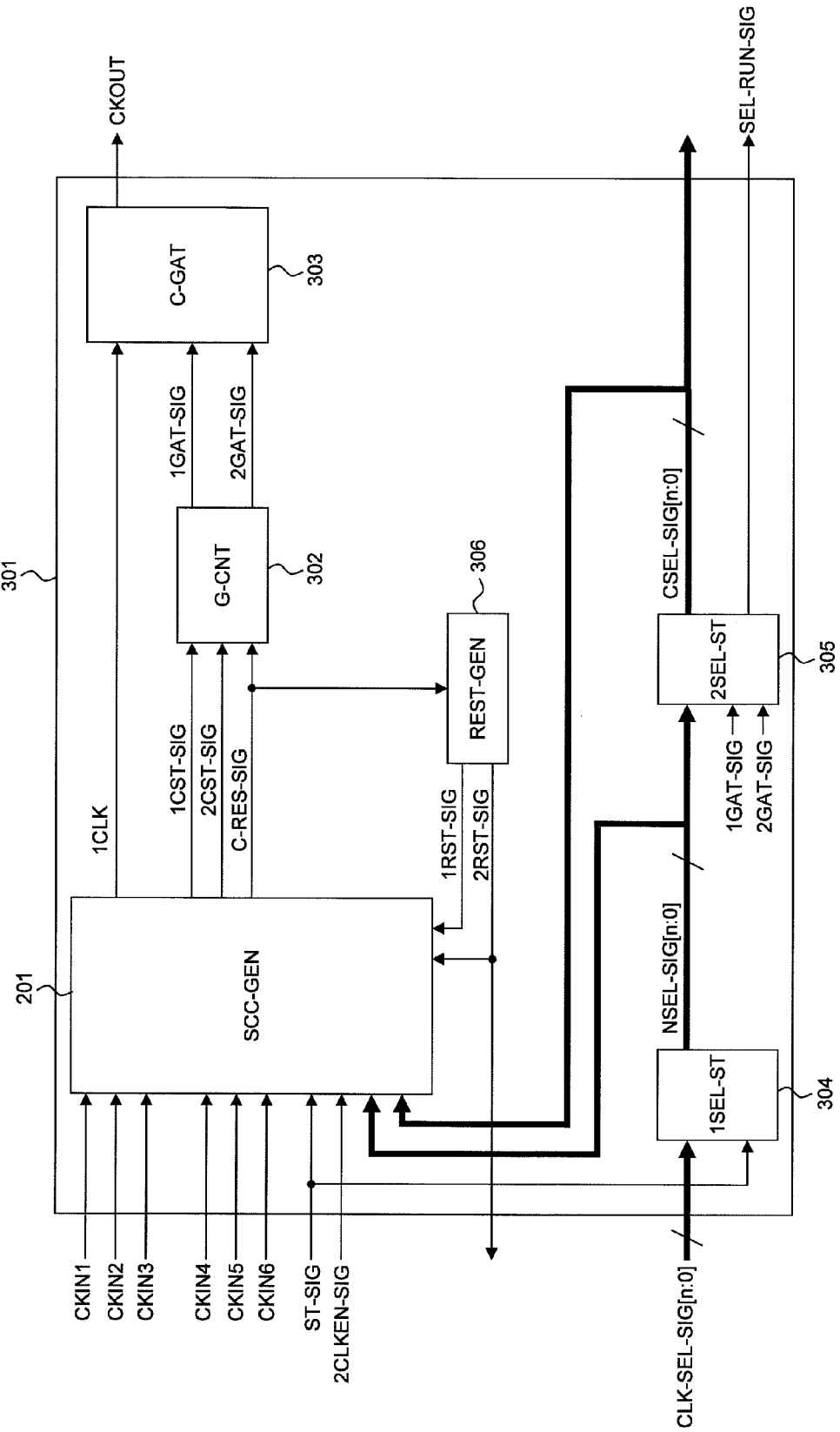
FIG. 3 is a block diagram showing an example of the configuration of a clock selector in connection with the invention.

FIG. 3 shows an example of the basic configuration of a clock selector in connection with the invention.

The clock selector 301 shown in FIG. 3 has: the select-type clock-control-signal-generation circuit (SCC-GEN) 201, which has been described in connection with the second embodiment; a gating control unit (G-CNT) 302; a clock-gating unit (C-GAT) 303; a first select-signal-holding unit (1SEL-ST) 304; a second select-signal-holding unit (2SEL-ST) 305; and a reset-signal-generation unit (REST-GEN) 306.

The clock selector 301 accepts inputs of: a plurality of clock signals (input clock signals CKIN1 to CKIN6); a clock-select signal of n+1 bits; a switching-trigger signal ST-SIG; and a second clock-select-unit-enable signal 2CLKEN-SIG. Also, the clock selector 301 outputs: an output clock signal CKOUT; a current-select signal CSEL-SIG[n:0] of n+1 bits; a switching-run signal SEL-RUN-SIG; and a second reset signal 2RST-SIG.

The clock-select signal of n+1 bits serves to indicate, to the clock selector 301, which of the input clock signals CKIN1 to CKIN6 to select and output. In switching the clock, the value of the clock-select signal of n+1 bits is updated to a value indicating a clock to select after switching from a value indicating a clock to select before switching before the switching-trigger signal ST-SIG is changed from nonactive to active.

The example of FIG. 3 is based on the assumption that the number of input clocks, i.e. input clock signals CKIN1 to CKIN6, is six, as in the example of FIG. 2. Therefore, in this example, the clock-select signal is made up of three bits (n=2) like the current-select signal CSEL-SIG[n:0] of n+1 bits, and the new-select signal NSEL-SIG[n:0] of n+1 bits, which have been described in connection with the second embodiment. The number of clock signals input to the clock selector 301 is not limited to six, and the number of bits of the clock-select signal, i.e. the value of n, is varied depending on the number of the input clock signals.

The select-type clock-control-signal-generation circuit 201 outputs a first clock signal 1CLK, a first clock-stop-permission signal 1CST-SIG, a second clock-stop-permission signal 2CST-SIG, and a clock-resume-permission signal C-RES-SIG, according to the action steps which have been described in connection with the second embodiment. The output of the signals is performed based on the plurality of input clock signals, i.e. input clock signals CKIN1 to CKIN6, the current-select signal CSEL-SIG of three bits, the new-select signal NSEL-SIG of three bits, the switching-trigger signal ST-SIG, and the second clock-select-unit-enable signal 2CLKEN-SIG.

The gating control unit 302 makes nonactive and outputs the first gating-control signal 1GAT-SIG on condition that the first clock-stop-permission signal 1CST-SIG is active, and the clock-resume-permission signal C-RES-SIG is nonactive. Also, the gating control unit 302 makes nonactive and outputs the second gating-control signal 2GAT-SIG on condition that the second clock-stop-permission signal 2CST-SIG is active, and the clock-resume-permission signal C-RES-SIG is nonactive. Now, it is noted that in the third embodiment, only one of the first gating-control signal 1GAT-SIG and the second gating-control signal 2GAT-SIG is made nonactive; the first and second gating-control signals are never rendered nonactive concurrently.

The clock-gating unit 303 outputs an output clock signal CKOUT with its logic level fixed at Low on condition that the first gating-control signal 1GAT-SIG is nonactive, whereas on condition that the second gating-control signal 2GAT-SIG is nonactive, the clock-gating unit 303 outputs an output clock signal CKOUT with its logic level fixed at High. Further, the clock-gating unit 303 outputs a first clock signal 1CLK as the output clock signal CKOUT on condition that the first and second gating-control signals 1GAT-SIG and 2GAT-SIG are both active.

At the time when the switching-trigger signal ST-SIG is changed from nonactive to active, the first select-signal-holding unit 304 samples and holds a clock-select signal of three bits which has gone through the update from a value indicating a clock to select before switching to a value indicating a clock to select after switching, updates the new-select signal NSEL-SIG of three bits from the value indicating a clock to select before switching to the value indicating a clock to select after switching, and outputs the new-select signal thus updated.

At the time when a given length of time has elapsed since the change of one of the first and second gating-control signals 1GAT-SIG and 2GAT-SIG from active to nonactive, the second select-signal-holding unit 305 samples and holds the new-select signal NSEL-SIG of three bits which has gone through the update from a value indicating a clock to select before switching to a value indicating a clock to select after switching. Then, the second select-signal-holding unit 305 uses the sampled and held value to update the current-select signal CSEL-SIG of three bits from the value indicating a clock to select before switching to the value indicating a clock to select after switching, and outputs the current-select signal CSEL-SIG thus updated.

The reset-signal-generation unit 306 varies a first reset signal 1RST-SIG from nonactive to active after the change of the clock-resume-permission signal C-RES-SIG from nonactive to active. Further, after a given length of time has elapsed, the reset-signal-generation unit 306 changes the second reset signal 2RST-SIG from nonactive to active, and outputs the second reset signal. The first reset signal 1RST-SIG, and the second reset signal 2RST-SIG serve to initialize the internal circuit of the select-type clock-control-signal-generation circuit 201 after the completion of clock switching.

Figure 4:
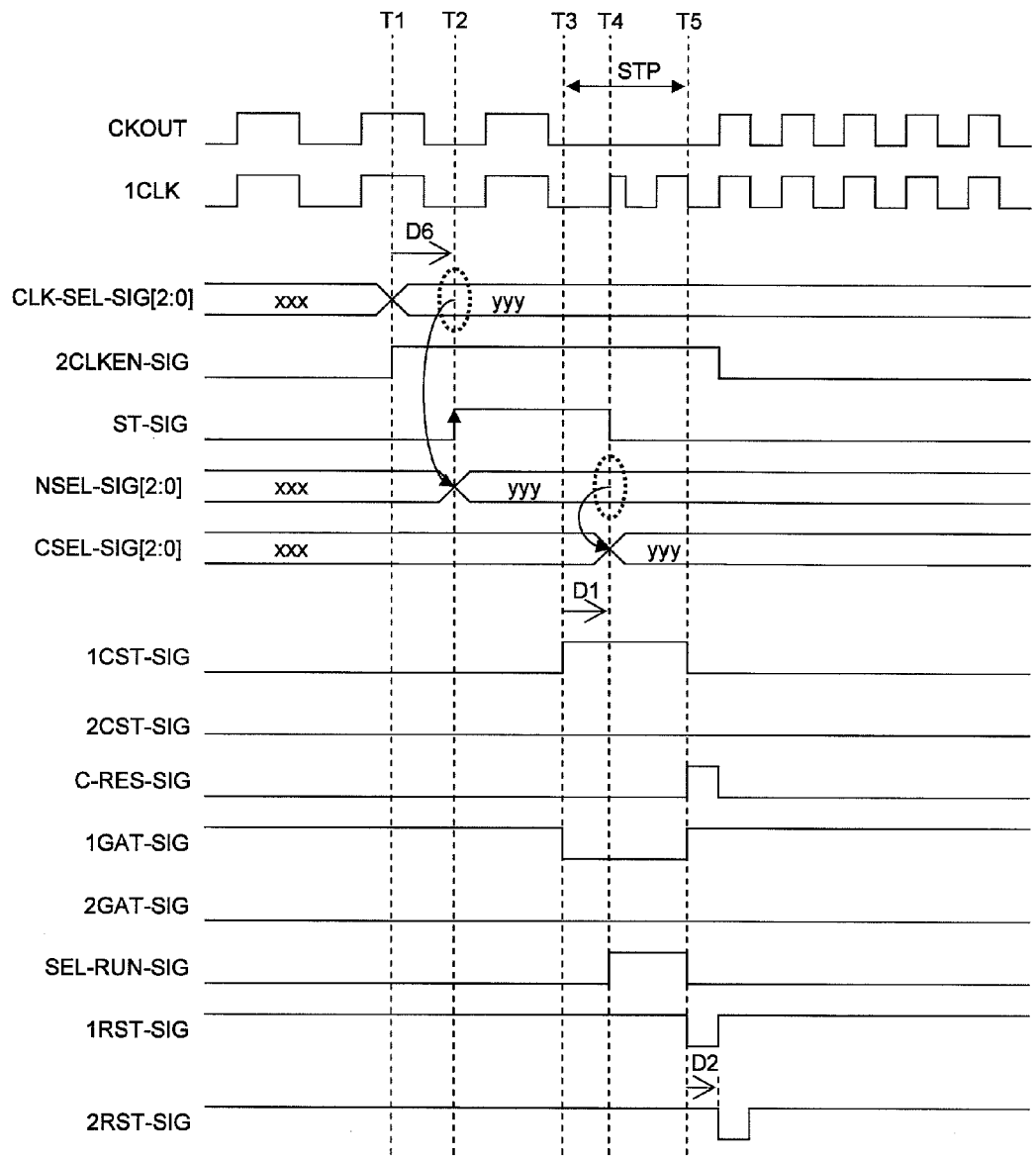
FIG. 4 is a timing chart for explaining an operation of the clock selector shown in FIG. 3.

FIG. 4 shows the timing of an operation of the clock selector 301 when a clock switching event takes place.

Referring to FIG. 4, the flow of the clock switching will be described in connection with actions of the respective blocks of the clock selector 301 participating in the clock switching. In the description below, Times T1 to T5 correspond to the points of time denoted by T1 to T5 in FIG. 4. In addition, the initial states of the first and second clock-stop-permission signals 1CST-SIG and 2CST-SIG, and the clock-resume-permission signal C-RES-SIG are the nonactive state, e.g. the logic Low level, whereas the initial state of the first gating-control signal 1GAT-SIG is active, e.g. the logic High level. Further, the initial state of the second gating-control signal 2GAT-SIG is active, e.g. the logic Low level, and the initial states of the first and second reset signals 1RST-SIG and 2RST-SIG are nonactive, e.g. the logic High level.

At Time T1, the value of a clock-select signal of three bits supplied from the outside is changed from (x,x,x) to (y,y,y), and the second clock-select-unit-enable signal 2CLKEN-SIG is varied from the nonactive state (logic Low level) to the active state (the logic High level).

At Time T2, in a given time (denoted by D6 in FIG. 4) from Time T1, the switching-trigger signal ST-SIG supplied from the outside is changed from nonactive (logic Low level) to active (logic High level). As a result, the first select-signal-holding unit 304 changes the value of a new-select signal NSEL-SIG of three bits from (x,x,x) to (y,y,y). In response to the change, the second clock-select unit 203 starts to output the fourth clock signal 4CLK or fifth clock signal 5CLK corresponding to the value (y,y,y) which the new-select signal NSEL-SIG of three bits indicates. In addition, the before-switching clock processing unit 102 starts processing.

At Time T3, the before-switching clock processing unit 102 detects the logic level of the second clock signal 2CLK or third clock signal 3CLK, and according to the result of the check, changes the first clock-stop-permission signal 1CST-SIG, or second clock-stop-permission signal 2CST-SIG from nonactive (logic Low level) to active (logic High level). Now, it is noted that the description on the operation of the clock selector 301 presented referring to FIG. 4 is based on the assumption that the before-switching clock processing unit 102 detects the logic Low level of the second clock signal 2CLK, or third clock signal 3CLK, and changes the first clock-stop-permission signal 1CST-SIG to the active state.

However, when detecting the logic High level of the second clock signal 2CLK or third clock signal 3CLK, the before-switching clock processing unit 102 turns the second clock-stop-permission signal 2CST-SIG to the active state.

Consequently, the gating control unit 302 changes the first gating-control signal 1GAT-SIG from active (logic High level) to nonactive (logic Low level). However, in this situation, the second gating-control signal 2GAT-SIG is left active (at the logic Low level). Further, in response to this, the clock-gating unit 303 fixes the output clock signal CKOUT at the logic Low level, i.e. executes the step of stopping an output clock (STP). Further, the after-switching clock processing unit 106 starts processing.

At Time T4, in a given time denoted by D1 in FIG. 4 from Time T3, the second select-signal-holding unit 305 changes the value of the current-select signal CSEL-SIG of three bits from (x,x,x) to (y,y,y). Consequently, the first clock-select unit 202 switches the first clock signal 1CLK into an after-switching clock signal corresponding to the value (y,y,y) indicated by the current-select signal CSEL-SIG of three bits, i.e. changes the clock to select.

At Time T5, the after-switching clock processing unit 106 detects the logic Low level of the fourth clock signal 4CLK or fifth clock signal 5CLK, and changes the clock-resume-permission signal C-RES-SIG from nonactive (logic Low level) to active (logic High level). In the operation of the clock selector 301 described referring to FIG. 4, the before-switching clock processing unit 102 has changed the first clock-stop-permission signal 1CST-SIG to active at Time T3, and the clock-resume-permission signal C-RES-SIG is changed to active in response to the detection of the logic Low level of the fourth clock signal 4CLK or fifth clock signal 5CLK. However, on condition that the before-switching clock processing unit 102 has changed the second clock-stop-permission signal 2CST-SIG to active, the clock-resume-permission signal C-RES-SIG is changed to active in response to the detection of the logic High level of the fourth clock signal 4CLK or fifth clock signal 5CLK.

Consequently, the gating control unit 302 changes the first gating-control signal 1GAT-SIG from nonactive (logic Low level) to active (logic High level). In this situation, the second gating-control signal 2GAT-SIG is left active (at the logic Low level). Further, in response to the change, the clock-gating unit 303 turns the output clock signal CKOUT back to the first clock signal 1CLK. That is, the output clock is resumed.

At Time T5, the first reset signal 1RST-SIG is changed from nonactive (logic High level) to active (logic Low level). Then, after elapse of a given time denoted by D2 in FIG. 4, the second reset signal 2RST-SIG is changed from nonactive (logic High level) to active (logic Low level).

The internal circuit of the before-switching clock processing unit 102 is initialized by making active the first reset signal 1RST-SIG, and thus the first clock-stop-permission signal 1CST-SIG is changed back to the nonactive state which is the initial state thereof. After that, the internal circuit of the after-switching clock processing unit 106 is initialized by making active the second reset signal 2RST-SIG, and thus the clock-resume-permission signal C-RES-SIG is changed back to the nonactive state, which is the initial state thereof.

Until Time T3, the clock selector 301 outputs a before-switching clock signal as the output clock signal CKOUT. During the period from Time T3 to T5, the output clock signal CKOUT is controlled to remain stopped. After Time T5, the clock selector 301 outputs an after-switching clock signal as the output clock signal CKOUT.

As to the operation described above, the standby time D6 just before Time T2 is inserted as means for avoiding the execution of the subsequent processing until the value of the clock-select signal of three bits is stabilized. In addition, the standby time D1 just before Time T4 is inserted as means for performing the selective switching to the first clock signal 1CLK after the clock has been stopped.

In the operation described above, at Time T3 the clock-gating unit 303 fixes the output clock signal CKOUT to the logic Low level thereby to stop the clock signal in response to the change of the first gating-control signal 1GAT-SIG to nonactive. However, the clock selector may be arranged so that on condition that the second gating-control signal 2GAT-SIG is made nonactive, the output clock signal CKOUT is fixed to the logic High level thereby to stop the clock signal. That is, on condition that the before-switching clock processing unit 102 detects the logic Low level of the second clock signal 2CLK or third clock signal 3CLK, the clock-gating unit 303 fixes the output clock signal CKOUT to the logic Low level thereby to stop the clock signal. In addition, on condition that the before-switching clock processing unit 102 detects the logic High level of the second clock signal 2CLK or third clock signal 3CLK, the clock-gating unit 303 fixes the output clock signal CKOUT to the logic High level thereby to stop the clock signal.

<Fourth Embodiment>

Figure 5:
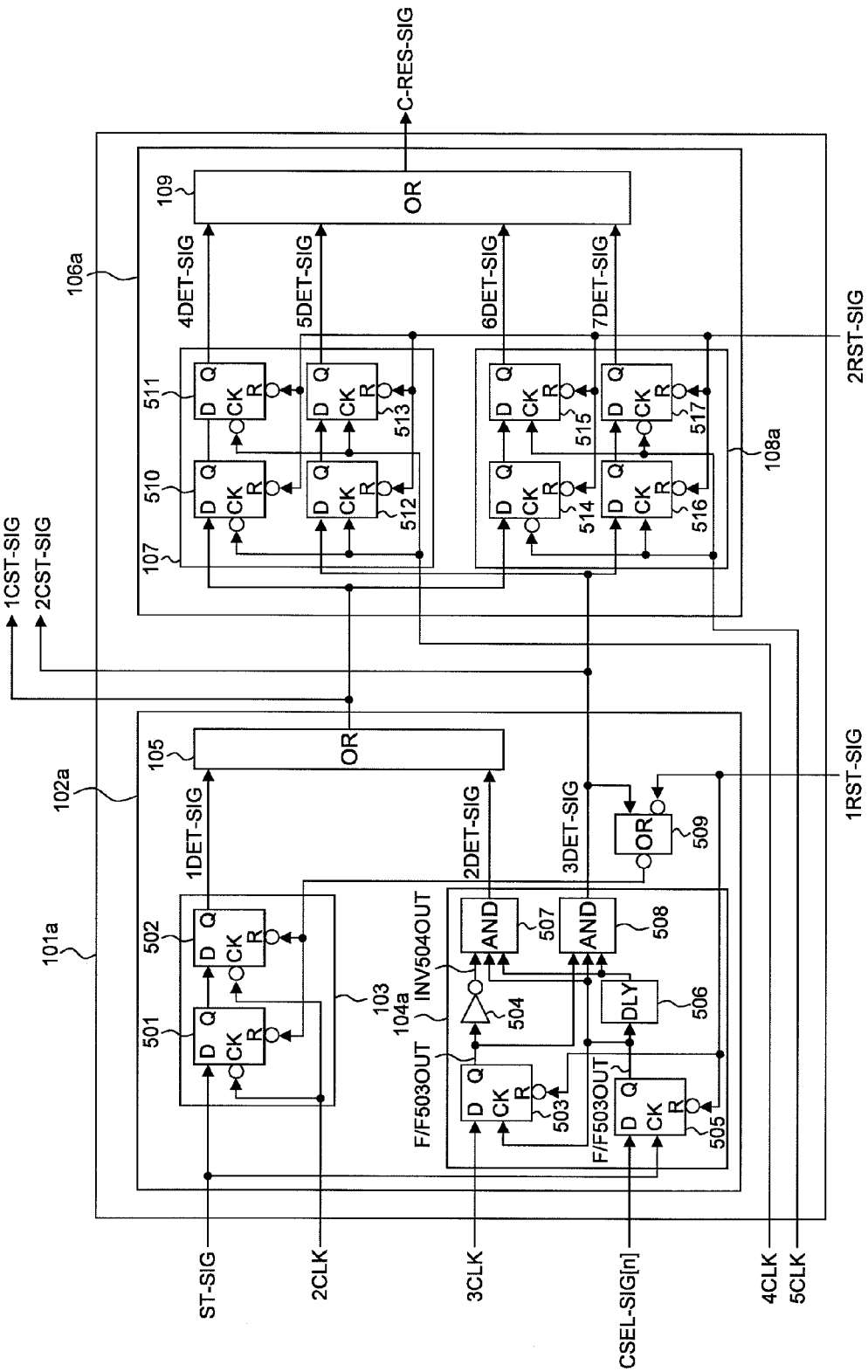
FIG. 5 is a circuit diagram showing a concrete example of the configuration of the clock-control-signal-generation circuit in connection with the invention.

FIG. 5 shows a concrete example of the circuit configuration of the clock-control-signal-generation circuit shown in FIG. 1.

In regard to the clock-control-signal-generation circuit 101a shown in FIG. 5, the first high-frequency clock processing subunit 103 includes a flip-flop 501, and a flip-flop 502. The flip-flop 501 and the flip-flop 502 are connected in series with each other, to which the second clock signal 2CLK is input. Further, to the flip-flop 501, the switching-trigger signal ST-SIG is input. The flip-flop 502 outputs the first detection signal 1DET-SIG. The first low-frequency clock processing subunit 104a includes: flip-flops 503 and 505; an inverter 504; a delay circuit (DLY) 506 with a delay time D3; and AND circuits 507 and 508. The flip-flop 503 is connected to the AND circuit 507 through the inverter 504. The flip-flop 505 is connected to the AND circuits 507 and 508 through the delay circuit 506. The AND circuit 507 outputs the second detection signal 2ST-DET-SIG, whereas the AND circuit 508 outputs the third detection signal 3ST-DET-SIG. The second high-frequency clock processing subunit 107 includes flip-flops 510, 511, 512 and 513. The flip-flops 510 and 511 are connected in series with each other. Likewise, the flip-flops 512 and 513 are connected in series with each other. The flip-flop 512 outputs the fourth detection signal 4DET-SIG, whereas the flip-flop 513 outputs the fifth detection signal 5DET-SIG. The second low-frequency clock processing subunit 108a includes flip-flops 514, 515, 516 and 517. The flip-flops 514 and 515 are connected in series with each other. The flip-flops 516 and 517 are connected in series with each other. The flip-flop 515 outputs the sixth detection signal 6DET-SIG, whereas the flip-flop 517 outputs the seventh detection signal 7DET-SIG.

Figure 6:
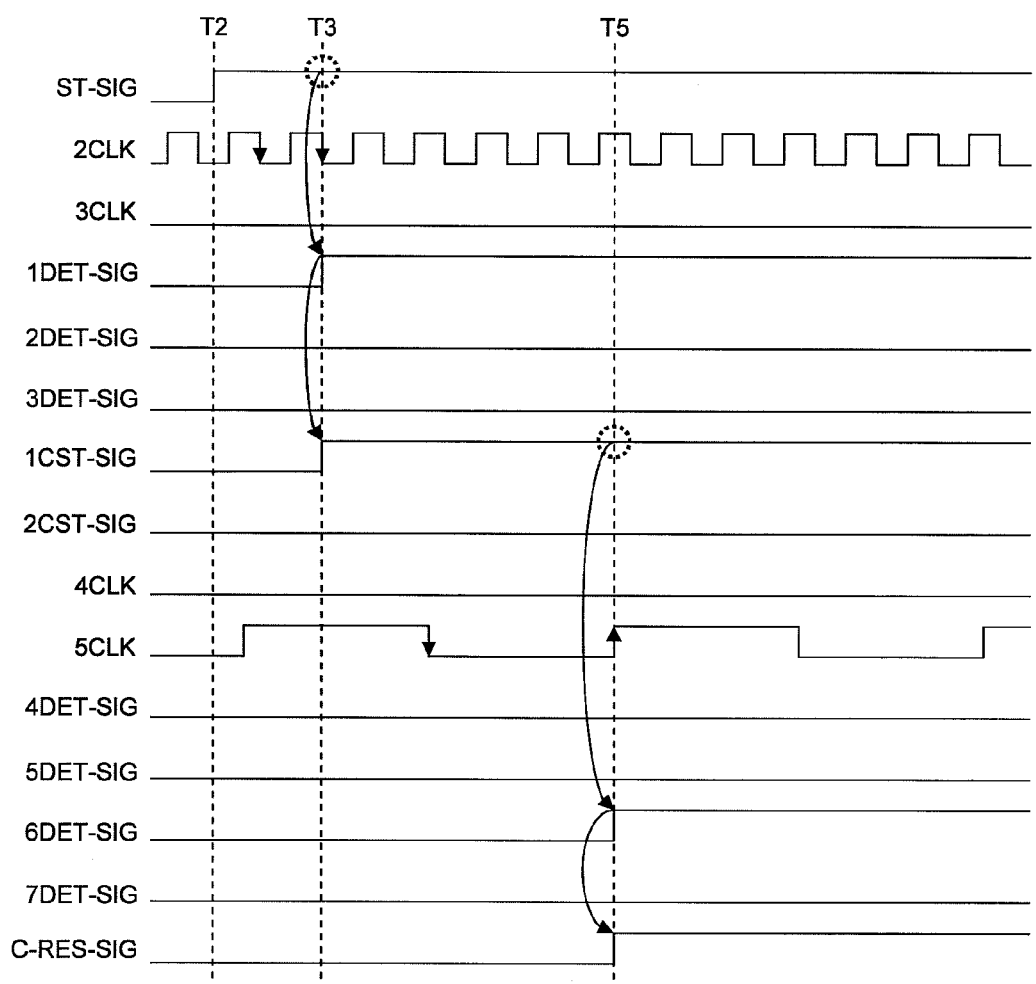
FIG. 6 is a timing chart for explaining an operation of the clock-control-signal-generation circuit shown in FIG. 5.

FIG. 6 is a timing chart for explaining the operation of the clock-control-signal-generation circuit, to which the second clock signal 2CLK—a clock signal having a relatively high frequency, and the fifth clock signal 5CLK—a clock signal having a relatively low frequency—are supplied.

The operation of the clock-control-signal-generation circuit will be described below with reference to FIGS. 5 and 6. In the description below, Times T2, T3 and T5 correspond to the times denoted by T2, T3 and T5 in FIG. 6. The initial states of output signals of the flip-flops 501 to 503, 505, and 510 to 517 are nonactive (logic Low level). That is, the initial states of the first to seventh detection signals 1DET-SIG to 7DET-SIG, the initial states of the first and second clock-stop-permission signals 1CST-SIG and 2CST-SIG, and the initial state of the clock-resume-permission signal C-RES-SIG are all nonactive.

At Time T2, the switching-trigger signal ST-SIG supplied from the outside is changed from nonactive (logic Low level) to active (logic High level). Consequently, the before-switching clock processing unit 102a starts processing.

At Time T3, the change of the state of the switching-trigger signal ST-SIG is synchronized with the second falling edge of the second clock signal 2CLK after Time T2 by the flip-flops 501 and 502 in the first high-frequency clock processing subunit 103, and then the first detection signal 1DET-SIG, which is an output signal of the flip-flop 502, is changed from nonactive (logic Low level) to active (logic High level) in line with the second falling edge of the second clock signal 2CLK. Consequently, the first clock-stop-permission signal 1CST-SIG—an output signal of the OR circuit 105—is changed from nonactive (logic Low level) to active (logic High level). In addition, the after-switching clock processing unit 106a starts processing.

At Time T5, the change of the state of the first clock-stop-permission signal 1CST-SIG is synchronized with the first rising edge of the fifth clock signal 5CLK subsequent to the first falling edge of the fifth clock signal 5CLK after Time T3 by the flip-flops 514 and 515 in the second low-frequency clock processing subunit 108a, and then the sixth detection signal 6DET-SIG, which is an output signal of the flip-flop 515, is changed from nonactive (logic Low level) to active (logic High level) in line with the first rising edge of the fifth clock signal 5CLK. Consequently, the clock-resume-permission signal C-RES-SIG—an output signal of the OR circuit 109 is changed from nonactive (logic Low level) to active (logic High level).

Now, a supplementary description to the above description about the operation of the second low-frequency clock processing subunit 108a at Time T5 will be further presented here, assuming the condition that the second clock-stop-permission signal 2CST-SIG is changed from nonactive to active instead of the first clock-stop-permission signal 1CST-SIG. In this condition, the operation of the second low-frequency clock processing subunit 108a is as follows. Not the combination of the flip-flops 514 and 515, but the combination of the flip-flops 516 and 517 synchronizes the change of the second clock-stop-permission signal 2CST-SIG with the first falling edge of the fifth clock signal 5CLK subsequent to the first rising edge of the fifth clock signal 5CLK after Time T3, and then the seventh detection signal 7DET-SIG, which is an output signal of the flip-flop 517, is changed from nonactive (logic Low level) to active (logic High level).

Further, a supplementary description to the above description about the operation of the second low-frequency clock processing subunit 108a at Time T5 will be presented here, assuming the condition that the fourth clock signal 4CLK having a relatively high frequency is supplied to the clock-control-signal-generation circuit instead of the fifth clock signal 5CLK having a relatively low frequency. In this condition, not the second low-frequency clock processing subunit 108a, but the second high-frequency clock processing subunit 107 works. After the first clock-stop-permission signal 1CST-SIG has been changed from nonactive to active, the combination of the flip-flops 510 and 511 generates twice the falling edge of the fourth clock signal 4CLK, and synchronizes the change of the first clock-stop-permission signal 1CST-SIG with the second falling edge of the fourth clock signal 4CLK, and then, the fourth detection signal 4DET-SIG, which is an output signal of the flip-flop 511, is changed from nonactive to active (logic High level) in line with the second falling edge of the fourth clock signal 4CLK. Further, when the second clock-stop-permission signal 2CST-SIG is changed from nonactive to active, the combination of the flip-flops 512 and 513 synchronizes the change of the second clock-stop-permission signal 2CST-SIG with the second rising edge of the fourth clock signal 4CLK after the change of the second clock-stop-permission signal 2CST-SIG, and then the fifth detection signal 5DET-SIG—an output signal of the flip-flop 513—is changed from nonactive to active (logic High level) in line with the second rising edge of the fourth clock signal.

The clock-control-signal-generation circuit (C-CNT-GEN) 101a is used for the purpose of generating a control signal for switching the clock, in which the stop of the output clock is controlled by the first and second clock-stop-permission signal 1CST-SIG and 2CST-SIG, and the resumption of the output clock is controlled by the clock-resume-permission signal C-RES-SIG.

As described above, the change in the state of the switching-trigger signal ST-SIG is synchronized with the second clock signal 2CLK in the first high-frequency clock processing subunit 103. Further, the change of state of the first clock-stop-permission signal 1CST-SIG is synchronized with the fourth clock signal 4CLK in the second high-frequency clock processing subunit 107, and the change of state of the second clock-stop-permission signal 2CST-SIG is synchronized with the fifth clock signal 5CLK in the second low-frequency clock processing subunit 108a. The steps are necessary for ensuring that a glitch—a pulse narrower than a proper clock pulse in pulse width—never arises in an output clock signal CKOUT at the time of clock switching. In general, the value of a control signal supplied from the outside sometimes changes in asynchronism with a clock signal. Therefore, the change of the switching-trigger signal ST-SIG can take place in asynchronism with the second clock signal 2CLK, and the second and third clock signals 2CLK and 3CLK, and the fourth and fifth clock signals 4CLK and 5CLK are asynchronous. On this account, there may be a risk of a glitch arising in an output clock signal CKOUT at the time of clock switching.

The series-connected flip-flops 501 and 502 of two stages, the series-connected flip-flops 510 and 511 of two stages, the series-connected flip-flops 512 and 513 of two stages, the series-connected flip-flops 514 and 515 of two stages, and the series-connected flip-flops 516 and 517 of two stages are arranged to take a measure against metastable phenomena in flip-flops.

On another note, in the second high-frequency clock processing subunit 107, the directions of the operation edges of clocks for the two-stage, series-connected flip-flops, namely the combination of flip-flops 510 and 511, and the combination of flip-flops 512 and 513 coincident. However, the same is not true in the second low-frequency clock processing subunit 108a. What makes the difference like this is that the difference in the length of one cycle between the clock signals is taken into consideration. As for the second high-frequency clock processing subunit 107 which the fourth clock signal 4CLK having a relatively high frequency is input to, it is considered to take a time of one cycle of the clock signal approximately for the second high-frequency clock processing subunit 107 to recover from a metastable and stabilize. For that reason, just a length of time representing one cycle of the clock is ensured as the operation interval between the first-stage flip-flop and the second-stage flip-flop. In contrast, with the second low-frequency clock processing subunit 108a which the fifth clock signal 5CLK having a relatively low frequency is input to, the time of one cycle of the clock signal is relatively long, and therefore, it is expected that it does not take the time of one cycle of the clock signal for the second low-frequency clock processing subunit 108a to recover from a metastable and stabilize, and about the time of 0.5 cycle is all that is needed to do so. Hence, just the time of half of one cycle of the clock is ensured as the operation interval between the first-stage flip-flop and the second-stage flip-flop.

Figure 7:
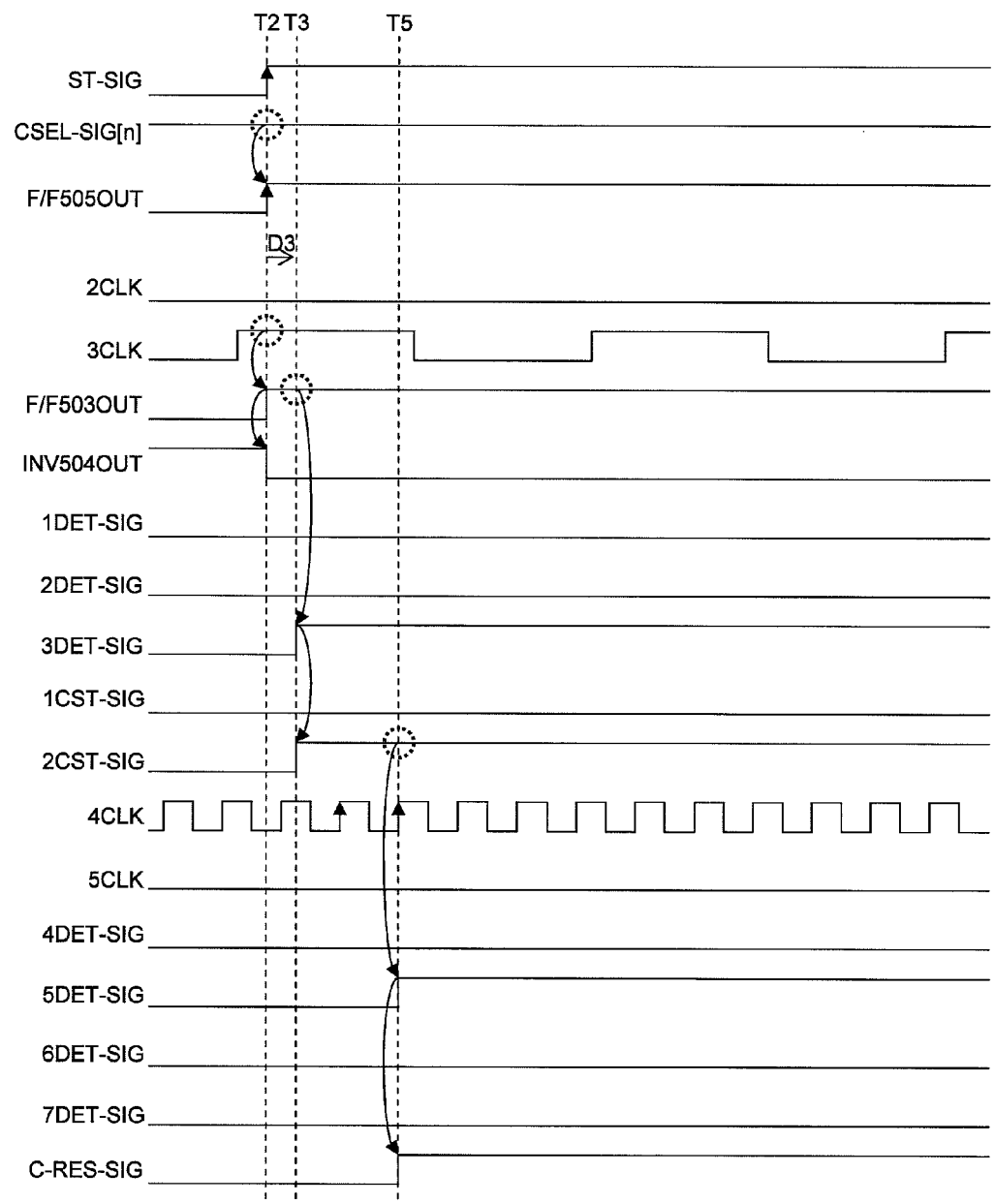
FIG. 7 is a timing chart for explaining an operation of the clock-control-signal-generation circuit shown in FIG. 5.

FIG. 7 shows the operation timing of the clock-control-signal-generation circuit which is supplied with the third clock signal 3CLK having a relatively low frequency, and the fourth clock signal 4CLK having a relatively high frequency.

Here, the operation of the clock-control-signal-generation circuit in the situation that the third and fourth clock signals 3CLK and 4CLK are supplied to the clock-control-signal-generation circuit will be described with reference to FIGS. 5 and 7. In the description below, Times T2, T3 and T5 correspond to the times denoted by T2, T3 and T5 in FIG. 7. The initial states of output signals of the flip-flops 501 to 503, 505, and 510 to 517 are nonactive (logic Low level). That is, the initial states of the first to seventh detection signals 1DET-SIG to 7DET-SIG, the initial states of the first and second clock-stop-permission signals 1CST-SIG and 2CST-SIG, and the initial state of the clock-resume-permission signal C-RES-SIG are all nonactive.

Now, it is noted that on condition that the third clock signal 3CLK is supplied to the clock-control-signal-generation circuit, the current-select signal CSEL-SIG[n] shown in FIGS. 5 and 7 is active (at logic High level); the current-select signal CSEL-SIG[n] is the most significant bit of the current-select signal CSEL-SIG[n:0].

At Time T2, the switching-trigger signal ST-SIG supplied from the outside is changed from nonactive (logic Low level) to active (logic High level) with the current-select signal CSEL-SIG[n] kept active (at logic High level). As a result, the output signal (F/F505OUT) of the flip-flop 505 in the first low-frequency clock processing subunit 104a is changed from nonactive (logic Low level) to active (logic High level), and the first low-frequency clock processing subunit 104a starts working. At that time, the output signal (F/F503OUT) of the flip-flop 503 is changed according to the logic level of the third clock signal 3CLK. In the example shown in FIG. 7, the third clock signal 3CLK stays at the logic High level and therefore the output signal of the flip-flop 503 is changed to the logic High level. In response to the change, the output signal (INV504OUT) of the inverter 504 is changed to nonactive (logic Low level). According to the operation described above, it is detected that the state of the third clock signal 3CLK at the change of the switching-trigger signal ST-SIG from nonactive to active is the logic High level.

At Time T3, in a given time (denoted by D3 in FIG. 7) from Time T2 when the output signal of the flip-flop 505 was changed to active, the output signal of the delay circuit 506 is changed from nonactive (logic Low level) to active (logic High level). Consequently, while the state of the output signal of the flip-flop 503, i.e. the result of detection concerning the logic level of the third clock signal 3CLK, is reflected, the third detection signal 3DET-SIG, which is an output signal of the AND circuit 508, is changed from nonactive to active (logic High level), and the second clock-stop-permission signal 2CST-SIG is changed from nonactive to active (logic High level). Further, the after-switching clock processing unit 106a starts processing.

At Time T5, the change of the state of the second clock-stop-permission signal 2CST-SIG is synchronized with the second rising edge of the fourth clock signal 4CLK after Time T3 by the flip-flops 512 and 513 in the second high-frequency clock processing subunit 107, and then the fifth detection signal 5DET-SIG—an output signal of the flip-flop 513—is changed from nonactive to active (logic High level). Consequently, the clock-resume-permission signal C-RES-SIG—an output signal of the OR circuit 109—is changed from nonactive (logic Low level) to active (logic High level).

Now, a supplementary description to the description about the operation of the first low-frequency clock processing subunit 104a at Time T2 will be presented here. If the state of the current-select signal CSEL-SIG[n] is nonactive (logic Low level) at the change of the switching-trigger signal ST-SIG from nonactive to active, the output signal of the flip-flop 505 is kept nonactive, and therefore the output signals of the AND circuits 507 and 508 are also kept nonactive. As a result, the second and third detection signals 2DET-SIG and 3DET-SIG remain nonactive. In this way, it becomes possible to prevent the second detection signal 2DET-SIG from being made active improperly without the third clock signal 3CLK supplied to the clock-control-signal-generation circuit.

Further, a supplementary description to the description about the operation of the first low-frequency clock processing subunit 104a at Time T2 will be presented here. If the state of the third clock signal 3CLK is not the logic High level, but the logic Low level at the change of the switching-trigger signal ST-SIG from nonactive to active, the output signal of the flip-flop 503 is kept at the logic Low level. Consequently, the output signal of the inverter 504 is kept active, namely at logic High level. According to the action described above, it is detected that the state of the third clock signal 3CLK at the change of the switching-trigger signal ST-SIG from nonactive to active is logic Low level. Subsequently, at Time T3, in a given time (denoted by D3 in FIG. 7) from the change of the output of the flip-flop 505 to active, the output signal of the delay circuit 506 is changed from nonactive (logic Low level) to active (logic High level). Consequently, while the state of the output signal of the flip-flop 503, i.e. the result of detection concerning the logic level of the third clock signal 3CLK, is reflected, the second detection signal 2DET-SIG, which is an output signal of the AND circuit 507, is changed from nonactive to active (logic High level), and the first clock-stop-permission signal 1CST-SIG, which is an output signal of the OR circuit 105, is changed from nonactive to active (logic High level).

As described above, the first low-frequency clock processing subunit 104a works on detection of the level of the third clock signal 3CLK; the first high-frequency clock processing subunit 103 works on detection of the edge of the second clock signal 2CLK; the second high-frequency clock processing subunit 107 works on detection of the edge of the fourth clock signal 4CLK; and the second low-frequency clock processing subunit 108a works on detection of the edge of the fifth clock signal 5CLK.

On condition that the before-switching clock processing unit 102a is working on the second clock signal 2CLK, the first clock-stop-permission signal 1CST-SIG is changed from nonactive to active in synchronization with a falling edge of the second clock signal 2CLK. Further, on condition that the before-switching clock processing unit 102a is working on the third clock signal 3CLK, the first clock-stop-permission signal 1CST-SIG or the second clock-stop-permission signal 2CST-SIG—depending on the result of detection of the level of the third clock signal 3CLK—is changed from nonactive to active, after elapse of a given time after the change of the switching-trigger signal ST-SIG from nonactive to active. The after-switching clock processing unit 106a changes the direction of the clock edge to synchronize with, depending on which of the first and second clock-stop-permission signals 1CST-SIG and 2CST-SIG is made active, and changes the clock-resume-permission signal C-RES-SIG to active.

Now, the reasons why the means for level detection is not applied to the first high-frequency clock processing subunit 103 as in the first low-frequency clock processing subunit 104a are as follows. The first reason is that a process using a high-frequency clock achieves a high processing speed originally, and therefore much advantage cannot be expected to be drawn from using the means for level detection. The second reason is that the duration time of the level of a high-frequency clock is short, and therefore there is a possibility that the level at the detection has already been shifted to another one when the clock is stopped actually, and it is highly possible that a glitch arises.

Next, a measure against the metastable of the flip-flop 503 of the first low-frequency clock processing subunit 104a will be described. On condition that a change of the third clock signal 3CLK, which is a data input (D) to the flip-flop 503, is close to a change of an output signal of the flip-flop 505, which is a clock input (CK) to the flip-flop 503, a metastable phenomenon can take place in an output signal of the flip-flop 503. To take a measure against the metastable, the delay circuit 506 is used. The role of the delay circuit 506 is to delay signal propagation to inputs of the AND circuits 507 and 508 by a given time, denoted by D3 in FIG. 7, until the flip-flop 503 recovers from the metastable phenomenon and stabilizes after the output signal of the flip-flop 505 has been made active, and to mask output signals of the AND circuits 507 and 508. Making longer the given time D3 than the time required for calming down the metastable phenomenon, it becomes possible to prevent the influence of the metastable phenomenon from propagating to the first and second clock-stop-permission signals 1CST-SIG and 2CST-SIG. As described above, by setting the given delay time D3 properly, the creation of a uselessly long standby time for calming down a metastable phenomenon caused at the time of clock switching can be averted. Thus, it becomes possible to perform a high-speed clock switching.

Next, the OR circuit 509 will be described. The OR circuit 509 is used to generate a reset signal to input to the first high-frequency clock processing subunit 103.

Specifically, after the first low-frequency clock processing subunit 104a is activated, and the third detection signal 3DET-SIG (second clock-stop-permission signal 2CST-SIG) is changed to active (logic High level), the OR circuit 509 applies a reset signal to the flip-flops 501 and 502, thereby to fix the output signals of the flip-flops 501 and 502 to the nonactive state (logic Low level). Thus, the first clock-stop-permission signal 1CST-SIG can be prevented from being made active accidentally when the second clock-stop-permission signal 2CST-SIG is made active. The switching-trigger signal ST-SIG is made to transition from nonactive to active only once in one clock switching process. With the first low-frequency clock processing subunit 104a, which is arranged so that the state of the third clock signal 3CLK is detected by the flip-flop 503 in response to the change of the switching-trigger signal ST-SIG from nonactive to active, the second clock-stop-permission signal 2CST-SIG is not changed to active accidentally after the change of the first clock-stop-permission signal 1CST-SIG to active. Therefore, in this case, the reset process on the idea described above is not needed.

<Fifth Embodiment>

Figure 8:
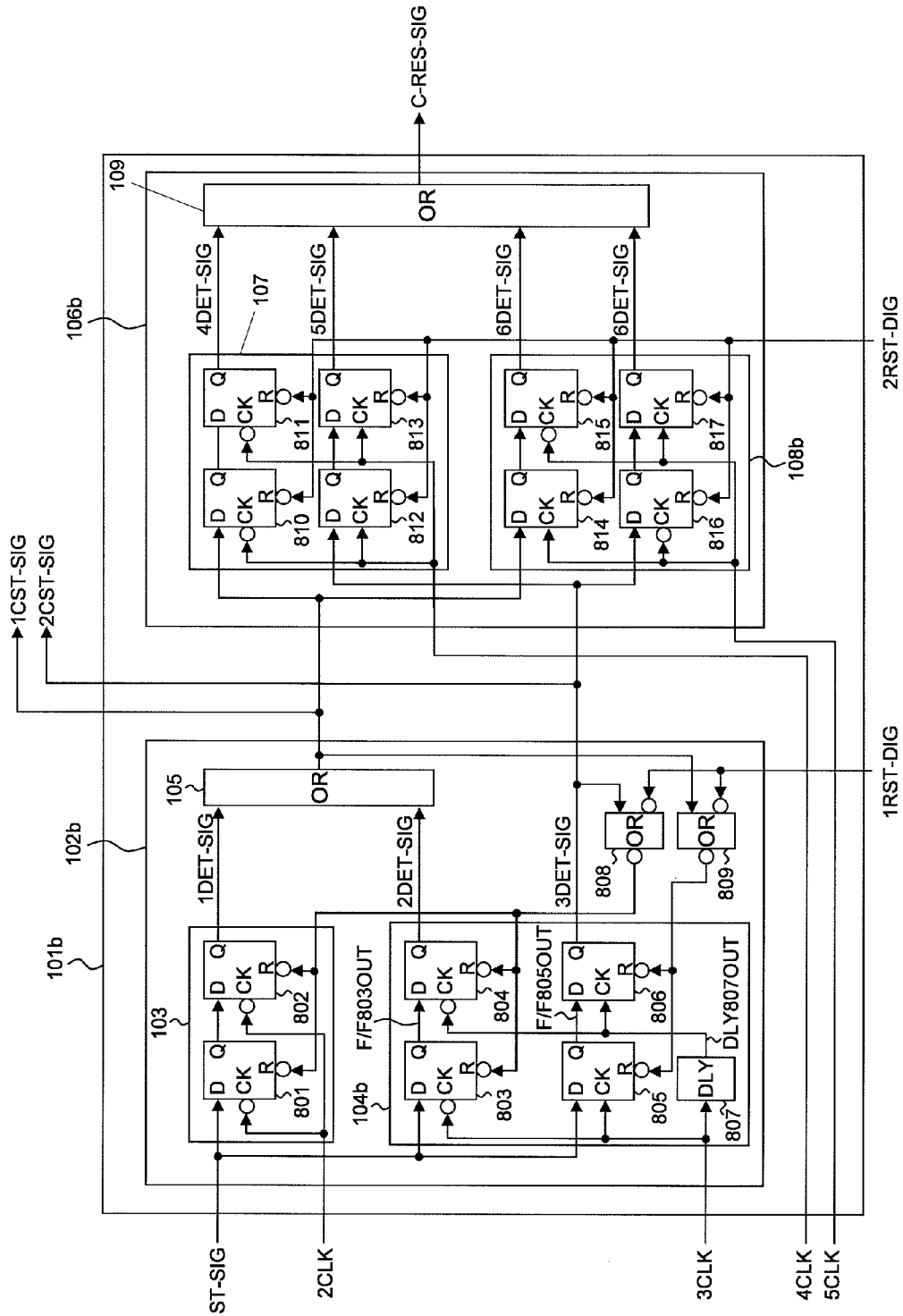
FIG. 8 is a circuit diagram showing a concrete example of the circuit configuration of the clock-control-signal-generation circuit in connection with the invention.

FIG. 8 shows another concrete example of the circuit configuration of the clock-control-signal-generation circuit 101 shown in FIG. 1.

In the clock-control-signal-generation circuit 101b shown in FIG. 8, the first high-frequency clock processing subunit 103 includes a flip-flop 801 and a flip-flop 802; and the first low-frequency clock processing subunit 104b includes flip-flops 803 to 806, and a delay circuit 807 having a delay time D4. Further, in the clock-control-signal-generation circuit, the flip-flops 803 and 805 are connected in series with each other, and the flip-flops 805 and 806 are connected in series with each other. The switching-trigger signal ST-SIG is input to data terminals D of the flip-flops 803 and 805. The third clock signal 3CLK is input to clock terminals CK of the flip-flops 803 and 805. To clock terminals CK of flip-flops 804 and 806, the third clock signal 3CLK which has been delayed by the delay circuit 807 is input. The second high-frequency clock processing subunit 107 includes flip-flops 810 to 813. The second low-frequency clock processing subunit 108b includes flip-flops 814 to 817.

While the first low-frequency clock processing subunit 104a shown in FIG. 5 is arranged so that it operates on detection of the level of the third clock signal 3CLK, the first low-frequency clock processing subunit 104b shown in FIG. 8 is arranged so that it operates on detection of the edge of the third clock signal 3CLK.

In addition, the second low-frequency clock processing subunit 108b shown in FIG. 8 operates on detection of the edge of the fifth clock signal 5CLK like the second low-frequency clock processing subunit 108a shown in FIG. 5. However, in the second low-frequency clock processing subunit 108b shown in FIG. 8, the directions of the operation edges of clock inputs (CK) of the series-connected flip-flops of two stages which work according to the first clock-stop-permission signal 1CST-SIG and the second clock-stop-permission signal 2CST-SIG are different.

The first and second high-frequency clock processing subunits 103 and 107 shown in FIG. 8 are identical with those shown in FIG. 5 in their configurations and operations. The first high-frequency clock processing subunit 103 operates on detection of the edge of the second clock signal 2CLK, whereas the second high-frequency clock processing subunit 107 operates on detection of the edge of the fourth clock signal 4CLK.

Figure 9:
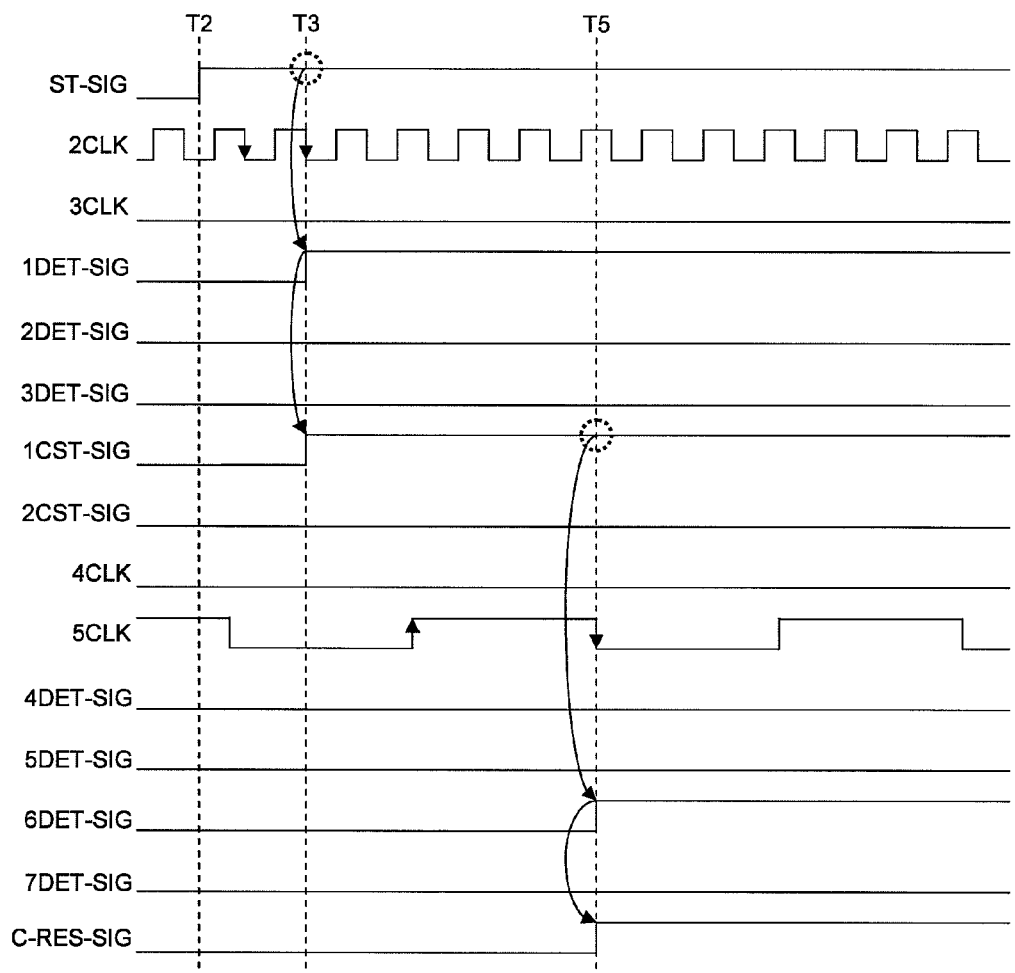
FIG. 9 is a timing chart for explaining an operation of the clock-control-signal-generation circuit shown in FIG. 8.

FIG. 9 shows the timing of an operation of the clock-control-signal-generation circuit on condition that the second clock signal 2CLK having a relatively high frequency, and the fifth clock signal 5CLK having a relatively low frequency are supplied to the clock-control-signal-generation circuit.

Here, the operation of the clock-control-signal-generation circuit on condition will be described with reference to FIGS. 8 and 9. In the description below, Times T2, T3 and T5 correspond to the times denoted by T2, T3 and T5 in FIG. 9. Further, the initial states of output signals of the flip-flops 801 to 806, and 810 to 817 are nonactive (logic Low level). That is, the initial states of the first to seventh detection signals 1DET-SIG to 7DET-SIG, the initial states of the first and second clock-stop-permission signals 1CST-SIG and 2CST-SIG, and the initial state of the clock-resume-permission signal C-RES-SIG are all nonactive.

At Time T2, the switching-trigger signal ST-SIG supplied from the outside is changed from nonactive (logic Low level) to active (logic High level). In response to this change, the before-switching clock processing unit 102b starts processing.

At Time T3, the change of the state of the switching-trigger signal ST-SIG is synchronized with the second falling edge of the second clock signal 2CLK after the change of the switching-trigger signal ST-SIG by the flip-flops 801 and 802 in the first high-frequency clock processing subunit 103, and then the first detection signal 1DET-SIG, which is an output signal of the flip-flop 802, is changed from nonactive (logic Low level) to active (logic High level). Consequently, the first clock-stop-permission signal 1CST-SIG, which is an output signal of the OR circuit 105 is changed from nonactive (logic Low level) to active (logic High level). In addition, the after-switching clock processing unit 106b starts processing.

At Time T5, the change of the state of the first clock-stop-permission signal 1CST-SIG is synchronized with the first falling edge of the fifth clock signal 5CLK subsequent to the first rising edge of the fifth clock signal after Time T3 by the flip-flops 814 and 815 in the second low-frequency clock processing subunit 108b, and then the sixth detection signal 6DET-SIG, which is an output signal of the flip-flop 815 is changed from nonactive to active. Thus, the clock-resume-permission signal C-RES-SIG, which is an output signal of the OR circuit 109, is changed from nonactive (logic Low level) to active (logic High level).

Figure 10:
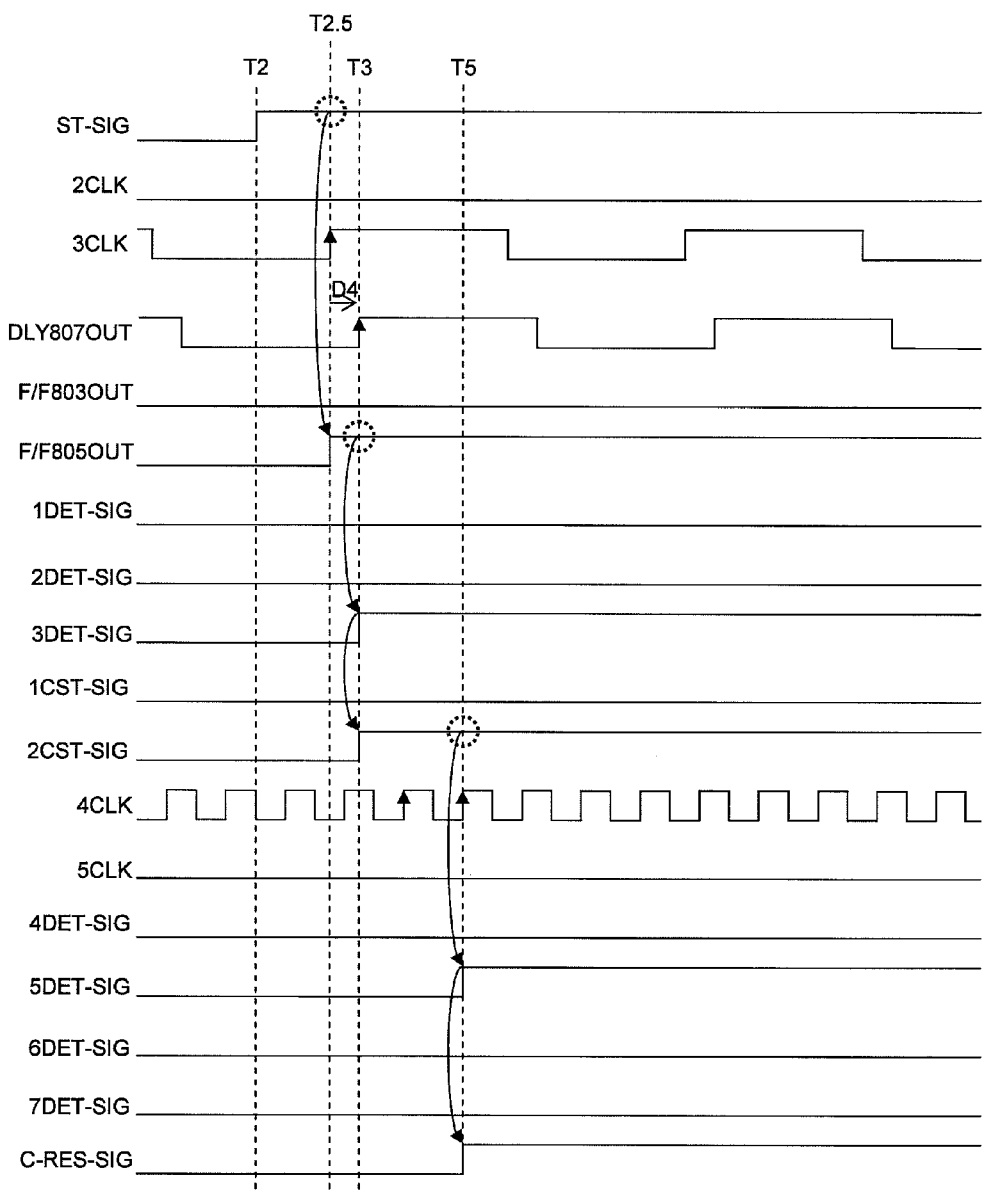
FIG. 10 is a timing chart for explaining an operation of the clock-control-signal-generation circuit shown in FIG. 8.

FIG. 10 shows the timing of an operation of the clock-control-signal-generation circuit on condition that third clock signal 3CLK having a relatively low frequency, and the fourth clock signal 4CLK having a relatively high frequency are supplied to the clock-control-signal-generation circuit.

Here, the operation of the clock-control-signal-generation circuit in this condition will be described with reference to FIGS. 8 and 10. In the description below, Times T2, T2.5, T3 and T5 correspond to the times denoted by T2, T2.5, T3 and T5 in FIG. 10. Further, the initial states of output signals of the flip-flops 801 to 806, and 810 to 817 are nonactive (at logic Low level). That is, the initial states of the first to seventh detection signals 1DET-SIG to 7DET-SIG, the initial states of the first and second clock-stop-permission signals 1CST-SIG and 2CST-SIG, and the initial state of the clock-resume-permission signal C-RES-SIG are all nonactive.

At Time T2, the switching-trigger signal ST-SIG supplied from the outside is changed from nonactive (logic Low level) to active (logic High level). In response to this change, the before-switching clock processing unit 102b starts processing.

At Time T2.5, the change of the state of the switching-trigger signal ST-SIG is synchronized with the rising edge of the third clock signal 3CLK by the flip-flop 805 in the first low-frequency clock processing subunit 104b, and then the output signal (F/F805OUT) of the flip-flop 805 is changed from nonactive (logic Low level) to active (logic High level).

At Time T3, in a given time (denoted by D4 in FIG. 10) from Time T2.5 when the rising edge of the third clock signal 3CLK comes, the output signal (DLY807OUT) of the delay circuit 807 is changed from the logic Low level to the logic High level. Consequently, the change of the output signal of the flip-flop 805 is re-synchronized by the flip-flop 806 at the time later than the time of coming of the rising edge of the third clock signal 3CLK by the given time D4. Then, the third detection signal 3DET-SIG, which is an output signal of the flip-flop 806, is changed from nonactive to active (logic High level), and therefore the second clock-stop-permission signal 2CST-SIG is changed from nonactive to active (logic High level). Now, it is noted that the given time D4 is much shorter than the time of one cycle of the third clock signal 3CLK, and therefore the second clock-stop-permission signal 2CST-SIG can be regarded as being changed to active in synchronization with the rising edge of the third clock signal 3CLK. In addition, at Time T3, the after-switching clock processing unit 106b starts processing.

At Time T5, the change of the state of the second clock-stop-permission signal 2CST-SIG is synchronized with the second rising edge of the fourth clock signal 4CLK after Time T3 by the flip-flops 812 and 813 in the second high-frequency clock processing subunit 107, and the fifth detection signal 5DET-SIG, which is an output of the flip-flop 813 is changed from nonactive to active (logic High level). Consequently, the clock-resume-permission signal C-RES-SIG, which is an output signal of the OR circuit 809, is changed from nonactive (logic Low level) to active (logic High level).

Now, a supplement to the description of the operation of the first low-frequency clock processing subunit 104b at Time T2.5 and Time T3 will be presented here. If a falling edge of the third clock signal 3CLK comes prior to a rising edge thereof after the switching-trigger signal ST-SIG has been changed to active at Time T2, the operation of the first low-frequency clock processing subunit 104b is as follows.

At Time T2.5, the change of the state of the switching-trigger signal ST-SIG is synchronized with the falling edge of the third clock signal 3CLK by not the flip-flop 805, but the flip-flop 803, and the output signal (F/F803OUT) of the flip-flop 803 is changed from nonactive (logic Low level) to active (logic High level). Further, at Time T3 after an elapse of a given time—denoted by D4 in FIG. 10—after the coming of the aforementioned falling edge of the third clock signal 3CLK, the output signal of the delay circuit 807 is changed from the logic High level to the logic Low level. Consequently, the change of the state of the output signal of the flip-flop 803 is re-synchronized by the flip-flop 804 at the time, later than the time of coming of the falling edge of the third clock signal 3CLK in question by the given time D4, and then the second detection signal 2DET-SIG, which is an output signal of the flip-flop 804, is changed from nonactive to active (logic High level). Then, the first clock-stop-permission signal 1CST-SIG, which is an output signal of the OR circuit 105, is changed from nonactive (logic Low level) to active (logic High level). Now it is noted that, as already described concerning the operation of the first low-frequency clock processing subunit 104b at Time T2.5 and Time T3, the given time D4 is much shorter than the time of one cycle of the third clock signal 3CLK, and therefore the first clock-stop-permission signal 1CST-SIG can be regarded as being changed to active in synchronization with the falling edge of the third clock signal 3CLK.

As described above, the first high-frequency clock processing subunit 103 works on detection of the edge of the second clock signal 2CLK, and the first low-frequency clock processing subunit 104b works on detection of the edge of the third clock signal 3CLK. Further, the second high-frequency clock processing subunit 107 works on detection of the edge of the fourth clock signal 4CLK, and the second low-frequency clock processing subunit 108b works on detection of the edge of the fifth clock signal 5CLK.

On condition that the before-switching clock processing unit 102b works on the second clock signal 2CLK, the first clock-stop-permission signal 1CST-SIG is changed from nonactive to active in synchronization with the falling edge of the second clock signal 2CLK. However, on condition that the before-switching clock processing unit 102b works on the third clock signal 3CLK, the first clock-stop-permission signal 1CST-SIG or the second clock-stop-permission signal 2CST-SIG is changed from nonactive to active in synchronization with the earlier of the falling edge or rising edge of the third clock signal 3CLK. The after-switching clock processing unit 106b changes the direction of the edge of a clock to synchronize with depending on which of the first clock-stop-permission signal 1CST-SIG and the second clock-stop-permission signal 2CST-SIG is changed to active, and changes the clock-resume-permission signal C-RES-SIG to active.

The measure against a glitch of the output clock signal CKOUT and the measure against a metastable of the flip-flop in the first high-frequency clock processing subunit 103, the second high-frequency clock processing subunit 107, and the second low-frequency clock processing subunit 108b are the same as those taken for the clock-control-signal-generation circuit according to the fourth embodiment.

Also, in the first low-frequency clock processing subunit 104b, the change of the state of the switching-trigger signal ST-SIG is synchronized with the third clock signal 3CLK by a flip-flop as the measure against a glitch of the output clock signal CKOUT. Further, in the first low-frequency clock processing subunit, the delay circuit 807 is used as the measure against a metastable of the flip-flop, in addition to combinations of series-connected flip-flops of two stages. The role of the delay circuit 807 is to delay the edge timing of the third clock signal 3CLK by a given time, denoted by D4 in FIG. 10, and then to supply the third clock signal 3CLK to the second-stage flip-flops 804 and 806, provided that the given time represents a time required until the metastable phenomenon is calmed down after the appropriate edge of the third clock signal 3CLK has come and gone into the clock inputs (CK) of the first-stage flip-flops 803 and 805. The time of one cycle of the third clock signal 3CLK is considered to be much longer than the time taken to calm down the metastable phenomenon because the third clock signal 3CLK input to the first low-frequency clock processing subunit 104b is a clock signal of a low frequency. Therefore, the need for ensuring the time of one cycle of the clock signal as the operation interval between the first-stage flip-flop and the second-stage flip-flop is eliminated. Further, the influence of the metastable phenomenon can be prevented from propagating to the first clock-stop-permission signal 1CST-SIG and the second clock-stop-permission signal by just setting the given delay time (D4) to be a little longer than the time required for calming down the metastable phenomenon. As a result, the creation of a uselessly long standby time at the time of clock switching can be averted, whereby a high-speed clock switching can be achieved.

On the other hand, the measure against the metastable using a delay circuit as described above is not taken in the second low-frequency clock processing subunit 108b to which a low-frequency clock signal is input. The reason for this is there is a difference between the first and second low-frequency clock processing subunits 104b and 108b in that a process involving a clock signal before switching is performed in the first low-frequency clock processing subunit 104b, whereas a process involving a clock signal after switching is conducted in the second low-frequency clock processing subunit 108b. In other words, in the case of the after-switching clock signal having a low frequency, the clock speed after switching is slow basically, and an extremely high speed is not required. Therefore, it is favorable to cut the number of delay circuits thereby to reduce the circuit scale even a little.

In addition, the speedup technique involving detection of rising and falling edges of a clock, which is adopted for the first low-frequency clock processing subunit 104b, is not applied to the first high-frequency clock processing subunit 103. The reason for this is that there are few advantages in adopting the speedup technique for the first high-frequency clock processing subunit 103 because the speed of a process involving a high-frequency clock signal is basically fast, and thus an unnecessary increase of the circuit scale is avoided.

Next, the OR circuits 808 and 809 will be described. The OR circuit 808 is used for the purpose of generating a reset signal to input to the flip-flops 801 and 802 in the first high-frequency clock processing subunit 103, and to the flip-flops 803 and 804 in the first low-frequency clock processing subunit 104*b*. Specifically, when the combination of flip-flops 805 and 806 in the first low-frequency clock processing subunit 104*b* operates, and the third detection signal 3DET-SIG (second clock-stop-permission signal 2CST-SIG) is changed to active (logic High level), the OR circuit 808 applies a reset signal to the flip-flops 801 to 804 thereby to fix the output signals of the flip-flops 801 to 804 to the nonactive state (logic Low level). In this way, the first clock-stop-permission signal 1CST-SIG can be prevented from being turned to active accidentally when the second clock-stop-permission signal 2CST-SIG is changed to active. On the other hand, the OR circuit 809 is used for the purpose of generating a reset signal to input to the flip-flops 805 and 806 in the first low-frequency clock processing subunit 104*b*.

Specifically, when the first high-frequency clock processing subunit 103 or the combination of flip-flops 803 and 804 in the first low-frequency clock processing subunit 104*b* operates, and the first detection signal 1DET-SIG or the second detection signal 2DET-SIG (first clock-stop-permission signal 1CST-SIG) is turned to active, the OR circuit 809 applies a reset signal to the combination of flip-flops 805 and 806, thereby to fix the output signal thereof to the nonactive state (logic Low level). In this way, the second clock-stop-permission signal 2CST-SIG can be prevented from being turned to active accidentally when the first clock-stop-permission signal 1CST-SIG is changed to active.

<Sixth Embodiment>

Figure 11:
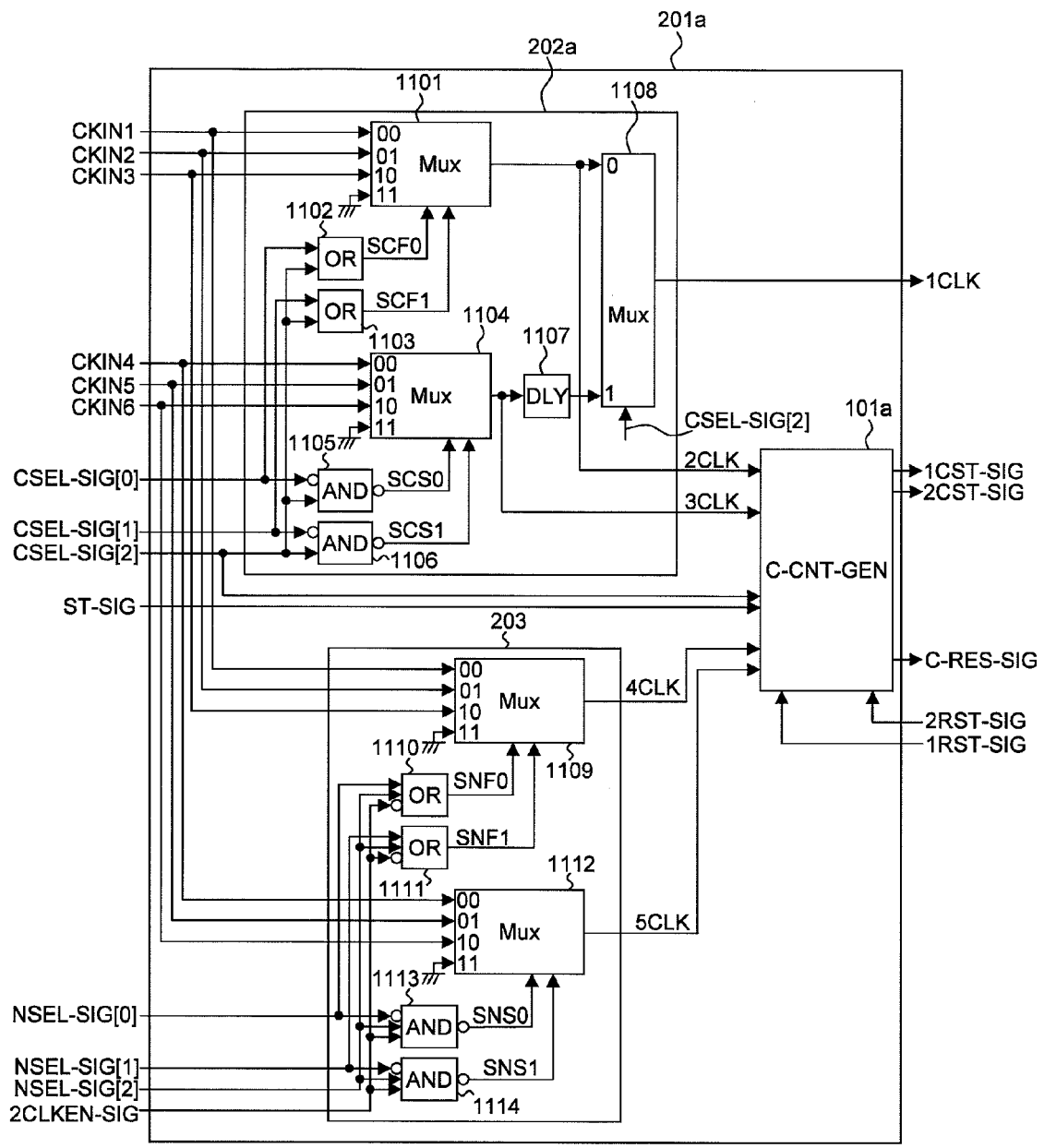
FIG. 11 is a circuit diagram showing a concrete example of the configuration of a clock-control-signal-generation circuit in connection with the invention.

FIG. 11 shows a concrete example of the circuit configuration of the select-type clock-control-signal-generation circuit 201 shown in FIG. 2.

The select-type clock-control-signal-generation circuit 201*a* shown in FIG. 11 includes a first clock-select unit 202*a*, a second clock-select unit 203, and a clock-control-signal-generation circuit 101*a*.

Further, the first clock-select unit 202*a* includes multiplexers (Mux) 1101 and 1104, OR circuits 1102 and 1103, AND circuits 1105 and 1106, a delay circuit 1107 having a delay time D5, and a multiplexer (Mux) 1108. The second clock-select unit 203 includes multiplexers (Mux) 1109 and 1112, OR circuits 1110 and 1111, and AND circuits 1113 and 1114.

Signals input to and output from the select-type clock-control-signal-generation circuit 201*a* are the same as signals input to and output from the select-type clock-control-signal-generation circuit 201 according to the second embodiment.

FIG. 12 shows a truth table for explaining an operation of the first clock-select unit 202*a*.

The operation of the first clock-select unit 202*a* will be described with reference to FIGS. 11 and 12.

The signal SCF0, which is an output signal of the OR circuit 1102, and the signal SCF1, which is an output signal of the OR circuit 1103, take logic levels shown by the truth table of FIG. 12, according to combinations of the values of a current-select signal [0], a current-select signal [1] and a current-select signal [2]. The signals SCF0 and SCF1 indicate, to the multiplexer 1101, which of four inputs "00", "01", "10" and "11" to selectively output as the second clock signal 2CLK. Likewise, the signal SCS0, which is an output signal of the AND circuit 1105, and the signal SCS1, which is an output signal of the AND circuit 1106, take logic levels shown by the truth table of FIG. 12, according to a combination of the values of the current-select signal [0], the current-select signal [1] and the current-select signal [2]. The signals SCS0 and SCS1 indicate, to the multiplexer 1104, which of four inputs "00", "01", "10" and "11" as the third clock signal 3CLK to selectively output.

If the current-select signal [2], which is the most significant bit of the current-select signal CSEL-SIG of three bits, takes the logic value "0", the value of the signal SCF0 is equal to the value of the current-select signal CSEL-SIG[0], and the value of the signal SCF1 is equal to the value of the current-select signal CSEL-SIG[1]. However, if the current-select signal CSEL-SIG[2] has the logic value "1", the values of the signals SCF0 and SCF1 are both the logic value "1".

In the case of the current-select signal CSEL-SIG[2], which is the most significant bit of the current-select signal of three bits, having the logic value "1", the value of the signal SCS0 is equal to the value of the current-select signal CSEL-SIG[0], and the value of the signal SCS1 is equal to the value of the current-select signal CSEL-SIG[1]. However, in the case of the current-select signal CSEL-SIG[2] having the logic value "0", the signals SCS0 and SCS1 both take the logic value "1". As a result, in this embodiment, the second clock signal 2CLK, which is an output signal of the multiplexer 1101, and the third clock signal 3CLK, which is an output signal of the multiplexer 1104, are selectively output as shown in the truth table of FIG. 12. The most significant bit (current-select signal CSEL-SIG[2]) of the current-select signal CSEL-SIG having the logic value "0" means that the first clock-select unit 202*a* is directed to select a clock from a high-frequency clock group. In this case, the selected input clock signal is supplied as the second clock signal 2CLK, whereas the third clock signal 3CLK is fixed to the logic Low level (GND), whereby no clock is supplied. In contrast, the most significant bit (current-select signal CSEL-SIG[2]) of the current-select signal CSEL-SIG having the logic value "1" means that the first clock-select unit 202*a* is directed to select a clock from a low-frequency clock group. In this case, the selected input clock signal is supplied as the third clock signal 3CLK, whereas the second clock signal 2CLK is fixed to the logic Low level (GND), whereby no clock is supplied.

To the multiplexer 1108, the second clock signal 2CLK, and a signal prepared by delaying the third clock signal 3CLK by a given time D5 are input. On condition that the current-select signal CSEL-SIG[2] has the logic value "0", and the high-frequency clock group has been selected, an input clock signal selected as the second clock signal 2CLK is output as the first clock signal 1CLK, which is an output of the multiplexer 1108, as shown by the truth table of FIG. 12. On condition that the current-select signal CSEL-SIG[2] has the logic value "1", and the low-frequency clock group has been selected, an input clock signal selected as the third clock signal 3CLK is delayed by the given time D5 and output. The symbol "D" in FIG. 12 means that a signal accompanied with the symbol "D" is a signal prepared by delaying, by the given delay time D5, the original clock signal thereof.

FIG. 13 shows a truth table for explaining an operation of the second clock-select unit 203.

The operation of the second clock-select unit 203 will be described with reference to FIGS. 11 and 13.

The signal SNF0, which is an output signal of the OR circuit 1110, and the signal SNF1, which is an output signal of the OR circuit 1111, take logic levels shown by the truth table of FIG. 13, according to combinations of the values of a second clock-select-unit-enable signal 2CLKEN-SIG, a new-select signal NSEL-SIG[0], a new-select signal NSEL-SIG[1], and a new-select signal NSEL-SIG[2]. The signals SNF0 and SNF1 indicate, to the multiplexer 1109, which of four inputs "00", "01", "10" and "11" to selectively output as the fourth clock signal 4CLK. Likewise, the signal SNS0, which is an output signal of the AND circuit 1113, and the signal SNS1, which is an output signal of the AND circuit 1114, take logic levels shown by the truth table of FIG. 13, according to combinations of the values of the second clock-select-unit-enable signal 2CLKEN-SIG, the new-select signal NSEL-SIG[0], the new-select signal NSEL-SIG[1], and the new-select signal NSEL-SIG[2]. The signals SNS0 and SNS1 indicate, to the multiplexer 1112, which of four inputs "00", "01", "10" and "11" to selectively output as the fifth clock signal 5CLK. Now, it is noted that in the case of the second clock-select-unit-enable signal 2CLKEN-SIG taking the logic value "0", the logic values of the new-select signal NSEL-SIG[0], the new-select signal NSEL-SIG[1], and the new-select signal NSEL-SIG[2] do not make sense, and therefore the symbol "X" is put in the cells for the new-select signals in question in FIG. 13.

On condition that the second clock-select-unit-enable signal 2CLKEN-SIG has the logic value "1", and the new-select signal NSEL-SIG[2], which is the most significant bit of the new-select signal NSEL-SIG of three bits, has the logic value "0", the value of the signal SNF0 is equal to the value of the new-select signal NSEL-SIG[0], and the value of the signal SNF1 is equal to the value of the new-select signal NSEL-SIG[1]. However, on condition that the second clock-select-unit-enable signal 2CLKEN-SIG has the logic value "1" and the new-select signal NSEL-SIG[2] has the logic value "1", the signals SNF0 and SNF1 both take the logic value "1".

Further, on condition that the second clock-select-unit-enable signal 2CLKEN-SIG has the logic value "1", and the new-select signal NSEL-SIG[2], which is the most significant bit of the new-select signal NSEL-SIG of three bits, has the logic value "1", the value of the signal SNS0 is equal to the value of the new-select signal NSEL-SIG[0], and the value of the signal SNS1 is equal to the value of the new-select signal NSEL-SIG[1]. In contrast, on condition that the second clock-select-unit-enable signal 2CLKEN-SIG has the logic value "1", and the new-select signal NSEL-SIG[2] has the logic value "0", the signals SNS0 and SNS1 both take the logic value "1".

However, in the case of the second clock-select-unit-enable signal 2CLKEN-SIG having the logic value "0", the signals SNF0, SNF1, SNS0 and SNS1 all take the logic value "1" regardless of the values of the new-select signal NSEL-SIG[0] to the new-select signal NSEL-SIG[2].

Consequently, in this embodiment, the fourth clock signal 4CLK, which is an output signal of the multiplexer 1109, and the fifth clock signal 5CLK, which is an output signal of the multiplexer 1112, are selectively output as shown by the truth table of FIG. 13. The condition that the second clock-select-unit-enable signal 2CLKEN-SIG has the logic value "1", and the most significant bit (new-select signal NSEL-SIG[2]) of the new-select signal NSEL-SIG has the logic value "0" means that the second clock-select unit 203 is directed to select a clock from the high-frequency clock group. In this case, the selected input clock signal is supplied as the fourth clock signal 4CLK, whereas the fifth clock signal 5CLK is fixed to the logic Low level (GND), whereby no clock is supplied. In contrast, the condition that the second clock-select-unit-enable signal 2CLKEN-SIG has the logic value "1", and the most significant bit (new-select signal NSEL-SIG[2]) of the new-select signal NSEL-SIG has the logic value "1" means that the second clock-select unit 203 is directed to select a clock from the low-frequency clock group. In this case, the selected input clock signal is supplied as the fifth clock signal 5CLK, whereas the fourth clock signal 4CLK is fixed to the logic Low level (GND), whereby no clock is supplied. Further, in the case of the second clock-select-unit-enable signal 2CLKEN-SIG having the logic value "0", the fourth and fifth clock signals 4CLK and 5CLK are both fixed to the logic Low level (GND), and the second clock-select unit 203 is stopped from outputting a clock. In this way, during the time of a normal operation in which no clock switching is performed, an unwanted clock supply to the inside of the clock-control-signal-generation circuit 101a can be kept stopped to cut the power consumption.

Also, as to the second and third clock signals 2CLK and 3CLK, which are output signals of the first clock-select unit 202a, by providing a circuit operable to mask the two clock signals, an unwanted clock supply to the inside of the clock-control-signal-generation circuit 101a can be kept stopped to cut the power consumption during the time of a normal operation in which no clock switching is performed.

The clock-control-signal-generation circuit 101a is the same as the clock-control-signal-generation circuit 101a shown in FIG. 5, which has been described in connection with the fourth embodiment in structure and operation.

<Seventh Embodiment>

Figure 14:
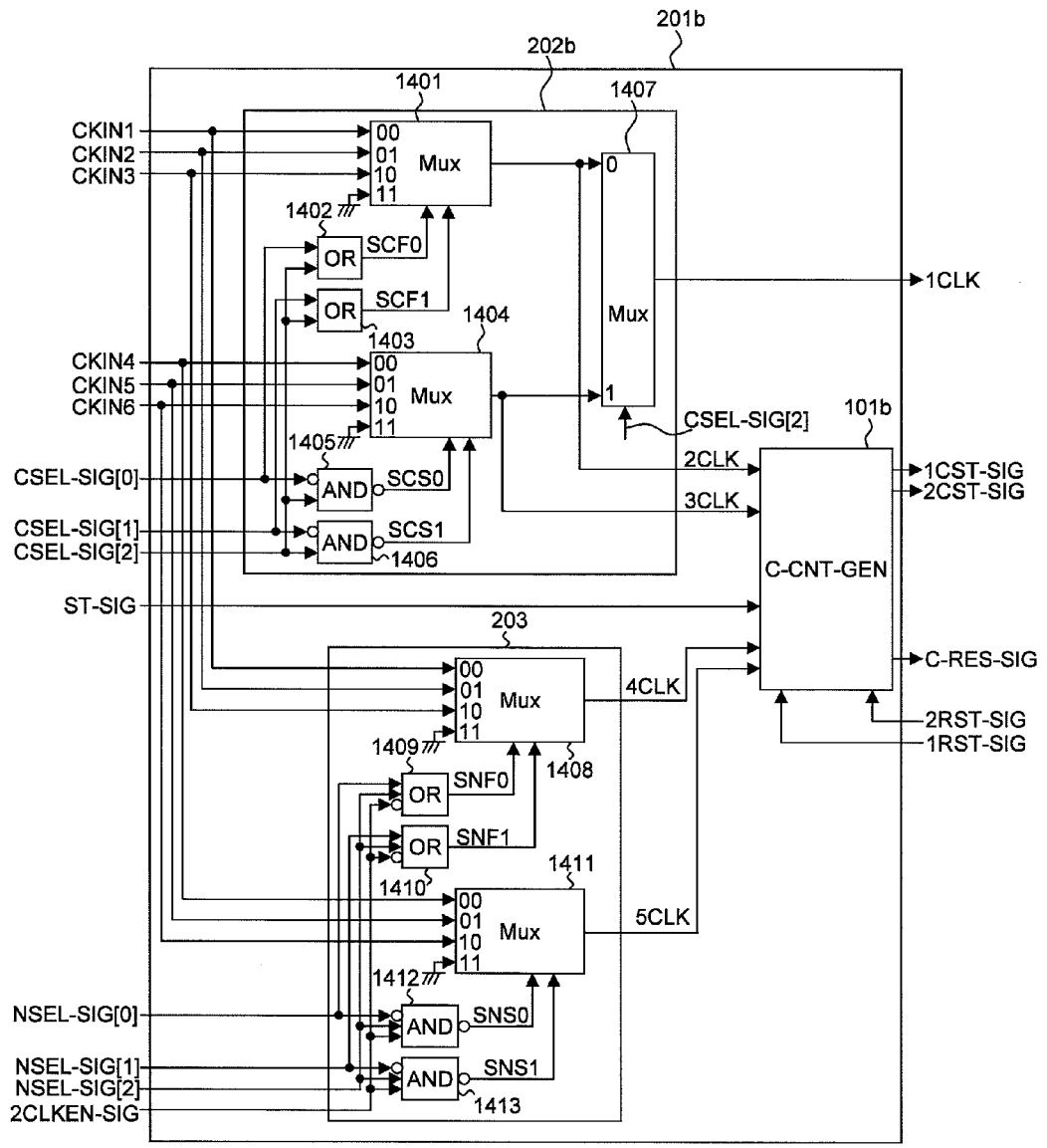
FIG. 14 is a circuit diagram showing an example of the configuration of the clock-control-signal-generation circuit in connection with the invention.

FIG. 14 shows another concrete example of the circuit configuration of the select-type clock-control-signal-generation circuit 201 shown in FIG. 2.

The select-type clock-control-signal-generation circuit 201b shown in FIG. 14 includes: a first clock-select unit 202b; a second clock-select unit 203; and a clock-control-signal-generation circuit (C-CNT-GEN) 101b.

Further, the first clock-select unit 202b includes multiplexers (Mux) 1401 and 1404, OR circuits 1402 and 1403, AND circuits 1405 and 1406, and a multiplexer (Mux) 1407. The second clock-select unit 203 includes multiplexers (Mux) 1408 and 1411, OR circuits 1409 and 1410, and AND circuits 1412 and 1413.

Signals input to and output from the select-type clock-control-signal-generation circuit 201b are the same as signals input to and output from the select-type clock-control-signal-generation circuit 201 according to the second embodiment in their details.

FIG. 15 shows a truth table for explaining an operation of the first clock-select unit 202b.

The operation of the first clock-select unit 202b will be described with reference to FIGS. 14 and 15.

The signal SCF0, which is an output signal of the OR circuit 1402, and the signal SCF1, which is an output signal of the OR circuit 1403, take logic levels shown by the truth table of FIG. 15, according to combinations of the values of a current-select signal CSEL-SIG[0], a current-select signal CSEL-SIG[1], and a current-select signal CSEL-SIG[2]. The signals SCF0 and SCF1 indicate, to the multiplexer 1401, which of four inputs "00", "01", "10" and "11" to selectively output as the second clock signal 2CLK. Likewise, the signal SCS0, which is an output signal of the AND circuit 1405, and the signal SCS1, which is an output signal of the AND circuit 1406, take logic levels shown by the truth table of FIG. 15, according to combinations of the values of the current-select signal CSEL-SIG[0], the current-select signal CSEL-SIG[1], and the current-select signal CSEL-SIG[2]. The signals SCS0 and SCS1 indicate, to the multiplexer 1404, which of four inputs "00", "01", "10" and "11" to selectively output as the third clock signal 3CLK.

On condition that the current-select signal CSEL-SIG[2], which is the most significant bit of the current-select signal CSEL-SIG of three bits, has the logic value "0", the value of the signal SCF0 is equal to the value of the current-select signal CSEL-SIG[0], and the value of the signal SCF1 coincides with the value of the current-select signal CSEL-SIG[1]. In contrast, on condition that the current-select signal CSEL-SIG[2] has the logic value "1", the signals SCF0 and SCF1 both take the logic value "1".

Further, on condition that the current-select signal CSEL-SIG[2], which is the most significant bit of the current-select signal CSEL-SIG of three bits, has the logic value "1", the value of the signal SCS0 is equal to the value of the current-select signal CSEL-SIG[0], and the value of the signal SCS1 coincides with the value of the current-select signal CSEL-SIG[1]. In contrast, on condition that the current-select signal CSEL-SIG[2] has the logic value "0", the signals SCS0 and SCS1 both take the logic value "1".

Consequently, in this embodiment, the second clock signal 2CLK, which is an output signal of the multiplexer 1401, and the third clock signal 3CLK, which is an output signal of the multiplexer 1404, are selectively output as shown by truth table of FIG. 15. The most significant bit (current-select signal CSEL-SIG[2]) of the current-select signal CSEL-SIG having the logic value "0" means that the first clock-select unit 202b is directed to select a clock from the high-frequency clock group. In this case, the selected input clock signal is supplied as the second clock signal 2CLK, whereas the third clock signal 3CLK is fixed to the logic Low level (GND), whereby no clock is supplied. In contrast, the most significant bit (current-select signal CSEL-SIG[2]) of the current-select signal CSEL-SIG having the logic value "1" means that the first clock-select unit 202b is directed to select a clock from the low-frequency clock group. In this case, the selected input clock signal is supplied as the third clock signal 3CLK, whereas the second clock signal 2CLK is fixed to the logic Low level (GND), whereby no clock is supplied.

The multiplexer 1407 accepts inputs of the second clock signal 2CLK and the third clock signal 3CLK. The following signals are selectively output as the first clock signal 1CLK, which is an output signal of the multiplexer 1407 as shown by the truth table of FIG. 15: an input clock signal selected as the second clock signal 2CLK on condition that the current-select signal CSEL-SIG[2] has the logic value "0" and a clock of the high-frequency clock group is selected; and an input clock signal selected as the third clock signal 3CLK on condition that the current-select signal CSEL-SIG[2] having the logic value "1", and a clock of the low-frequency clock group is selected.

FIG. 16 shows a truth table for explaining an operation of the second clock-select unit 203.

The operation of the second clock-select unit 203 will be described with reference to FIGS. 14 and 16.

The signal SNF0, which is an output signal of the OR circuit 1409, and the signal SNF1, which is an output signal of the OR circuit 1410, take logic levels shown by the truth table of FIG. 16, according to combinations of the values of a second clock-select-unit-enable signal 2CLKEN-SIG, a new-select signal NSEL-SIG[0], a new-select signal NSEL-SIG[1], and a new-select signal NSEL-SIG[2]. The signals SNF0 and SNF1 indicate, to the multiplexer 1408, which of four inputs "00", "01", "10" and "11" to selectively output as the fourth clock signal 4CLK. Likewise, the signal SNS0, which is an output signal of the AND circuit 1412, and the signal SNS1, which is an output signal of the AND circuit 1413, take logic levels shown by the truth table of FIG. 16, according to combinations of the values of the second clock-select-unit-enable signal 2CLKEN-SIG, the new-select signal NSEL-SIG[0], the new-select signal NSEL-SIG[1], and the new-select signal NSEL-SIG[2]. The signals SNS0 and SNS1 indicate, to the multiplexer 1411, which of four inputs "00", "01", "10" and "11" to selectively output as the fifth clock signal 5CLK.

On condition that the second clock-select-unit-enable signal 2CLKEN-SIG has the logic value "1", and the new-select signal NSEL-SIG[2], which is the most significant bit of the new-select signal NSEL-SIG of three bits, has the logic value "0", the value of the signal SNF0 is equal to the value of the new-select signal NSEL-SIG[0], and the value of the signal SNF1 coincides with the value of the new-select signal NSEL-SIG[1]. In contrast, on condition that the second clock-select-unit-enable signal 2CLKEN-SIG has the logic value "1", and the new-select signal NSEL-SIG[2] has the logic value "1", the signals SNF0 and SNF1 both take the logic value "1".

Further, on condition that the second clock-select-unit-enable signal 2CLKEN-SIG has the logic value "1", and the new-select signal NSEL-SIG[2], which is the most significant bit of the new-select signal NSEL-SIG of three bits, has the logic value "1", the value of the signal SNS0 is equal to the value of the new-select signal NSEL-SIG[0], and the value of the signal SNS1 coincides with the value of the new-select signal NSEL-SIG[1]. In contrast, on condition that the second clock-select-unit-enable signal 2CLKEN-SIG has the logic value "1", and the new-select signal NSEL-SIG[2] has the logic value "0", the signals SNS0 and SNS1 both take the logic value "1".

However, in the case of the second clock-select-unit-enable signal 2CLKEN-SIG having the logic value "0", the signals SNF0, SNF1, SNS0 and SNS1 all take the logic value "1" regardless of the values of the new-select signal NSEL-SIG[0] to the new-select signal NSEL-SIG[2].

Consequently, in this embodiment, the fourth clock signal 4CLK, which is an output signal of the multiplexer 1408, and the fifth clock signal 5CLK, which is an output signal of the multiplexer 1411, are selectively output as shown by the truth table of FIG. 16. The condition that the second clock-select-unit-enable signal 2CLKEN-SIG has the logic value "1", the most significant bit (new-select signal NSEL-SIG[2]) of the new-select signal NSEL-SIG has the logic value "0" means that the second clock-select unit 203 is directed to select a clock from the high-frequency clock group. In this case, the selected input clock signal is supplied as the fourth clock signal 4CLK, whereas the fifth clock signal 5CLK is fixed to the logic Low level (GND), whereby no clock is supplied. In contrast, the condition that the second clock-select-unit-enable signal 2CLKEN-SIG has the logic value "1", and the most significant bit (new-select signal NSEL-SIG[2]) of the new-select signal NSEL-SIG has the logic value "1" means that the second clock-select unit 203 is directed to select a clock from the low-frequency clock group. In this case, the selected input clock signal is supplied as the fifth clock signal 5CLK, whereas the fourth clock signal 4CLK is fixed to the logic Low level (GND), whereby no clock is supplied. Further, in the case of the second clock-select-unit-enable signal 2CLKEN-SIG having the logic value "0", the fourth and fifth clock signals 4CLK and 5CLK are both fixed to the logic Low level (GND), and the second clock-select unit 203 is stopped from outputting a clock. In this way, during the time of a normal operation in which no clock switching is performed, an unwanted clock supply to the inside of the clock-control-signal-generation circuit 101b can be kept stopped to cut the power consumption.

Also, by providing a circuit operable to mask the second and third clock signals 2CLK and 3CLK, which are output by the first clock-select unit 202b, an unwanted clock supply to the inside of the clock-control-signal-generation circuit 101b can be kept stopped to cut the power consumption during the time of a normal operation, in which no clock switching is performed.

The clock-control-signal-generation circuit 101b is the same as the clock-control-signal-generation circuit 101b shown in FIG. 8, which has been described in connection with the fifth embodiment in structure and operation.

<Eighth Embodiment>

Figure 17:
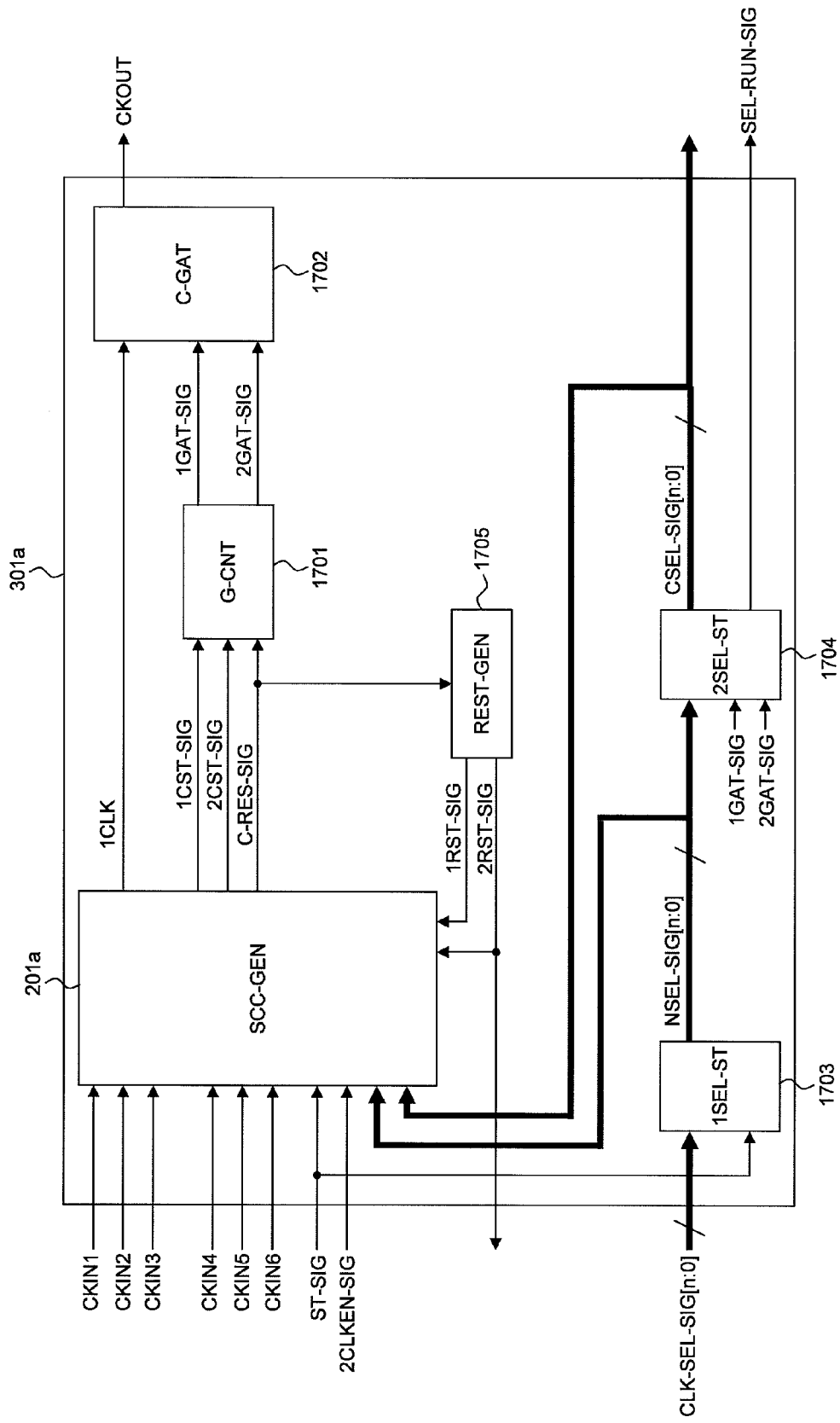
FIG. 17 is a block diagram showing a concrete example of the configuration of the clock selector in connection with the invention.

FIG. 17 shows a concrete example of the configuration of the clock selector 301 shown in FIG. 3.

The clock selector 301a shown in FIG. 17 includes: a select-type clock-control-signal-generation circuit (SCC-GEN) 201a; a gating control unit (G-CNT) 1701; a clock-gating unit (C-GAT) 1702; a first select-signal-holding unit (1SEL-ST) 1703; a second select-signal-holding unit (2SEL-ST) 1704; and a reset-signal-generation unit (REST-GEN) 1705.

The clock selector 301a accepts inputs of a plurality of clock signals (input clock signals CKIN1 to CKIN6), a clock-select signal of n+1 bits, a switching-trigger signal ST-SIG, and a second clock-select-unit-enable signal 2CLKEN-SIG, from the outside. Also, the clock selector 301a outputs an output clock signal CKOUT, a switching-run signal SEL-RUN-SIG, and a second reset signal 2RST-SIG to the outside. The details of the signals are the same as those of the signals input to and output from the clock selector 301 in connection with the third embodiment.

The clock-control-signal-generation circuit 201a is the same as the clock-control-signal-generation circuit 201a shown in FIG. 11, which has been described in connection with the sixth embodiment in structure and operation.

Figure 21:
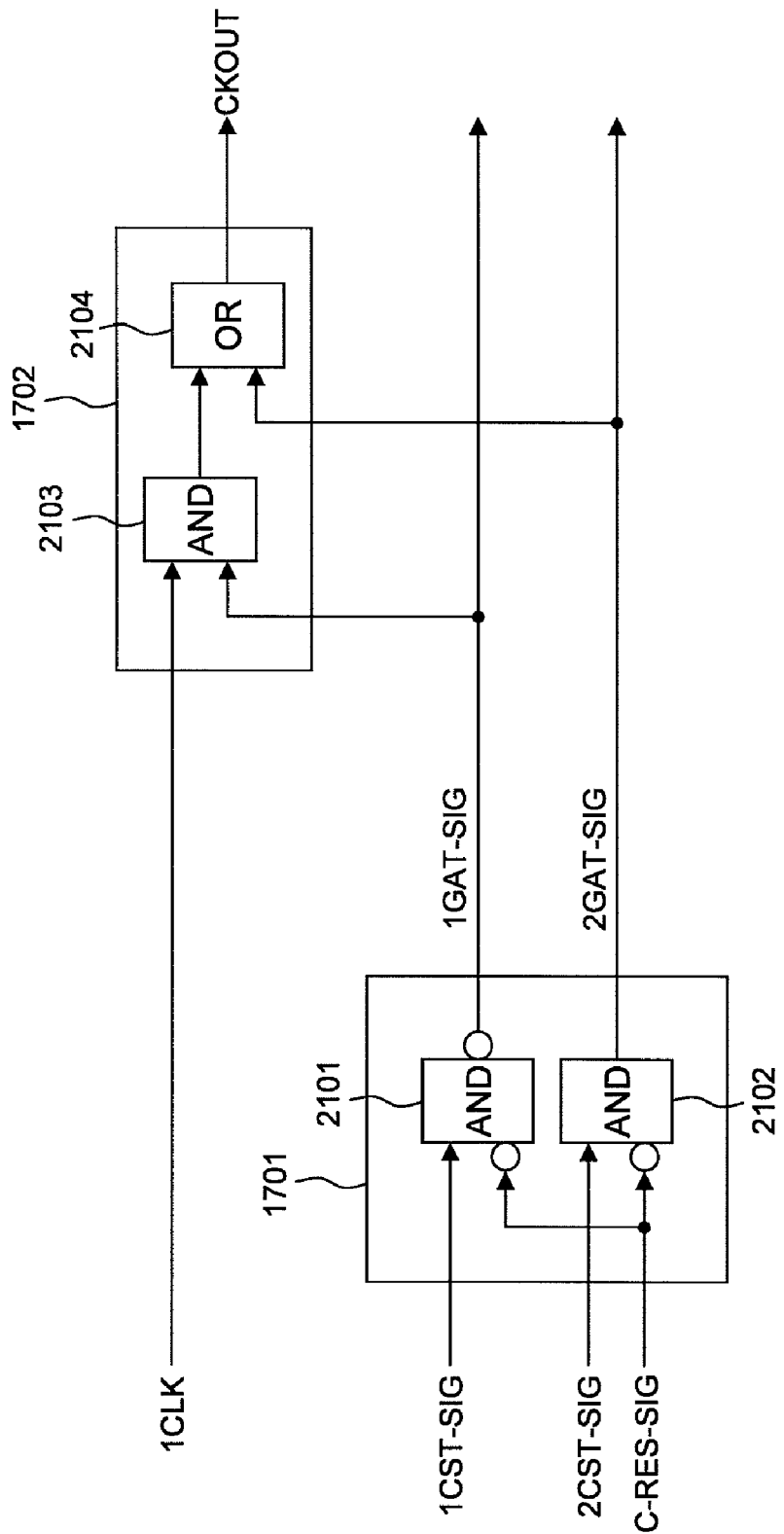
FIG. 21 is a circuit diagram showing concrete examples of the circuit configurations of a gating control unit and a clock-gating unit of the clock selector in connection with the invention.

FIG. 21 shows a concrete example of the circuit configurations of the gating control unit 1701 and clock-gating unit 1702.

The gating control unit 1701 includes AND circuits 2101 and 2102, whereas the clock-gating unit 1702 includes an AND circuit 2103 and an OR circuit 2104.

Figures 22, 24:
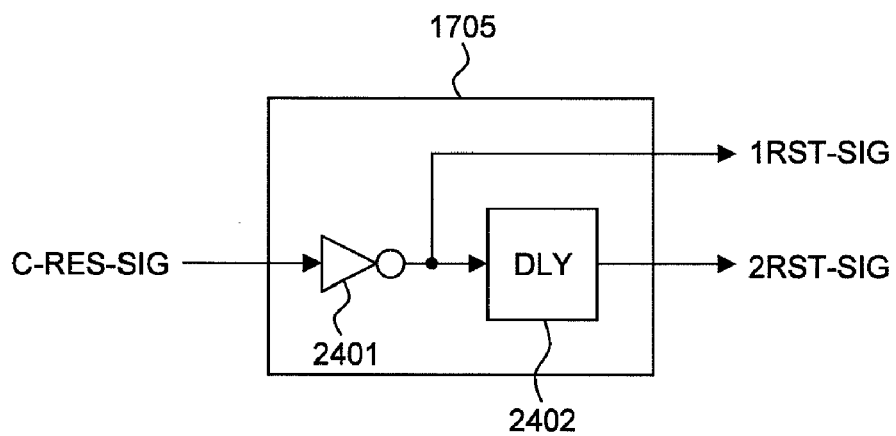
FIG. 22 is a diagram showing truth tables for explaining operations of the gating control unit and clock-gating unit shown in FIG. 21.
FIG. 24 is a circuit diagram showing a concrete example of the circuit configuration of a reset-signal-generation unit of the clock selector.

FIG. 22 shows truth tables for explaining operations of the gating control unit 1701 and clock-gating unit 1702.

With first and second clock-stop-permission signals 1CST-SIG and 2CST-SIG, and a clock-resume-permission signal C-RES-SIG, the signals all stay at the logic High level corresponding to the logic value "1" when the signals are active, whereas the signals stay at the logic Low level, corresponding to the logic value "0" when the signals are nonactive. Further, the first gating-control signal 1GAT-SIG stays at the logic High level corresponding to the logic value "1" when it is active. However, the first gating-control signal 1GAT-SIG stays at the logic Low level corresponding to the logic value "0" when it is nonactive. The second gating-control signal 2GAT-SIG stays at the logic Low level corresponding to the logic value "0" when it is active, however it stays at the logic High level corresponding to logic value "1" when nonactive.

The first and second clock-stop-permission signals 1CST-SIG and 2CST-SIG are never made active concurrently. In addition, the first and second gating-control signals 1GAT-SIG and 2GAT-SIG are never made nonactive concurrently.

Now, the operations of the gating control unit 1701 and clock-gating unit 1702 will be described with reference to FIGS. 21 and 22. The first gating-control signal 1GAT-SIG is changed to the nonactive state corresponding to the logic value "0" only under the condition that the first clock-stop-permission signal 1CST-SIG is in the active state corresponding to the logic value "1", and the clock-resume-permission signal C-RES-SIG is in the nonactive state corresponding to the logic value "0". The second gating-control signal 2GAT-SIG is changed to the nonactive state corresponding to the logic value "1" only in the condition that the second clock-stop-permission signal 2CST-SIG is in the active state corresponding to the logic value "1", and the clock-resume-permission signal C-RES-SIG is in the nonactive state corresponding to the logic value "0".

With the first gating-control signal 1GAT-SIG staying in the nonactive state corresponding to the logic value "0", and the second gating-control signal 2GAT-SIG in the active state corresponding to the logic value "0", the output clock signal CKOUT is fixed at the Low level (output-clock-stop condition). With the first gating-control signal 1GAT-SIG in the active state corresponding to the logic value "1", and the second gating-control signal 2GAT-SIG in the nonactive state corresponding to the logic value "1", the output clock signal CKOUT is fixed at the High level (output-clock-stop condition). Only in the condition that the first gating-control signal 1GAT-SIG is in the active state corresponding to the logic value "1", and the second gating-control signal 2GAT-SIG is in the active state corresponding to the logic value "0", the first clock signal 1CLK is output as the output clock signal CKOUT. As described above, the clock selector is controlled so that the following two conditions are not satisfied: the first gating-control signal 1GAT-SIG is in the nonactive state corresponding to the logic value "0"; and the second gating-control signal 2GAT-SIG is in the nonactive state corresponding to the logic value "1".

During the time of a normal operation in which no clock switching is performed, the first and second clock-stop-permission signals 1CST-SIG and 2CST-SIG, and the clock-resume-permission signal C-RES-SIG all stay in the nonactive state corresponding to the logic value "0", which is the initial state thereof. Therefore, during this time, the first gating-control signal 1GAT-SIG is in the active state corresponding to the logic value "1", and the second gating-control signal 2GAT-SIG stays in the active state corresponding to the logic value "0" and thus the first clock signal 1CLK is output as the output clock signal CKOUT.

Figure 23:
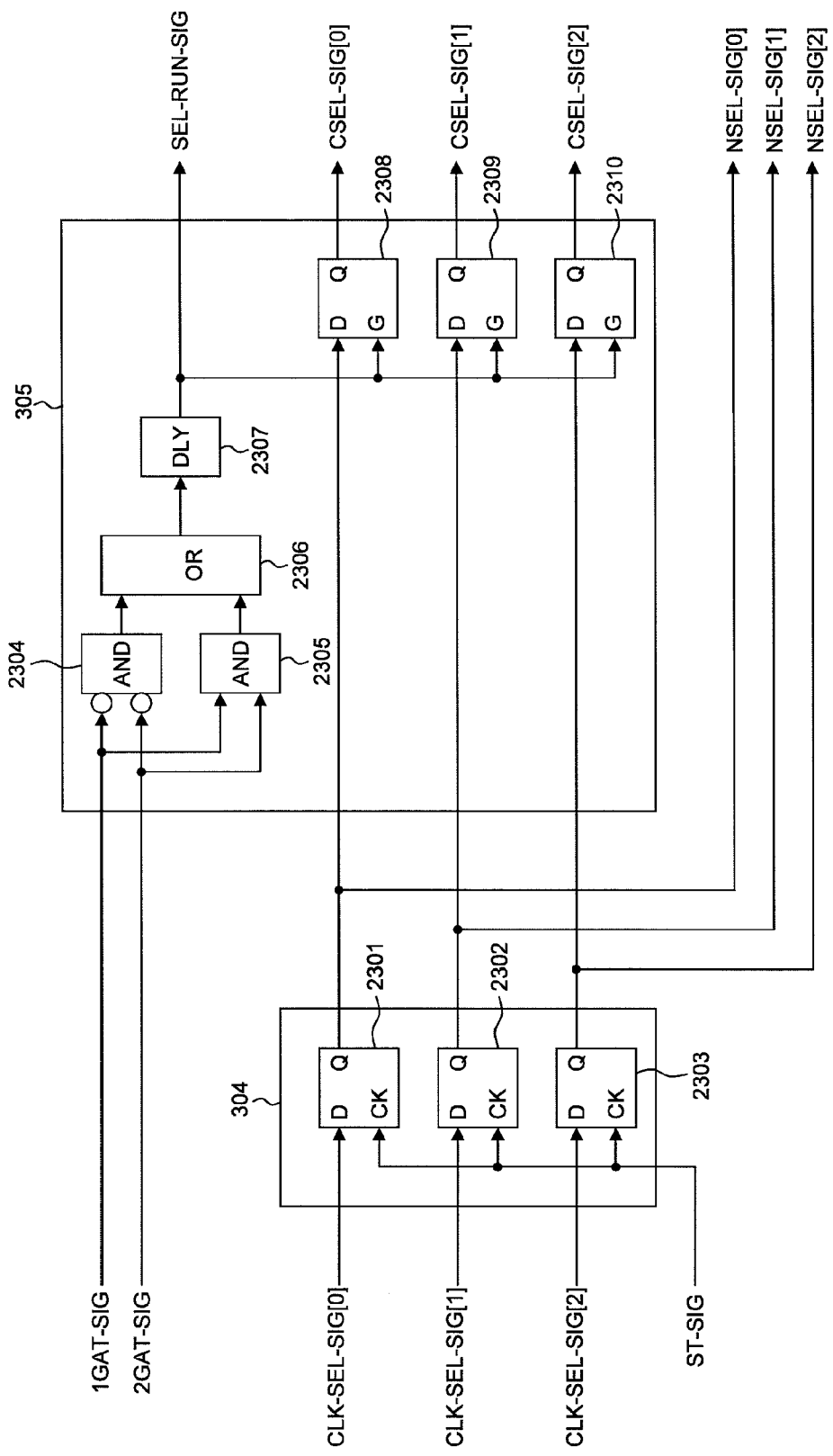
FIG. 23 is a circuit diagram showing concrete examples of the circuit configurations of first and second select-signal-holding units of the clock selector in connection with the invention.

FIG. 23 shows a concrete example of the circuit configurations of the first and second select-signal-holding units 1703 and 1704.

The first select-signal-holding unit 1703 includes flip-flops 2301, 2302 and 2303. The second select-signal-holding unit 1704 includes AND circuits 2304 and 2305, an OR circuit 2306, a delay circuit (DLY) 2307 having a delay time D1, and latch circuits 2308, 2309 and 2310.

In the first select-signal-holding unit 1703, in line with a rising edge of the switching-trigger signal ST-SIG, the clock-select signal[0], the clock-select signal[1] and the clock-select signal[2] are sampled and held by the flip-flops 2301, 2302 and 2303, and output as the new-select signal NSEL-SIG[0], the new-select signal NSEL-SIG[1], and the new-select signal NSEL-SIG[2].

In the second select-signal-holding unit 1704, the output signal of the OR circuit 2306 is made active by the AND circuits 2304 and 2305 and the OR circuit 2306 on condition that the first gating-control signal 1GAT-SIG is nonactive, and the second gating-control signal 2GAT-SIG is active, or that the first gating-control signal 1GAT-SIG is active, and the second gating-control signal 2GAT-SIG is nonactive. Then, after an elapse of the time set by the delay circuit 2307, the switching-run signal SEL-RUN-SIG is changed from nonactive (logic value "0") to active (logic value "1"). After the switching-run signal SEL-RUN-SIG is changed to active (logic value "1"), the new-select signal NSEL-SIG[0], the new-select signal NSEL-SIG[1] and the new-select signal NSEL-SIG[2] are held by the latch circuits 2308, 2309 and 2310, and output as the current-select signal CSEL-SIG[0], current-select signal CSEL-SIG[1], and the current-select signal CSEL-SIG[2].

FIG. 24 shows a concrete example of the circuit configuration of the reset-signal-generation unit 1705 shown in FIG. 17.

The reset-signal-generation unit 1705 include an inverter 2401, and a delay circuit (DLY) 2402 having a delay time D2. The reset-signal-generation unit 1705 uses the inverter 2401 to invert, in logic, the clock-resume-permission signal C-RES-SIG, and outputs the resultant signal as the first reset signal 1RST-SIG. Also, the reset-signal-generation unit 1705 uses the delay circuit 2402 to delay the first reset signal 1RST-SIG by a given time D2, and outputs the resultant signal as the second reset signal 2RST-SIG.

Figure 18:
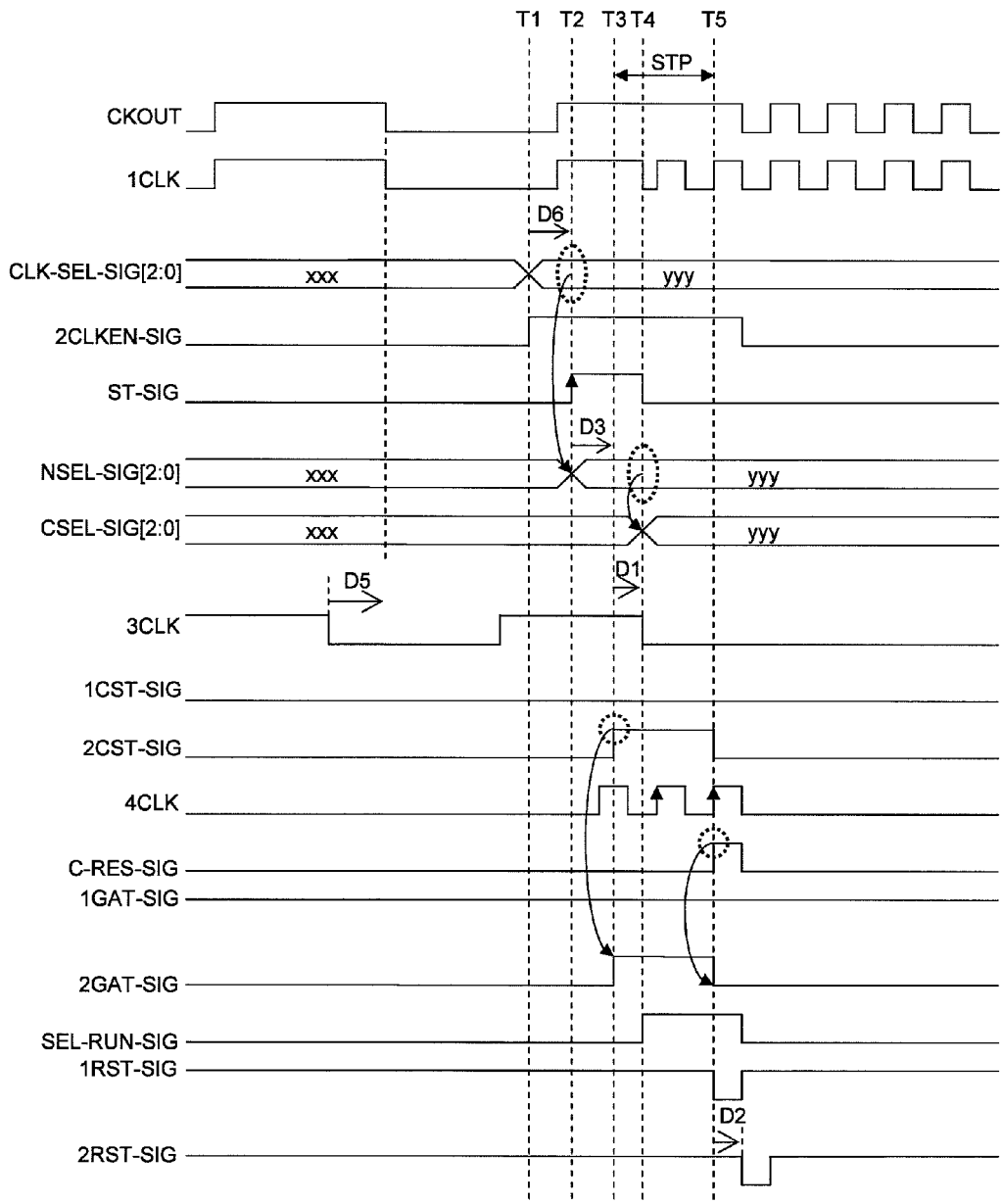
FIG. 18 is a timing chart for explaining an operation of the clock selector shown in FIG. 17.

FIG. 18 is a timing chart for explaining an operation of the clock selector 301a at occurrence of an event of clock switching. The timing chart shows an example of switching from a clock signal having a relatively low frequency to a clock signal having a relatively high frequency.

A flow of clock switching will be described with reference to FIGS. 17 and 18 while linking each step of the flow with actions of the respective blocks of the clock selector 301a.

In the description below, Times T1 to T5 correspond to the times denoted by T1 to T5 in FIG. 18. In addition, the initial states of the first and second clock-stop-permission signal 1CST-SIG and 2CST-SIG, and the clock-resume-permission signal C-RES-SIG are nonactive. Further, the initial states of the first and second gating-control signals 1GAT-SIG and 2GAT-SIG are active. Still further, the initial states of the first and second reset signals 1RST-SIG and 2RST-SIG are nonactive.

Moreover, the first clock signal 1CLK and the output clock signal CKOUT before clock switching are selected from the low-frequency clock group, and therefore these clock signals are delayed by the delay circuit 1107 shown in FIG. 11 by the time D5 with respect to the third clock signal 3CLK at the time of output, which is as already described in connection with the sixth embodiment. At Time T1, the value of the clock-select signal of three bits supplied from the outside is changed from (x,x,x) to (y,y,y). Likewise the second clock-select-unit-enable signal 2CLKEN-SIG supplied from the outside is changed from nonactive (logic Low level) to active (logic High level).

At Time T2, in a given time (denoted by D6 in FIG. 18) from Time T1, the switching-trigger signal ST-SIG supplied from the outside is changed from nonactive (logic Low level) to active (logic High level). In response to this, the first select-signal-holding unit 1703 changes the value of the new-select signal NSEL-SIG of three bits from (x,x,x) to (y,y,y). Then, the second clock-select unit 203 in the select-type clock-control-signal-generation circuit 201a starts outputting the fourth clock signal 4CLK corresponding to the value (y,y,y) indicated by the new-select signal NSEL-SIG of three bits. In addition, the clock-control-signal-generation circuit 101a in the select-type clock-control-signal-generation circuit 201a starts processing, and the level of the third clock signal 3CLK is detected as described in connection with the fourth embodiment. Incidentally, in the example shown in FIG. 18, High level is detected.

At Time T3, in a given time (denoted by D3 in FIG. 18) from Time T2, the select-type clock-control-signal-generation circuit 201a changes the second clock-stop-permission signal from nonactive (logic Low level) to active (logic High level), and outputs the second clock-stop-permission signal of the active state, provided that the given time D3 is produced by the delay circuit 506 as described in connection with the fourth embodiment. Consequently, the gating control unit 1701 changes the second gating-control signal 2GAT-SIG from active (logic Low level) to nonactive (logic High level). However, in this situation, the first gating-control signal 1GAT-SIG is left active (at the logic High level). Further, in response to this, the clock-gating unit 1702 fixes the output clock signal CKOUT at the logic High level, i.e. executes the step of stopping an output clock (STP).

At Time T4 after an elapse of a given time (D1 in FIG. 18) from Time T3, the second select-signal-holding unit 1704 changes the value of the current-select signal CSEL-SIG of three bits from (x,x,x) to (y,y,y), provided that the delay of the given time is caused by the delay circuit 2307. Further, at Time T4, the first clock-select unit 202a in the select-type clock-control-signal-generation circuit 201a switches the first clock signal 1CLK to an after-switching clock signal corresponding to the value (y,y,y) indicated by the current-select signal CSEL-SIG of three bits, i.e. changes the clock to select.

At Time T5, after the detection of the second rising edge of the fourth clock signal 4CLK after Time T4 as described in connection with the fourth embodiment, the clock-control-signal-generation circuit 101a in the select-type clock-control-signal-generation circuit 201a changes the clock-resume-permission signal C-RES-SIG from nonactive (logic Low level) to active (logic High level) and then outputs the clock-resume-permission signal so changed. Consequently, the gating control unit 1701 changes the second gating-control signal 2GAT-SIG from nonactive (logic High level) to active (logic Low level). In this situation, the first gating-control signal 1GAT-SIG is left active (at the logic High level). In response to the change, the clock-gating unit 1702 turns the output clock signal CKOUT back to the first clock signal 1CLK. That is, the output clock is resumed.

After Time T5 when the first reset signal 1RST-SIG is changed from nonactive (logic High level) to active (logic Low level), a given time (D2 in FIG. 18) slips by because of the delay circuit 2402, and then the second reset signal 2RST-SIG is changed from nonactive (logic High level) to active (logic Low level). In response to the change of both the first and second reset signal 1RST-SIG and 2RST-SIG to active, the internal circuit of the clock-control-signal-generation circuit 101a in the select-type clock-control-signal-generation circuit 201a is initialized.

Until Time T3, a clock signal before switching is output as the output clock signal CKOUT. During the period between Time T3 and T5, the output clock signal CKOUT is controlled to remain stopped. After Time T5, a clock signal after switching is output as the output clock signal CKOUT. For the period during which the output clock signal CKOUT remains stopped, at least a length of time representing one cycle of the after-switching clock signal is ensured.

According to above description, the clock-gating unit 1702 fixes the output clock signal CKOUT at the logic High level and stops it in response to the change of the second gating-control signal 2GAT-SIG to nonactive, at Time T3. However, in the case of the change of the first gating-control signal 1GAT-SIG to nonactive, the clock-gating unit 1702 fixes the output clock signal CKOUT at the logic Low level and stops the output clock signal.

Now, the output clock signal CKOUT is behind the third clock signal 3CLK by the time D5 as described above in the case of the before-switching clock signal selected from the low-frequency clock group and therefore, once in a while the third clock signal 3CLK in Low level is detected even though the output clock signal CKOUT still stays at High level, and the output clock signal CKOUT is stopped at Low level based on the result of the detection. In contrast, it may occur that the situation that the third clock signal 3CLK in High level is detected even though the output clock signal CKOUT still stays at Low level, and the output clock signal CKOUT is stopped at High level based on the result of the detection. However, in such cases, even if the output clock signal CKOUT is forced to transition to a wrong state in level when being stopped, the transition of the output clock signal just occurs behind the time to normally cause such transition only by the time D5. This is because the transition occurs after the output clock signal CKOUT has been kept at High/Low level for a sufficiently long time (at least 0.5-cycle time—D5). The time D5 is set to be much shorter than the time of one cycle of a low-frequency clock to be used, and therefore the time D5 can cause no inexpedience with the waveform of the clock.

Next, the purpose of using the delay circuit 1107 incorporated in the first clock-select unit 202*a* in the select-type clock-control-signal-generation circuit 201*a* shown in FIG. 11 will be described. The clock-control-signal-generation circuit 101*a* located in the select-type clock-control-signal-generation circuit 201*a* generates the first and second clock-stop-permission signals 1CST-SIG and 2CST-SIG for controlling the stop of the output clock signal CKOUT based on the result of detection of the level of the third clock signal 3CLK in the first low-frequency clock processing subunit 104*a* during the time when the third clock signal 3CLK which is a low-frequency clock is applied thereto. In the case of making an attempt to stop a clock in a conventional way based on detection of the level of the clock, e.g. to stop a clock at Low level in response to the detection of Low level immediately before a rising edge of the clock by chance, a clock has already transitioned to High level at the point when trying stopping the clock actually because of an elapse of time resulting from a delay of processing by a circuit. Under this situation, if the output clock is fixed at Low level to stop the clock as originally arranged, a glitch is caused. The delay circuit 1107 is incorporated in consideration of such case. Specifically, the first clock signal 1CLK and the output clock signal CKOUT are delayed to be behind the third clock signal 3CLK by the time D5 because of the signals having gone through the delay circuit 1107. Therefore, even if the level is detected immediately before an edge of the third clock signal 3CLK, the output clock signal CKOUT will be kept at the same level as the detected level for the time D5 after the detection. On that account, even if there is a delay in processing by the circuit, as long as the delay is within the time D5, no glitch is caused when the clock is stopped with the level fixed to the detected level. A requirement for realization of a clock-control-signal-generation circuit so arranged is that the set delay time D3 of the delay circuit 506 incorporated in the first low-frequency clock processing subunit 104*a* is smaller than the time D5. The role of the delay circuit 1107 to assure that the level of a low-frequency clock signal to be stopped based on level detection is never changed during the process for stopping the clock.

As described above, in switching from a low-frequency clock signal to a high-frequency clock signal, the clock selector 301 takes up to the sum of a given time D6 and a give time D3 between the change of the clock-select signal of n+1 bits and the stop of the clock, and spends up to the time of three cycles of the clock after switching between the stop and resumption of the clock. Therefore, the time required for the clock switching is the sum of the above times.

The given time D6, which is set as a standby time taken until the clock-select signal of n+1 bits stabilizes, is typically about 10 nanoseconds. In addition, the given time D3, which is set as a standby time taken until the metastable phenomenon of the flip-flop calms down, is typically about 10 nanoseconds. Therefore, e.g. on condition that the clock before switching has a frequency of 32 kHz, and the clock after switching has a frequency of 100 MHz, the clock switching is finished in a total of 50 nanoseconds approximately. The time of about 50 nanoseconds contains just a period of five cycles of the 100-MHz clock after switching. The time of about 50 nanoseconds can be regarded as much smaller than the clock switching time (62.5 microseconds, equivalent to a period of 6250 cycles of the 100-MHz clock after switching) which a conventional clock selector achieves under the same condition.

In this embodiment, changes of the first and second gating-control signal 1GAT-SIG and 2GAT-SIG are used to provide the latch circuits 2308, 2309, 2310 with a trigger signal for updating the n+1 bits of current-select signal CSEL-SIG in the second select-signal-holding unit 1704. However, an original signal to create the trigger signal is not limited to the first and second gating-control signals 1GAT-SIG and 2GAT-SIG. Another appropriate signal or a signal separately prepared by an additional circuit may be used instead.

<Ninth Embodiment>

Figure 19:
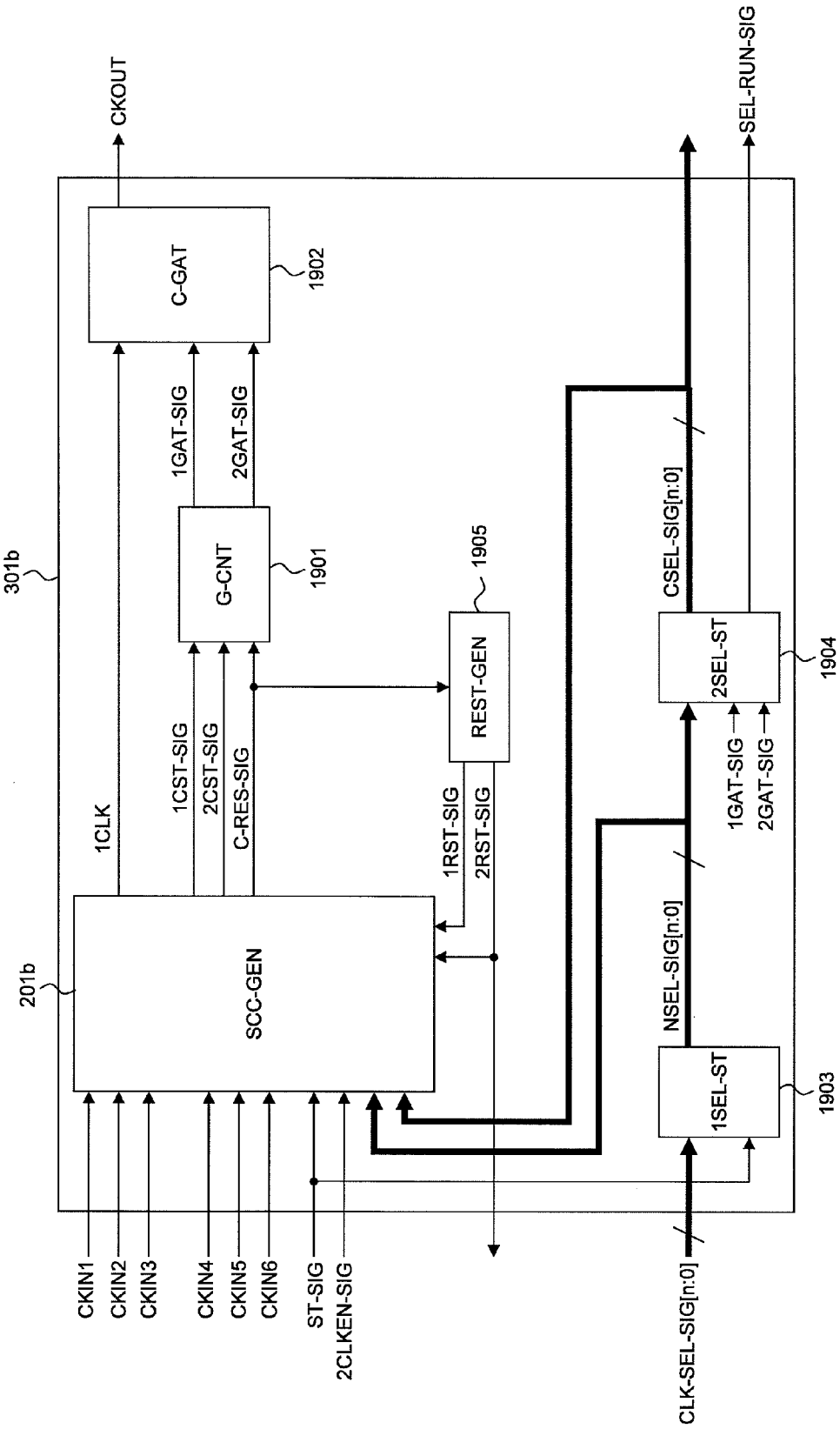
FIG. 19 is a block diagram showing a concrete example of the configuration of a clock selector in connection with the invention.

FIG. 19 shows another concrete example of the configuration of the clock selector 301 shown in FIG. 3.

The clock selector 301*b* shown in FIG. 19 includes: a select-type clock-control-signal-generation circuit 201*b*; a gating control unit 1901; a clock-gating unit 1902; a first select-signal-holding unit 1903; a second select-signal-holding unit 1904; and a reset-signal-generation unit 1905.

The clock selector 301*b* accepts inputs of a plurality of clock signals (input clock signals CKIN1 to CKIN6), a clock-select signal of n+1 bits, a switching-trigger signal ST-SIG, and a second clock-select-unit-enable signal 2CLKEN-SIG, from the outside. Also, the clock selector 301*b* outputs an output clock signal CKOUT, a switching-run signal SEL-RUN-SIG, and a second reset signal 2RST-SIG to the outside. The details of the signals are the same as those of the signals input to and output from the clock selector 301 in connection with the third embodiment.

The clock-control-signal-generation circuit 201*b* is the same as the clock-control-signal-generation circuit 201*b* shown in FIG. 14, which has been described in connection with the seventh embodiment in structure and operation.

The gating control unit 1901 and the clock-gating unit 1902 are configured as shown in FIG. 21, and operate in the same ways as the gating control unit 1701 and the clock-gating unit 1702 in connection with the eighth embodiment work.

The first and second select-signal-holding units 1903 and 1904 are configured as shown in FIG. 23, and operate in the same ways as the first and second select-signal-holding units 1703 and 1704 in connection with the eighth embodiment work.

The reset-signal-generation unit 1905 is configured as shown in FIG. 24, and its operation is the same as the operation of the reset-signal-generation unit 1705 in connection with the eighth embodiment which has already described.

Figure 20:
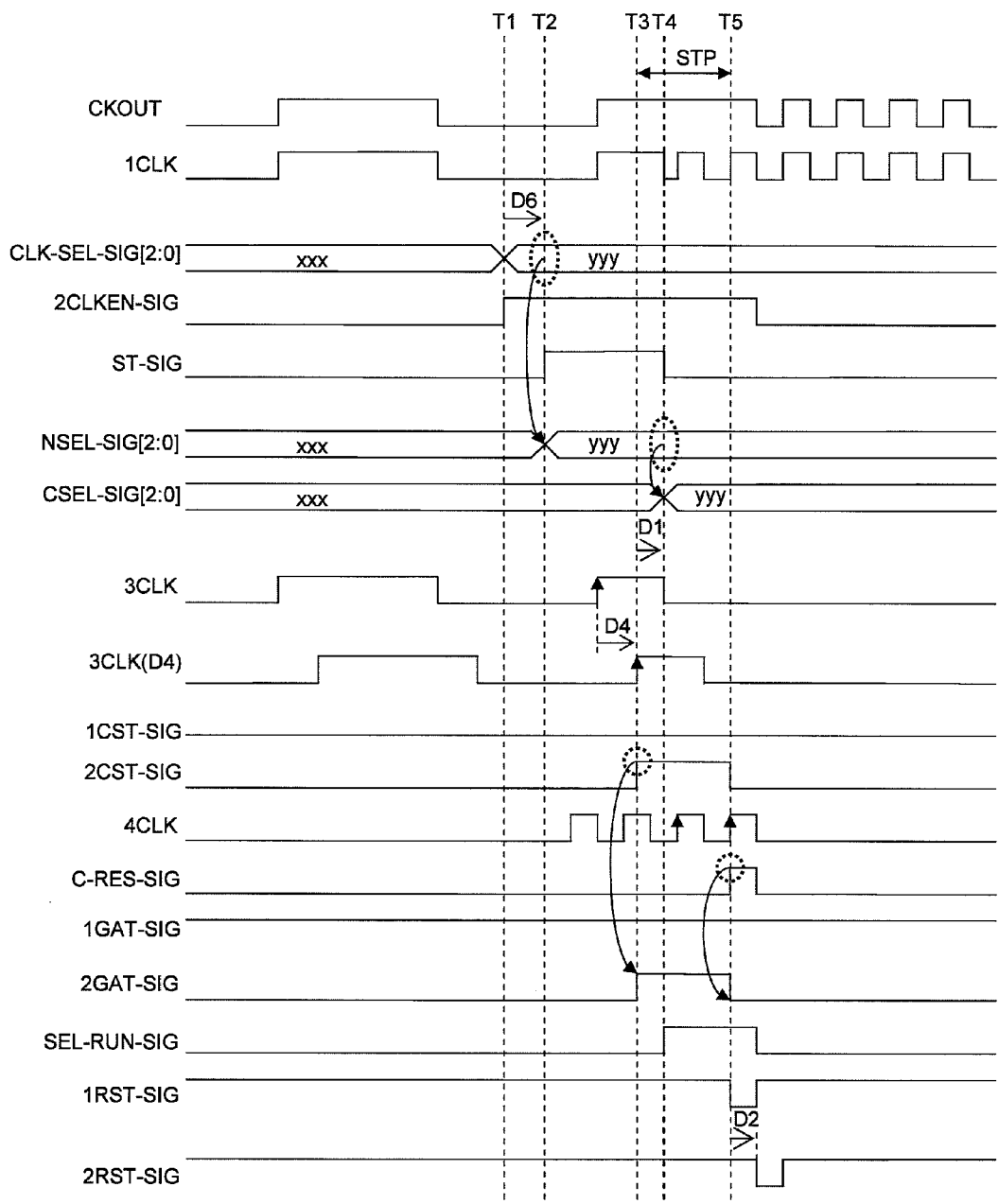
FIG. 20 is a timing chart for explaining an operation of the clock selector shown in FIG. 19.

FIG. 20 shows an example of the operation timing of the clock selector 301*b* at occurrence of an event of clock switching, in which a clock signal having a relatively low frequency is switched to a clock signal having a relatively high frequency.

A flow of clock switching will be described with reference to FIGS. 19 and 20 while linking each step of the flow with actions of the respective blocks of the clock selector 301*b*.

In the description below, Times T1 to T5 correspond to the times denoted by T1 to T5 in FIG. 20. In addition, the initial states of the first and second clock-stop-permission signal 1CST-SIG and 2CST-SIG, and the clock-resume-permission signal C-RES-SIG are nonactive. Further, the initial states of the first and second gating-control signals 1GAT-SIG and 2GAT-SIG are active. Still further, the initial states of the first and second reset signals 1RST-SIG and 2RST-SIG are nonactive.

At Time T1, the value of the clock-select signal of three bits supplied from the outside is changed from (x,x,x) to (y,y,y). Likewise the second clock-select-unit-enable signal 2CLKEN-SIG supplied from the outside is changed from nonactive (logic Low level) to active (logic High level).

At Time T2, in a given time (denoted by D6 in FIG. 20) from Time T1, the switching-trigger signal ST-SIG supplied from the outside is changed from nonactive (logic Low level) to active (logic High level). In response to this, the first select-signal-holding unit 1903 changes the value of the new-select signal NSEL-SIG of three bits from (x,x,x) to (y,y,y). Then, the second clock-select unit 203 in the select-type clock-control-signal-generation circuit 201b starts outputting the fourth clock signal 4CLK corresponding to the value (y,y,y) indicated by the new-select signal NSEL-SIG of three bits. In addition, the clock-control-signal-generation circuit 101b in the select-type clock-control-signal-generation circuit 201b starts processing.

The action steps to execute at Time 3 are the same as those as described in connection with the fifth embodiment. Specifically, in the clock-control-signal-generation circuit 101b in the select-type clock-control-signal-generation circuit 201b, the select-type clock-control-signal-generation circuit 201b changes the second clock-stop-permission signal from nonactive to active, and outputs the second clock-stop-permission signal on detection of the edge of the third clock signal 3CLK(D4) in the same direction (the rising edge in FIG. 20) after detection of the edge of the third clock signal 3CLK, provided that the third clock signal 3CLK(D4) is the third clock signal 3CLK delayed by the delay circuit 807 by the time D4. Consequently, the gating control unit 1901 changes the second gating-control signal 2GAT-SIG from active (logic Low level) to nonactive (logic High level). However, in this situation, the first gating-control signal 1GAT-SIG is left active (at the logic High level). Further, in response to this, the clock-gating unit 1902 fixes the output clock signal CKOUT at the logic High level, i.e. executes the step of stopping an output clock (STP).

At Time T4 after an elapse of a given time (D1 in FIG. 20) from Time T3, the second select-signal-holding unit 1904 changes the value of the current-select signal CSEL-SIG of three bits from (x,x,x) to (y,y,y), provided that the delay of the given time is caused by the delay circuit 2307. Further, at Time T4, the first clock-select unit 202b in the select-type clock-control-signal-generation circuit 201b switches the first clock signal 1CLK to an after-switching clock signal corresponding to the value (y,y,y) indicated by the current-select signal CSEL-SIG of three bits, i.e. changes the clock to select.

At Time T5, after the detection of the second rising edge of the fourth clock signal 4CLK after Time T4 as described in connection with the fifth embodiment, the clock-control-signal-generation circuit 101b in the select-type clock-control-signal-generation circuit 201b changes the clock-resume-permission signal C-RES-SIG from nonactive (logic Low level) to active (logic High level) and then outputs the clock-resume-permission signal so changed. Consequently, the gating control unit 1901 changes the second gating-control signal 2GAT-SIG from nonactive (logic High level) to active (logic Low level). In this situation, the first gating-control signal 1GAT-SIG is left active (at the logic High level). In response to the change, the clock-gating unit 1902 turns the output clock signal CKOUT back to the first clock signal 1CLK. That is, the output clock is resumed.

After Time T5 when the first reset signal 1RST-SIG is changed from nonactive (logic High level) to active (logic Low level), a given time (D2 in FIG. 20) slips by because of the delay circuit 2402, and then the second reset signal 2RST-SIG is changed from nonactive (logic High level) to active (logic Low level). In response to the change of both the first and second reset signal 1RST-SIG and 2RST-SIG to active, the internal circuit of the clock-control-signal-generation circuit 101b in the select-type clock-control-signal-generation circuit 201b is initialized.

Until Time T3, a clock signal before switching is output as the output clock signal CKOUT. During the period between Time T3 and T5, the output clock signal CKOUT is controlled to remain stopped. After Time T5, a clock signal after switching is output as the output clock signal CKOUT. For the period during which the output clock signal CKOUT remains stopped, at least a length of time representing one cycle of the after-switching clock signal is ensured.

According to above description, the clock-gating unit 1902 fixes the output clock signal CKOUT at the logic High level and stops it in response to the change of the second gating-control signal 2GAT-SIG to nonactive, at Time T3. However, in the case of the change of the first gating-control signal 1GAT-SIG to nonactive, the clock-gating unit 1702 fixes the output clock signal CKOUT at the logic Low level and stops the output clock signal.

As described above, in switching from a low-frequency clock signal to a high-frequency clock signal, the clock selector in connection with the invention takes up to the sum of a given time D6, a time of 0.5 cycle of a clock before switching, and a given time D4 between the change of the clock-select signal of n+1 bits and the stop of the clock, and spends up to the time of three cycles of the clock after switching between the stop and resumption of the clock. Therefore, the time required for the clock switching is the sum of the above times.

The given time D6, which is set as a standby time taken until the clock-select signal of n+1 bits stabilizes, is typically about 10 nanoseconds. In addition, the given time D4, which is set as a standby time taken until the metastable phenomenon of the flip-flop calms down, is typically about 10 nanoseconds. Therefore, e.g. on condition that the clock before switching has a frequency of 32 kHz, and the clock after switching has a frequency of 100 MHz, the clock switching is finished in a total of 15.7 microseconds approximately. The time of about 15.7 microseconds contains just a period of 1570 cycles of the 100-MHz clock after switching. The time of about 15.7 microseconds can be regarded as much smaller than the clock switching time (62.5 microseconds, equivalent to a period of 6250 cycles of the 100-MHz clock after switching) which a conventional clock selector achieves under the same condition.

<Tenth Embodiment>

FIG. 25 shows an example of the configuration of a microcomputer system as an example of the data processor according to the invention.

The microcomputer system 2501 includes: a clock-generation unit 2502 including a clock selector 2511, which is identical with anyone of the clock selectors described in connection with the eighth and ninth embodiments of the invention; and a plurality of functional modules which are operated in synchronization with a clock signal output by the clock-generation unit 2502. Although no special restriction is intended, the plurality of functional modules include: a CPU (Central Processing Unit) 2529; an interruption-control unit (INT-CNT) 2530; a watchdog timer (W-TIM) 2531; a bus-interface unit (B-INT) 2532; a bus-control unit (B-CNT) 2533; and a memory unit 2534 including e.g. a program memory (P-MEM), a data memory (D-MEM). Also, the plurality of functional modules include: a control register (CNT-REG) 2535; and a peripheral function block assembly 2536 including a general-purpose timer (G-TIM), a real-time timer (C-TIM) serving as a timepiece, a serial interface (S-INT), an I/O port (IOP), and an analog-to-digital converter (A/D).

The clock-generation unit 2502 includes: a clock selector (CLK-SEL) 2511; a clock buffer 2504; a PLL 2505; an HOCO (High-frequency On Chip Oscillator) 2506; and an LOCO (Low-frequency On Chip Oscillator) 2507. Further, the clock-generation unit 2502 includes: a real-time clock (RTC) 2508; a divider (Div) 2509; a multiplexer (Mux) 2510; and a mismatch-detection-functioning unit (MIS-DET) 2512. Still further, the clock-generation unit 2502 includes: dividers (Div) 2513 to 2516; delay adjusters (D-ADJ) 2517, 2518, 2519 and 2520; clock-gating circuits (CG) 2521, 2522, 2523 and 2524; and clock buffers 2525, 2526, 2527 and 2528, and the like. For the clock selector 2511, e.g. the configuration shown in FIG. 3 is adopted. Incidentally, the clock selector 2551 is arranged so as to accept transmission of a clock signal through an external terminal.

PLL 2505, which the control register 2535 has set to be enable, multiplies a reference clock supplied by the external quartz oscillator (Xtal) 2503 to produce a high-frequency clock signal of e.g. 100 MHz.

HOCO 2506, which the control register 2535 has set to be enable, generates a high-frequency clock signal of e.g. 40 MHz by self-running oscillation.

Also, LOCO 2507, which the control register 2535 has set to be enable, generates a low-frequency clock signal of e.g. 125 kHz by self-running oscillation.

RTC 2508, which the control register 2535 has set to be enable, generates a low-frequency clock signal of e.g. 32 kHz by self-running oscillation. The low-frequency clock signal is also used as a clock signal for a timepiece.

The divider 2509, which the control register 2535 has set to be enable, divides, in frequency, a reference clock supplied by the external quartz oscillator (Xtal) 2503 thereby to generate a low-frequency clock signal of e.g. 32 kHz. The low-frequency clock signal is also used as clock signal for a timepiece.

While the RTC 2508 and the divider 2509 are both capable of supplying a low-frequency clock signal of 32 kHz, the RTC 2508 and the divider 2509 are used selectively as follows. In the case of the microcomputer system without the external quartz oscillator (Xtal) 2503, RTC 2508 is brought into operation, and the divider 2509 is kept stopped. In contrast, in the case of the microcomputer system with the external quartz oscillator (Xtal) 2503, the divider 2509 is brought into operation, and RTC 2508 is kept stopped. The low-frequency clock signal of 32 kHz can be also used as a clock signal for a timepiece. Therefore, it is common to generate a 32-kHz clock signal constantly. The multiplexer 2510 selects one of the clock signals for a timepiece, and supplies an internal circuit in the microcomputer system 2501.

According to a value indicated by a clock-select signal of n+1 bits, which the control register 2535 outputs, the clock selector 2511 selects a clock signal from a group consisting of: a high-frequency clock signal of 100 MHz, which is an output signal of PLL 2505; a high-frequency clock signal of 40 MHz, which is an output signal of HOCO 2506; a low-frequency clock signal of 125 kHz, which is an output signal of LOCO 2507; and a low-frequency clock signal of 32 kHz, which is an output signal of the RTC 2508 or divider 2509.

Then, the clock selector 2511 outputs the selected clock signal as an output clock signal CKOUT.

The output clock signal CKOUT which the clock selector 2511 outputs is distributed to four blanch lines of the system. The output clock signal CKOUT traveling on each blanch line enters, of the dividers 2513, 2514, 2515 and 2516, corresponding one, and is converted into a clock signal of a given frequency. Thereafter, the resultant clock signals are passed through the delay adjusters 2517 to 2520, the clock-gating circuits 2521 to 2524, and the clock buffers 2525 to 2528, respectively, and then supplied to the inside of the microcomputer system 2501 as a CPU clock CPU-CLK, a bus clock BUS-CLK, a peripheral clock MOD-CLK1, and a peripheral clock MOD-CLK2, respectively.

In the microcomputer system shown in FIG. 25, the CPU clock CPU-CLK is used as an operation clock of CPU 2529, and the bus clock BUS-CLK is used as an operation clock for the watchdog timer 2531, the bus-interface unit 2532, the bus-control unit 2533, the memory unit 2534, and the control register 2535. In addition, the peripheral clock MOD-CLK1 is used as an operation clock for the general-purpose timer, the serial interface and the I/O port in the peripheral function block assembly 2536, and the peripheral clock MOD-CLK2 is used as an operation clock for the analog-to-digital converter in the peripheral function block assembly 2536.

The clock-gating circuits 2521, 2522, 2523 and 2524 are used to individually stop supplying the clock signals according to the settings of the control register 2535 when it is not required to supply the clock signals to the respective blocks.

In the microcomputer system 2501, the propagation routes for the clock signals cause different propagation delays independent of each other. Therefore, the delay adjuster 2517 to 2520 are used to avert the situation that the clock-synchronization between the respective blocks in the microcomputer system 2501 cannot be maintained. In order to establish the synchronization between the clock signals, a delay time is set for each clock according to the settings of the control register 2535 and the clock signals are adjusted in phase.

Next, the mismatch-detection-functioning unit 2512 in the clock-generation unit 2502 will be described.

Figure 26:
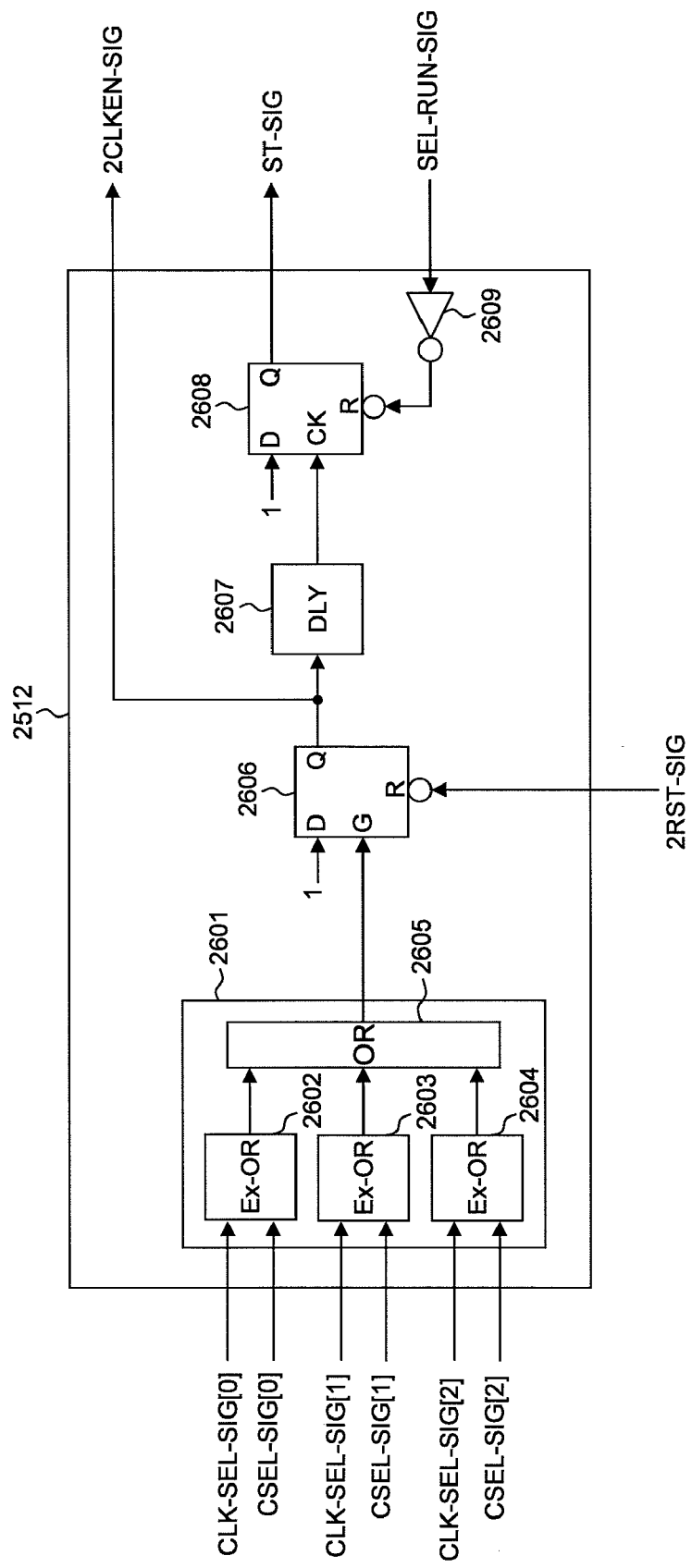
FIG. 26 is a circuit diagram showing a concrete example of the configuration of a mismatch-detection-functioning unit of the microcomputer system shown in FIG. 25.

FIG. 26 shows a concrete example of the circuit configuration of the mismatch-detection-functioning unit 2512.

The mismatch-detection-functioning unit 2512 includes: a mismatch-detection circuit 2601; a latch circuit 2606; a delay circuit 2607 having a delay time D6; a flip-flop 2608; and an inverter 2609.

The mismatch-detection circuit 2601 further includes: exclusive OR circuits (Ex-OR) 2602, 2603 and 2604; and an OR circuit 2605.

The mismatch-detection-functioning unit 2512 accepts inputs of: a clock-select signal of n+1 bits output by the control register 2535; a current-select signal CSEL-SIG of n+1 bits output by the clock selector 2511 in connection with the invention; a switching-run signal SEL-RUN-SIG; and a second reset signal 2RST-SIG. Further, the mismatch-detection-functioning unit 2512 outputs a switching-trigger signal ST-SIG and a second clock-select-unit-enable signal 2CLKEN-SIG, which are supplied to the clock selector 2511.

The mismatch-detection circuit 2601 compares the clock-select signal of n+1 bits with the current-select signal CSEL-SIG of n+1 bits for each bit; in the comparison, the function of the exclusive OR circuits 2602, 2603 and 2604 of a type having two input terminals, i.e. the function of outputting a signal of the active state (logic High level) on receipt of two signals different in logic level via the two input terminals, is utilized. As a result of the comparison, if even one bit of mismatch is found between the clock-select signal of n+1 bits and the current-select signal CSEL-SIG of n+1 bits, the output signal of the OR circuit 2605 is changed to active (logic High level). In this way, the update of the value of the clock-select signal of n+1 bits is detected.

In response to the change of the output signal of the mismatch-detection circuit 2601 to active (logic High level), the second clock-select-unit-enable signal 2CLKEN-SIG, which is an output signal of the latch circuit 2606, is changed to active (logic High level). After an elapse of the given delay time (D6), which has been set on the delay circuit 2607, following the change of the second clock-select-unit-enable signal 2CLKEN-SIG to active (logic High level), the output signal of the delay circuit 2607 is changed to active (logic High level). Consequently, the switching-trigger signal ST-SIG, which is an output signal of the flip-flop 2608, is changed to active (logic High level).

The output signal of the latch circuit 2606 is initialized into the nonactive state (logic Low level) in response to the change of the second reset signal 2RST-SIG to active (logic Low level). The output signal of the flip-flop 2608 is initialized into the nonactive state (logic Low level) in response to the change of the switching-run signal SEL-RUN-SIG to active (logic High level) caused by the inverter 2609.

On another note, bit signals constituting the clock-select signal of n+1 bits output by the control register 2535 are expected to reach the clock selector 2511 involving respective time lags (skew) different from one another, and the different time lags are attributed to the uncertainty in the operation of the semiconductor device forming the control register 2535, the differences in load capacitance among signal lines of n+1 bits, and other factors. Therefore, in case that bit values constituting the value of the clock-select signal of n+1 bits are held by the clock selector 2511 before all of the bit values are changed to final values, a switching to an improper clock would be caused based on wrong data.

To avert such inexpedience, the mismatch-detection-functioning unit 2512 incorporates a delay circuit 2607. Specifically, after an elapse of the delay time D6 set on the delay circuit 2607 following the detection of change with any of n+1 bits of the clock-select signal, the switching-trigger signal ST-SIG is changed to active. In the clock selector 2511, the first select-signal-holding unit as shown in FIG. 23 samples and holds the clock-select signal of n+1 bits in response to the change of the switching-trigger signal ST-SIG from nonactive to active. Therefore, by setting the delay time D6 to be longer than an expected skew time, n+1 bits of the clock-select signal, which have been changed to their final values, can be held in the clock selector 2511.

Next, the effect brought about by application of the clock selector 2511 to the microcomputer system 2501 will be described.

The clock selector 2511 selects one clock signal from a group of input clock signals according to a clock-select direction (clock-select signal of n+1 bits), which is sent by the CPU 2529 through the control register 2535, and outputs the selected clock signal.

Normally the clock selector 2511 selectively outputs a high-frequency clock signal (e.g. 100-MHz clock signal, which is an output signal of PLL 2505). The microcomputer system 2501 executes a high-speed processing based on the clock signal (in High-speed operation mode). In general, the clock sources, namely HOCO 2506, LOCO 2507 and RTC 2508 other than PLL 2505, are controlled to remain stopped during the execution.

On another note, after the CPU 2529 has gone into abeyance, or an operation which needs no high-speed processing, the clock selector 2511 selects and outputs a low-frequency clock signal (32-kHz clock signal, which is an output signal of the divider 2509), and then the microcomputer system 2501 works in a power-saving mode based on the low-frequency clock signal. In general, the clock sources, namely PLL 2505, HOCO 2506, LOCO 2507 and RTC 2508 other than the divider 2509 are controlled to remain stopped during the power-saving mode.

At occurrence of an interrupt request from e.g. the peripheral function block assembly 2536, especially from a timer and an external interface thereof, during an operation in the power-saving mode, CPU 2529 overwrites the value of clock-select signal of n+1 bits in the control register 2535 with a value which directs the clock selector 2511 to select the 100-MHz clock signal, which is an output signal of PLL 2505. On receipt of the direction, the clock selector 2511 switches the clock to select from a 32-kHz clock signal to a 100-MHz clock signal, and the microcomputer system 2501 goes back to the high-speed operation mode.

As already described in connection with the eighth and ninth embodiments, the clock selector 2511 is capable of performing a clock switching at an extremely high speed. Therefore, the time required for the microcomputer system 2501 to transfer from the power-saving mode to the high-speed operation mode can be shortened significantly. As a result, the standby time during which a power-consuming high-frequency clock source like PLL 2505 must be kept working uselessly can be made remarkably short. The microcomputer system 2501 as an application of the clock selector 2511, contributes to the reduction of power consumption by the system. Particularly, it becomes possible to make longer the life of a battery in action in applications to mobile devices and the like.

In addition, another advantage of being capable of returning from the power-saving mode to the high-speed operation mode at a high speed is that a required processing can be executed in real time without delay after the return from the power-saving mode to the high-speed operation mode. Therefore, the microcomputer system 2501 incorporating the clock selector in connection with the invention can be expected to properly work in an application to e.g. a controller such that the practicability of real-time processing is a key requirement.

In the select-type clock-control-signal-generation circuits described in connection with the second, sixth and seventh embodiments, and the clock selectors described in connection with the third, eighth and ninth embodiments, one first high-frequency clock processing subunit, e.g. denoted by 103 in FIG. 5, and one second high-frequency clock processing subunit, e.g. denoted by 107 in FIG. 5, are commonly used for more than one high-frequency clock signal. Further, in the selectors, one first low-frequency clock processing subunit, e.g. denoted by 104a in FIG. 5, and one second low-frequency clock processing subunit, e.g. denoted by 108a in FIG. 5, are commonly used for more than one low-frequency clock signal. In virtue of the arrangements as described above, even the increase of the kind or number of clock signals to select can be readily handled only by increasing the clock-select number of the first clock-select unit, e.g. denoted by 202a in FIG. 11, and the clock-select number of the second clock-select unit, e.g. denoted by 203 in FIG. 11, and the increase of the kind or number of clock signals to select never leads to the enhancement of the circuit scale.

Now, it is noted that in the descriptions in connection with the first to tenth embodiments, the active state of the switching-trigger signal ST-SIG includes a state thereof in the course of transition of the switching-trigger signal ST-SIG from nonactive to active.

As described above, in the clock selector in connection with the invention, clock signals are parted into low-frequency clock signals and high-frequency clock signals, and a processing unit appropriately arranged for exclusively use takes charge of handling of each kind of clock signals, whereby the processing of a low-frequency clock signal before switching, which has been an obstacle to a high-speed clock switching, is speeded up. Further, a mechanism capable of stopping a clock signal in response to any of Low and High levels of the clock signal is provided in the clock selector, whereby the standby time at clock switching can be shorten significantly.

While the invention made by the inventor has been described above based on the embodiments thereof, the invention is not limited to the embodiments. It is apparent that various modifications and changes may be made without departing from the subject matter thereof.

For instance, the clock selector arranged as described above is applicable to a data processor other than the microcomputer 2501.

What is claimed is:

1. A clock-control-signal-generation circuit which generates a control signal for clock switching, and which is placed in a clock selector operable to switch between clock signals including a first clock signal based on first and second clock-stop-permission signals and a clock-resume-permission signal, comprising:
    a before-switching clock processing unit, including
        a first high-frequency clock processing subunit which makes active and outputs a first detection signal on detection of a first state of a second clock signal on condition that a switching-trigger signal is active, and
        a first low-frequency clock processing subunit which makes active and outputs a second detection signal on detection of a first state of a third clock signal on condition that the switching-trigger signal is active, and which makes active and outputs a third detection signal on detection of a second state of the third clock signal on condition that the switching-trigger signal is active, and
    an after-switching clock processing unit, including
        a second high-frequency clock processing subunit which makes active and outputs a fourth detection signal on detection of a first state of a fourth clock signal on condition that the first clock-stop-permission signal is active, and which makes active and outputs a fifth detection signal on detection of a second state of the fourth clock signal on condition that the second clock-stop-permission signal is active, and
        a second low-frequency clock processing subunit which makes active and outputs a sixth detection signal on detection of a first state of a fifth clock signal on condition that the first clock-stop-permission signal is active, and which makes active and outputs a seventh detection signal on detection of a second state of the fifth clock signal on condition that the second clock-stop-permission signal is active,
    wherein the before-switching clock processing unit makes active and outputs the first clock-stop-permission signal on condition that one of the first and second detection signals is active,
    the before-switching clock processing unit makes active and outputs the second clock-stop-permission signal on condition that the third detection signal is active, and
    the after-switching clock processing unit makes active and outputs the clock-resume-permission signal on condition that one of the fourth to seventh detection signals is active.

2. The clock-control-signal-generation circuit according to claim 1, further comprising: a first clock-select unit which accepts inputs of a first clock group of clock signals and a second clock group of clock signals lower than the first clock group of clock signals in frequency, selects one clock signal from among the first clock group to output the selected clock signal as the second clock signal according to a value of a current-select signal, and selects one clock signal from among the second clock group to output the selected clock signal as the third clock signal according to a value of the current-select signal, and outputs one of a signal produced based on the second clock signal and a signal produced based on the third clock signal, as the first clock signal; and
    a second clock-select unit which accepts inputs of the first and second clock groups, selects one clock signal from among the first clock group to output the selected clock signal as the fourth clock signal according to a value of a new-select signal, and selects one clock signal from among the second clock group to output the selected clock signal as the fifth clock signal according to a value of the new-select signal.

3. The clock-control-signal-generation circuit according to claim 1, wherein the first high-frequency clock processing subunit includes a logic working on detection of a first state of the second clock signal,
    the first low-frequency clock processing subunit includes a logic working on detection of a first state of the third clock signal, and a logic working on detection of a second state of the third clock signal,
    the second high-frequency clock processing subunit includes a logic working on detection of a first state of the fourth clock signal, and a logic working on detection of a second state of the fourth clock signal,
    the second low-frequency clock processing subunit includes a logic working on detection of a first state of the fifth clock signal, and a logic working on detection of a second state of the fifth clock signal,
    the first state of the second clock signal is a falling edge of the second clock signal,
    the first state of the third clock signal is a logic low level of the third clock signal,
    the second state of the third clock signal is a logic high level of the third clock signal,
    the first state of the fourth clock signal is a falling edge of the fourth clock signal,
    the second state of the fourth clock signal is a rising edge of the fourth clock signal,
    the first state of the fifth clock signal is a rising edge of the fifth clock signal, and
    the second state of the fifth clock signal is a falling edge of the fifth clock signal.

4. The clock-control-signal-generation circuit according to claim 3, further comprising:
    a first clock-select unit which accepts inputs of a first clock group of clock signals and a second clock group of clock signals lower than the first clock group of clock signals in frequency, selects one clock signal from among the first clock group to output the selected clock signal as the second clock signal according to a value of a current-select signal, and selects one clock signal from among the second clock group to output the selected clock signal as the third clock signal according to a value of the current-select signal, and outputs, as the first clock signal, one of signals produced by delaying the second and third clock signals by a given time; and a second clock-select unit which accepts inputs of the first and second clock groups, selects one clock signal from among the first clock group to output the selected clock signal as the fourth clock signal according to a value of a new-select signal, and selects one clock signal from among the second clock group to output the selected clock signal as the fifth clock signal according to a value of the new-select signal.

5. The clock-control-signal-generation circuit according to claim 1, wherein the first high-frequency clock processing subunit includes a logic working on detection of a first state of the second clock signal, the first low-frequency clock processing subunit includes a logic working on detection of a first state of the third clock signal, and a logic working on detection of a second state of the third clock signal, the second high-frequency clock processing subunit includes a logic working on detection of a first state of the fourth clock signal, and a logic working on detection of a second state of the fourth clock signal, the second low-frequency clock processing subunit includes a logic working on detection of a first state of the fifth clock signal, and a logic working on detection of a second state of the fifth clock signal, the first state of the second clock signal is a falling edge of the second clock signal, the first state of the third clock signal is a falling edge of the third clock signal, the second state of the third clock signal is a rising edge of the third clock signal, the first state of the fourth clock signal is a falling edge of the fourth clock signal, the second state of the fourth clock signal is a rising edge of the fourth clock signal, the first state of the fifth clock signal is a falling edge of the fifth clock signal, and the second state of the fifth clock signal is a rising edge of the fifth clock signal.

6. The clock-control-signal-generation circuit according to claim 5, further comprising:

a first clock-select unit which accepts inputs of a first clock group of clock signals and a second clock group of clock signals lower than the first clock group of clock signals in frequency, selects one clock signal from among the first clock group to output the selected clock signal as the second clock signal according to a value of a current-select signal, and selects one clock signal from among the second clock group to output the selected clock signal as the third clock signal according to a value of the current-select signal, and outputs one of the second and third clock signals as the first clock signal; and a second clock-select unit which accepts inputs of the first and second clock groups, selects one clock signal from among the first clock group to output the selected clock signal as the fourth clock signal according to a value of a new-select signal, and selects one clock signal from among the second clock group to output the selected clock signal as the fifth clock signal according to a value of the new-select signal.

7. A clock selector comprising:
the clock-control-signal-generation circuit according to claim 2;
a gating control unit which makes nonactive and outputs a first gating-control signal on condition that the first clock-stop-permission signal is active, and the clock-resume-permission signal is nonactive, and which makes nonactive and outputs a second gating-control signal on condition that the second clock-stop-permission signal is active and the clock-resume-permission signal is nonactive;

a clock-gating unit which outputs an output clock signal fixed at a logic low level on condition that the first gating-control signal is nonactive, which outputs the output clock signal fixed at a logic high level on condition that the second gating-control signal is nonactive, and which outputs the first clock signal as the output clock signal on condition that the first and second gating-control signals are both active, a first select-signal-holding unit which holds a value of a clock-select signal and outputs the clock-select signal as the new-select signal in response to change of the switching-trigger signal from nonactive to active; and a second select-signal-holding unit which holds a value of the new-select signal and outputs the new-select signal as the current-select signal after an elapse of a given time following change of one of the first and second gating-control signals from active to nonactive.

8. A clock selector comprising:
the clock-control-signal-generation circuit according to claim 4;
a gating control unit which makes nonactive and outputs a first gating-control signal on condition that the first clock-stop-permission signal is active, and the clock-resume-permission signal is nonactive;

a gating control unit which makes nonactive and outputs a second gating-control signal on condition that the second clock-stop-permission signal is active and the clock-resume-permission signal is nonactive;

a clock-gating unit which outputs an output clock signal fixed at a logic low level on condition that the first gating-control signal is nonactive, which outputs the output clock signal fixed at a logic high level on condition that the second gating-control signal is nonactive, and which outputs the first clock signal as the output clock signal on condition that the first and second gating-control signals are both active;

a first select-signal-holding unit which holds a value of a clock-select signal and outputs the clock-select signal as the new-select signal in response to change of the switching-trigger signal from nonactive to active; and a second select-signal-holding unit which holds a value of the new-select signal and outputs the new-select signal as the current-select signal after an elapse of a given time following change of one of the first and second gating-control signals from active to nonactive.

9. A clock selector comprising:
the clock-control-signal-generation circuit according to claim 6;
a gating control unit which makes nonactive and outputs a first gating-control signal on condition that the first clock-stop-permission signal is active, and the clock-resume-permission signal is nonactive;

a gating control unit which makes nonactive and outputs a second gating-control signal on condition that the second clock-stop-permission signal is active and the clock-resume-permission signal is nonactive;

a clock-gating unit which outputs an output clock signal fixed at a logic low level on condition that the first gating-control signal is nonactive, which outputs the output clock signal fixed at a logic high level on condition that the second gating-control signal is nonactive, and which outputs the first clock signal as the output clock signal on condition that the first and second gating-control signals are both active;
a first select-signal-holding unit which holds a value of a clock-select signal and outputs the clock-select signal as the new-select signal in response to change of the switching-trigger signal from nonactive to active; and
a second select-signal-holding unit which holds a value of the new-select signal and outputs the new-select signal as the current-select signal after an elapse of a given time following change of one of the first and second gating-control signals from active to nonactive.

10. A data processor comprising:
the clock selector according to claim 8; and
a functional module which works in synchronization with the a clock signal output by the clock selector.

11. A data processor comprising:
the clock selector according to claim 9; and
a functional module working in synchronization with a clock signal output by the clock selector.

* * * * *